(12) United States Patent
Fujio et al.

(10) Patent No.: US 7,590,651 B2
(45) Date of Patent: Sep. 15, 2009

(54) SEARCH APPARATUS

(75) Inventors: Masakazu Fujio, Fuchu (JP); Yoshiki Niwa, Hatoyama (JP); Shigeo Sumino, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 11/501,117

(22) Filed: Aug. 9, 2006

(65) Prior Publication Data

US 2007/0276857 A1    Nov. 29, 2007

(30) Foreign Application Priority Data

May 24, 2006    (JP)    ............... 2006-143753

(51) Int. Cl.
*G06F 17/30* (2006.01)
(52) U.S. Cl. ............... 707/102; 707/3; 707/4; 707/5; 707/6; 707/104.1
(58) Field of Classification Search ........ 707/3–8, 707/104.1, 102
See application file for complete search history.

(56) References Cited

U.S. PATENT DOCUMENTS

| 5,757,983 | A  | * | 5/1998 | Kawaguchi et al. | ......... | 382/305 |
| 6,446,065 | B1 | * | 9/2002 | Nishioka et al. | ............... | 707/5 |
| 6,523,026 | B1 | * | 2/2003 | Gillis | ............................ | 707/3 |
| 6,983,270 | B2 | * | 1/2006 | Rippich | ......................... | 707/3 |
| 2002/0004793 | A1 | * | 1/2002 | Keith, Jr. | ........................ | 707/1 |
| 2002/0065758 | A1 | * | 5/2002 | Henley | ........................ | 705/37 |
| 2005/0004889 | A1 | * | 1/2005 | Bailey et al. | .................... | 707/1 |
| 2005/0080773 | A1 | * | 4/2005 | Koike et al. | ..................... | 707/3 |
| 2005/0203900 | A1 | * | 9/2005 | Nakamura et al. | ............. | 707/5 |
| 2005/0207645 | A1 | * | 9/2005 | Nishimura et al. | .......... | 382/170 |
| 2006/0085173 | A1 | * | 4/2006 | Takei et al. | ..................... | 703/2 |
| 2006/0217818 | A1 | * | 9/2006 | Fujiwara | ...................... | 700/16 |

FOREIGN PATENT DOCUMENTS

| JP | 9-44520 | 8/1995 |
| JP | 2000-3244 | 6/1998 |
| JP | 2004-152110 | 10/2002 |

OTHER PUBLICATIONS

Tsutsumi, Fujio, "SearchSpace A Full Text Database Using 2D Arrangement of Keywords Expressing Query: SearchSpace", pp. 221-227 (in Japanese with English Translation).

(Continued)

*Primary Examiner*—Don Wong
*Assistant Examiner*—Hanh B Thai
(74) *Attorney, Agent, or Firm*—Stites & Harbison PLLC; Juan Carlos A. Marquez, Esq.

(57) ABSTRACT

The setting of a search condition is supported. Databases 130 and 140 store use frequency information about search conditions, co-occurrence frequency information between search conditions, relationship information unique to a particular field, use history information for each search condition, and simultaneous use history information. Based on a search condition that is already set, the database are referred to so as to calculate the recommendation level of other search conditions, and search conditions that have high recommendation levels and that are likely to be used simultaneously with the already-set search condition are arranged at conspicuous positions. The recommendation level is calculated based on the value of a co-occurrence frequency between search conditions, the history of simultaneous setting, or the estimated number of search results, for example.

18 Claims, 50 Drawing Sheets

OTHER PUBLICATIONS

Tsutsumi, Fujio, "SearchSpace A Full Text Database Using 2D Arrangement of Keywords Expressing Query: SearchSpace", (in Japanese with English Translation), Lecture Notes/ Software Studies (12) Interactive Systems and Software III- Japan Society for Software Science and Technology WISS'95, Dec. 1995, pp. 221-227.

* cited by examiner

FIG. 5

| ID | boolean 1 | ITEM 1 | CATEGORY 1 | boolean 2 | ITEM 2 | CATEGORY 2 | IMPORTANCE | CO-OCCURRENCE LEVEL |
|---|---|---|---|---|---|---|---|---|
| 100 | ○ | KNEE OSTEOARTHRITIS | DISEASE NAME | ○ | BONE SPUR | DISEASE NAME | 33.3 | 9 |
| 101 | ○ | KNEE OSTEOARTHRITIS | DISEASE NAME | × | SURGERY | MEDICAL ACT | 44.4 | 12 |
| 102 | ○ | MALE | PATIENT BASIC | ○ | VAS>30 | EXAMINATION | 70 | 30 |
| 103 | ○ | GPT<REFERENCE VALUE | EXAMINATION | ○ | GOT<REFERENCE VALUE | EXAMINATION | 60 | 23 |
| ⋮ | ⋮ | ⋮ | ⋮ | ⋮ | ⋮ | ⋮ | ⋮ | ⋮ |

FIG. 7

| ID | boolean 1 | ITEM 1 | CATEGORY 1 | boolean 2 | ITEM 2 | CATEGORY 2 | USER ID | DATE |
|---|---|---|---|---|---|---|---|---|
| 1 | ○ | GLOMERULAR NEPHRITIS | DISEASE NAME | × | HEPATITIS | DISEASE NAME | sp01 | 2004/02/02 |
| 2 | ○ | INPATIENT | BASIC | ○ | 10<AGE<70 | BASIC | sp02 | 2003/11/21 |
| 3 | ○ | GLOMERULAR NEPHRITIS | DISEASE NAME | × | LIVER DISORDER | DISEASE NAME | sp01 | 2004/02/02 |
| 4 | ○ | GLOMERULAR NEPHRITIS | DISEASE NAME | ○ | KIDNEY BIOPSY | EXAMINATION | sp01 | 2004/02/02 |
| 5 | ○ | KIDNEY BIOPSY | EXAMINATION | ○ | WITHIN 3 MONTHS | PERIOD | sp01 | 2004/02/02 |
| 6 | ○ | KIDNEY BIOPSY | EXAMINATION | ○ | WITHIN 3 MONTHS | PERIOD | sp02 | 2003/11/21 |
| 7 | ○ | KNEE OSTEOARTHRITIS | DISEASE NAME | ○ | BONE SPUR | DISEASE NAME | sp03 | 2004/02/02 |
| 8 | ○ | KNEE OSTEOARTHRITIS | DISEASE NAME | × | SURGERY | MEDICAL ACT | sp03 | 2004/02/02 |
| ... | ... | ... | ... | ... | ... | ... | ... | ... |
| xxx | ○ | KNEE OSTEOARTHRITIS | DISEASE NAME | ○ | AGE>35 | BASIC | sp03 | 2004/02/02 |

FIG. 8

DATA IN MEMORY REGION 142

| ID | bool ean1 | ITEM 1 | CATEGORY 1 | bool ean2 | ITEM 2 | CATEGORY 2 | USER ID | DATE |
|---|---|---|---|---|---|---|---|---|
| 1 | ○ | GLOMERULAR NEPHRITIS | DISEASE NAME | × | HEPATITIS | DISEASE NAME | sp01 | 2004/02/02 |
| 2 | ○ | INPATIENT | BASIC | ○ | 10<AGE<70 | BASIC | sp02 | 2003/11/21 |
| 3 | ○ | GLOMERULAR NEPHRITIS | DISEASE NAME | × | LIVER DISORDER | DISEASE NAME | sp01 | 2004/02/02 |
| 4 | ○ | GLOMERULAR NEPHRITIS | DISEASE NAME | ○ | KIDNEY BIOPSY | EXAMI- NATION | sp01 | 2004/02/02 |
| 5 | ○ | KIDNEY BIOPSY | EXAMI- NATION | ○ | WITHIN 3 MONTHS | PERIOD | sp01 | 2004/02/02 |
| 6 | ○ | KIDNEY BIOPSY | EXAMI- NATION | ○ | WITHIN 3 MONTHS | PERIOD | sp02 | 2003/11/21 |
| 7 | ○ | MALE | PATIENT BASIC | ○ | VAS>30 | EXAMI- NATION | sp03 | 2004/02/02 |
| 8 | ○ | KNEE OSTEOARTHRITIS | DISEASE NAME | × | SURGERY | MEDICAL ACT | sp03 | 2004/02/22 |
| 9 | ○ | KNEE OSTEOARTHRITIS | DISEASE NAME | ○ | AGE>35 | BASIC | sp03 | 2004/02/12 |

810

815

SEARCH BY "KNEE OSTEOARTHRITIS" OR "MALE" IN ITEM 1 OR ITEM 2 COLUMNS

| ID | bool ean1 | ITEM 1 | CATEGORY 1 | bool ean2 | ITEM 2 | CATEGORY 2 | USER ID | DATE |
|---|---|---|---|---|---|---|---|---|
| 7 | ○ | MALE | PATIENT BASIC | ○ | VAS>30 | EXAMI- NATION | sp03 | 2004/02/02 |
| 8 | ○ | KNEE OSTEO- ARTHRITIS | DISEASE NAME | × | SURGERY | MEDICAL ACT | sp03 | 2004/02/22 |
| 9 | ○ | KNEE OSTEO- ARTHRITIS | DISEASE NAME | ○ | AGE>35 | BASIC | sp03 | 2004/02/12 |
| ... | ... | ... | ... | ... | ... | ... | ... | ... |

820  811  812  818

REARRANGE BY DATE IN DATE COLUMN
825

| RANK | INVERSE OF RANK | ID | bool ean1 | ITEM 1 | CATEGORY 1 | bool ean2 | ITEM 2 | CATEGORY 2 | USER ID | DATE |
|---|---|---|---|---|---|---|---|---|---|---|
| 1 | 1 | 8 | ○ | GLOMERULAR NEPHRITIS | PATIENT BASIC | × | SURGERY | MEDICAL ACT | sp03 | 2004/02/22 |
| 2 | 0.5 | 9 | ○ | GLOMERULAR NEPHRITIS | DISEASE NAME | ○ | AGE>35 | BASIC | sp03 | 2004/02/12 |
| 3 | 0.33 | 7 | ○ | MALE | DISEASE NAME | ○ | VAS>30 | EXAMI- NATION | sp03 | 2004/02/02 |
| ... | ... | ... | ... | ... | ... | ... | ... | ... | ... | ... |

830

FIND SUM FOR EACH ITEM  835

| Boolean | ITEM | RECOMMENDATION |
|---|---|---|
| × | SURGERY | 1 |
| ○ | AGE>35 | 0.5 |
| ○ | VAS>30 | 0.33 |

840

SEARCH APPARATUS

CLAIM OF PRIORITY

The present apparatus claims priority from Japanese application JP 2006-143753 filed on May 24, 2006, the content of which is hereby incorporated by reference into this application.

BACKGROUND OF THE INVENTION

1. Field of the Invention

The invention relates to a search apparatus, and more particularly it relates to a search apparatus having the function for supporting the setting of a search condition.

2. Background Art

As a method for setting a search condition by means of a two-dimensional spatial arrangement of keywords, Non-patent Document 1 discloses "A Full Text Database Using 2D Arrangement of Keywords Expressing Query: SearchSpace." This document discloses that an interface is adopted whereby a keyword is arranged in a two-dimensional rectangular space as an inquiry input screen for the user, wherein a keyword can be generated on the screen or deleted therefrom, or it can be moved by the mouse. The vertical axis of the screen shows priority, while the horizontal axis shows accuracy. The importance of a keyword and its ambiguity as a character string can be set as search conditions based on where the keyword is located.

As a method for setting a search condition by arranging search objects, such as images, in a two-dimensional space instead of keywords, Patent Document 1 discloses that separate feature quantities are assigned to the vertical axis and the horizontal axis on a two-dimensional screen. For example, similarity of frequency characteristics is assigned to the vertical axis while similarity of shape is assigned to the horizontal axis. Based on the position of an object, the frequency characteristics of the object or similarity to the shape of the object can be set. Patent Document 2 proposes a method for the efficient setting of multidimensional parameters used for search, whereby information nodes and concentric scopes are arranged on the screen. The distance between the information nodes and the distance from the center of the scopes are mapped onto multidimensional parameters. Patent Document 3 discloses that search keys are represented by two-dimensional, planar Venn diagrams, wherein a search formula can be set by AND conditions based on the intersection of the Venn diagrams. However, the representation by means of Benn diagrams becomes very complicated as the number of conditions increases.

Patent Document 1: JP Patent Publication (Kokai) No. 2004-152110 A

Patent Document 2: JP Patent Publication (Kokai) No. 2000-3244 A

Patent Document 3: JP Patent Publication (Kokai) No. 9-44520 A (1997)

Non-Patent Document 1: "A Full Text Database Using 2D Arrangement of Keywords Expressing Query: SearchSpace: SearchSpace," Japan Society for Software Science and Technology, Interactive System and Software, WISS '95

SUMMARY OF THE INVENTION

It is believed that a major reason why users feel burdened during search is that a process of trial and error must be repeated until he or she comes up with an appropriate search condition. For example, when the number of results is zero after conducting a search using a certain condition, it is necessary to conduct a search again using a different condition. Similarly, when the search results are so many that they cannot be grasped, the search condition must be carefully considered. In a conventional search interface, in order to grasp the number of relevant items under edge conditions with respect to a search condition that has been set, it has been necessary to reset the search condition each time a search is conducted.

It is an object of the invention to support a search by allowing an appropriate search condition to be set in conjunction with the knowledge in a particular field of search or with user operations.

In order to present search conditions by recommendation levels, a search condition that is likely to be used simultaneously with a search condition that has already been set is arranged at a conspicuous position. The recommendation level is calculated based on the frequency with which the recommended search condition is used simultaneously, the history of simultaneous setting, the estimated number of search results, and so on. Calculation of the recommendation level may utilize a simultaneous use frequency memory table in which the importance of co-occurrence relationship of two search conditions or a co-occurrence frequency and the category of each search condition are stored. Such calculation may alternatively utilize a history table in which records for each setting are stored, the records including two search conditions that have been simultaneously selected, their categories, and the date of setting.

In accordance with the invention, search condition setting can be supported.

BRIEF DESCRIPTION OF THE DRAWINGS

FIG. 5 shows a simultaneous use frequency memory region.

FIG. 7 shows a simultaneous use history memory region.

FIG. 8 shows a technique for calculating a recommendation level using information in the simultaneous use history memory region.

DESCRIPTION OF THE PREFERRED
EMBODIMENTS OF THE INVENTION

In the following, embodiments of the method for supporting the setting of a search condition according to the invention will be described with reference to the drawings. The embodiments involve cases where the invention is applied to the search of patient data accumulated in an electronic Medical Health Record, for example, at hospitals.

Embodiment 1

Figure 1:
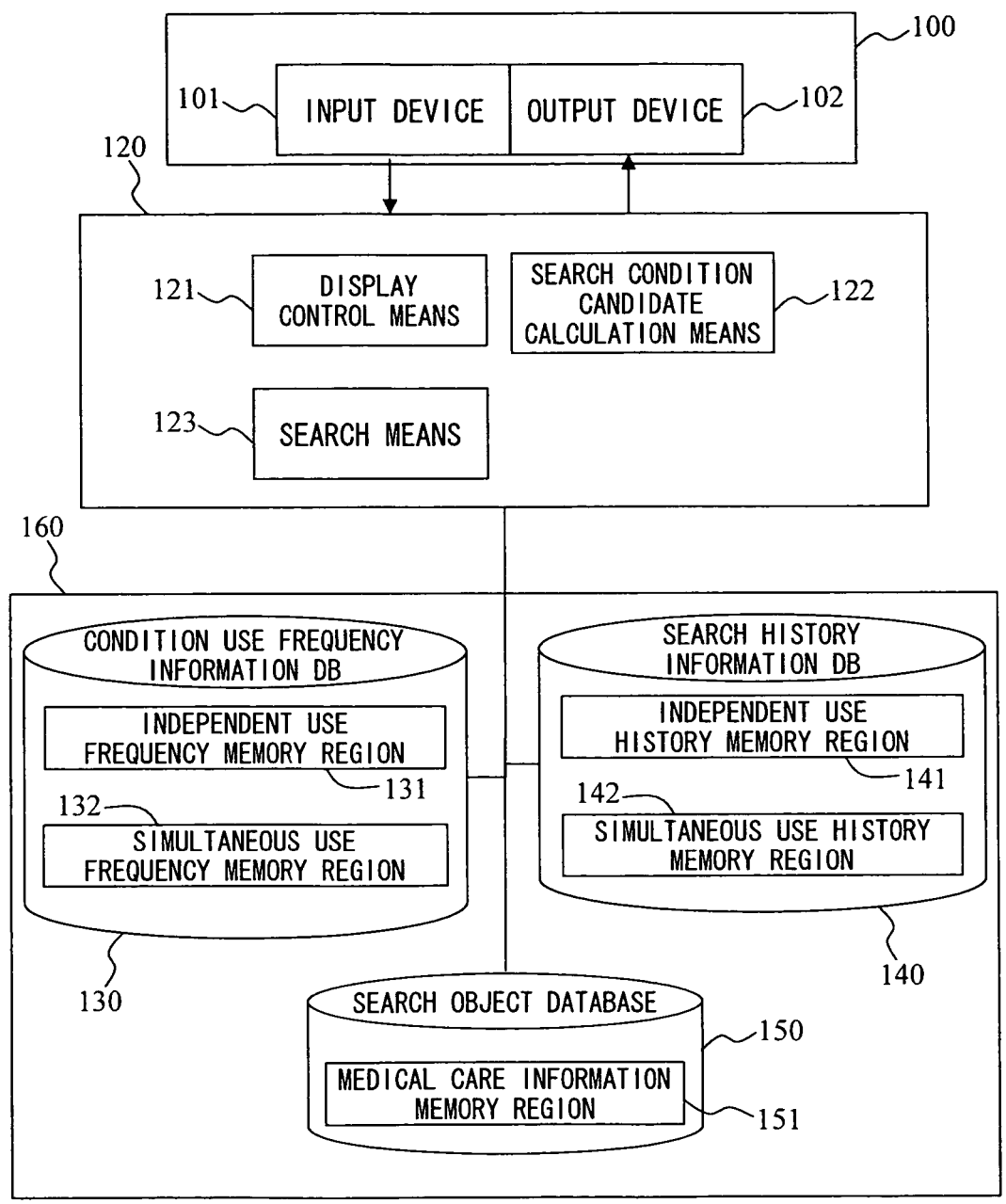
FIG. 1 shows a block diagram of an example of system configuration of an embodiment of the invention.

FIG. 1 shows an example of the system configuration for realizing the support for the setting of a search condition according to the present embodiment. This search condition setting support system includes an input/output device 100, an arithmetic device 120 for calculating search results or condition setting support information, and a database 160.

The input/output device 100 includes an input device 101 for conveying a search condition setting operation, such as the selection of a search condition or the dragging by a computer mouse, to the inside of the system. The input/output device 100 also includes an output device 102 for displaying search results or search condition support information in accordance with changes in the internal state of the system. The arithmetic device 120 includes a display control means 121 for displaying condition setting support information on the screen, a calculation means 122 for calculating a recommendation level based on a screen state, and a search means 123 for actually conducting a search in accordance with the search condition set by the user. The database 160 includes a condition use frequency information database 130 for storing basic information about individual search conditions or the relationships between search conditions, a search history information database 140 for storing a search history of each user, and a search object database 150 for storing search objects that are referenced as a result of the search.

The condition use frequency information database 130 includes an independent use frequency memory region 131 and a simultaneous use frequency memory region 132. The search history information database 140 includes an individual use history memory region 141 and a simultaneous use history memory region 142.

Figure 50:
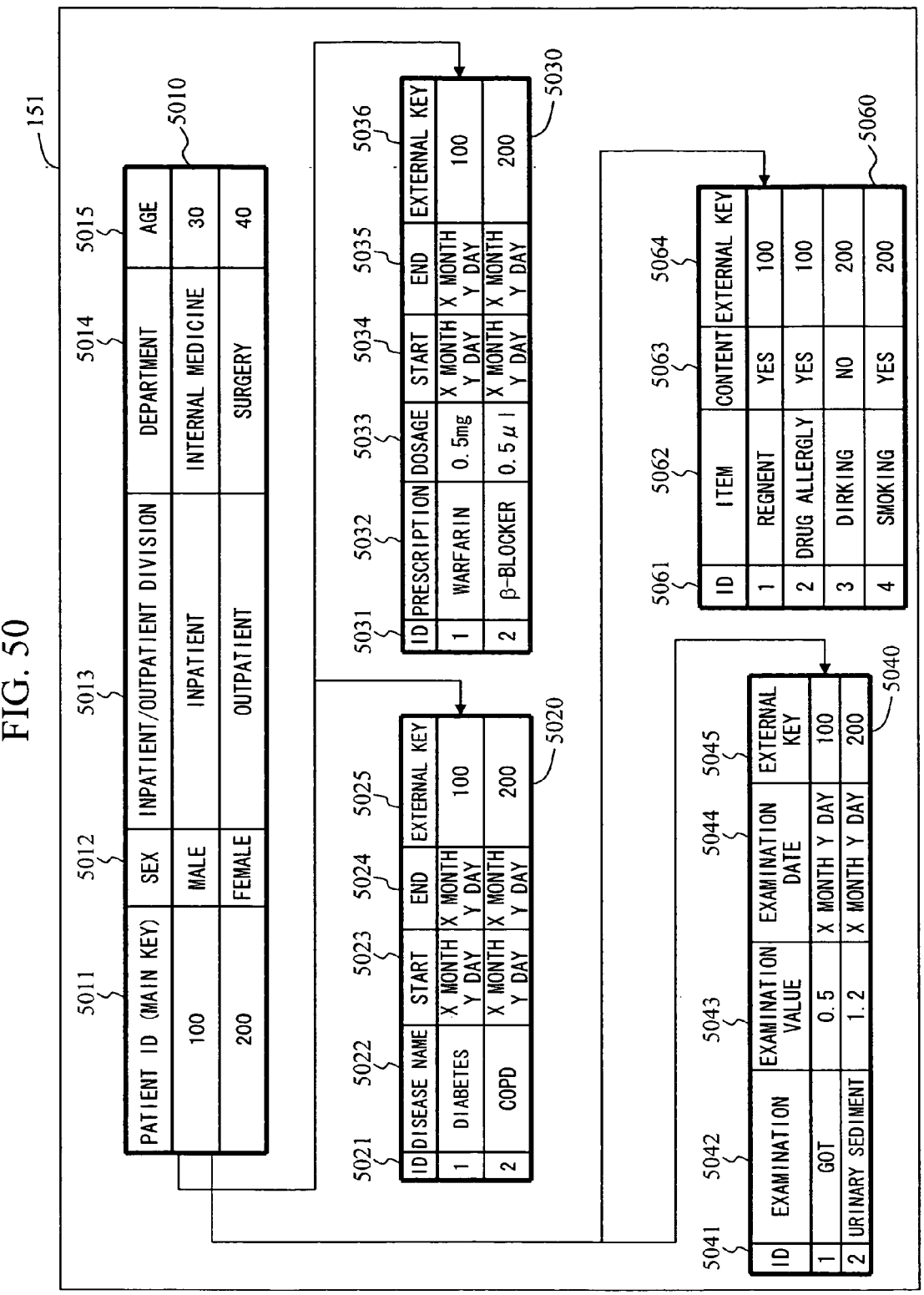
FIG. 50 shows a medical care information memory region.

The database 150 in which search objects are stored includes a medical care information memory region 151. The medical care information, which records basic information about patients, their bodily conditions and life histories, and so on, consists of items such as "disease name," "name of prescribed drug," "weight," "height," "sex," "blood type," "examined values," and "allergy information." FIG. 50 shows an example of such medical care information stored in related databases. The medical care information memory region 151 includes a patient basic information table 5010, a disease name information table 5020, a drug prescription information table 5030, an examination information table 5040, and an interview information table 5060. The patient basic information 5010 stores, in addition to patient ID 5011 that is the main key by which patients can be uniquely identified, basic information about patients, such as sex 5012, inpatient/outpatient category 5013, department 5014, and age 5015. The disease-name information table 5020 stores ID 5021 for uniquely identifying records, disease name 5022, start date of disease 5023, end date of disease 5024, and external keys 5025 by which such information and the patient basic information are associated with each other. The drug prescription information table 5030 stores ID 5031 for uniquely identifying records, prescription 5032, dosage 5033, drug prescription start date 5034, drug prescription end date 5035, and external key 5036 by which such information and the patient basic information are associated with each other. The examination information table 5040 stores ID 5041 for uniquely identifying records, examination item name 5042, examined value 5043, examination date 5044, and external key 5045 by which such information and the patient basic information are associated with each other. The interview information table 5060 stores ID 5061 for uniquely identifying records, interview item 5062, the content of such item 5063, and external key 5064 by which such information and the patient basic information are associated with each other.

The search object may consist of document information, instead of the medical care information memory region 151. When the search object is general information such as document information, the search object would be text instead of a patient. In such a case, search object region names or attribute names of a document, such as the author(s), date, or abstract, are arranged on one axis, while keywords are arranged on the other axis.

In such configuration, the search condition setting support system acquires screen operating information from the user via the input device 101. Then, a recommendation level of a search condition is calculated by the calculation means 122 based on the screen operating information, screen status information, condition use frequency information 130, and search history information 140. Finally, the output device 102 displays on the screen the search condition to be set such that the recommendation level can be reflected. Thus, in accordance with the invention, the setting of a search condition by the user can be supported.

Figure 2:
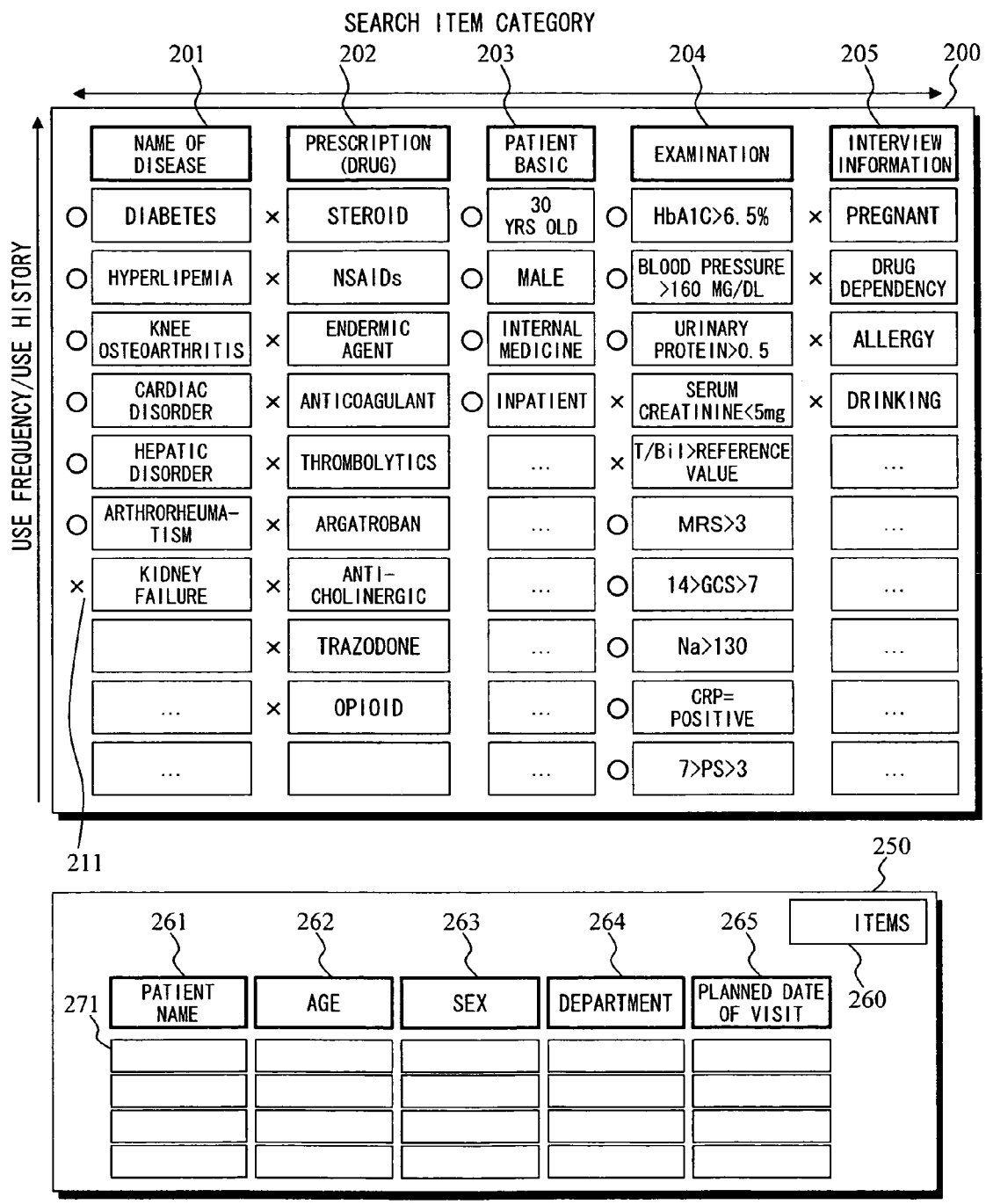
FIG. 2 shows an example of an interface for supporting the setting of a search condition.

FIG. 2 shows an interface for supporting the entry of a search condition. The interface includes an arrangement screen 200 for displaying search conditions as arranged in order. The arrangement varies in conjunction with the selection of conditions made by the user. The arrangement screen 200 includes labels at the top for indicating search condition categories, such as a disease name condition category 201, a prescription category 202, a patient basic information category 203, an examination category 204, and an interview information category 205. Below each of the search condition category labels, various search conditions are arranged along the vertical axis. To the left of each search condition, a Boolean condition setting area 211 is provided which indicates whether a condition is satisfied or not. The interface also includes a search result display screen 250 for displaying the number of relevant objects or object information in conjunction with the conditions set by the user. The search result display screen 250 is composed of the number of search results 260 and a search result list 271. The search result list 271 is composed of patient name 261, age 262, sex 263, department 264, and planned hospital visit date 265. FIG. 2 shows an initial screen, on which conditions are arranged in order of decreasing recommendation level, where the user has not set any conditions yet. In each of the search condition categories, upper items have higher recommendation levels.

Figure 3:
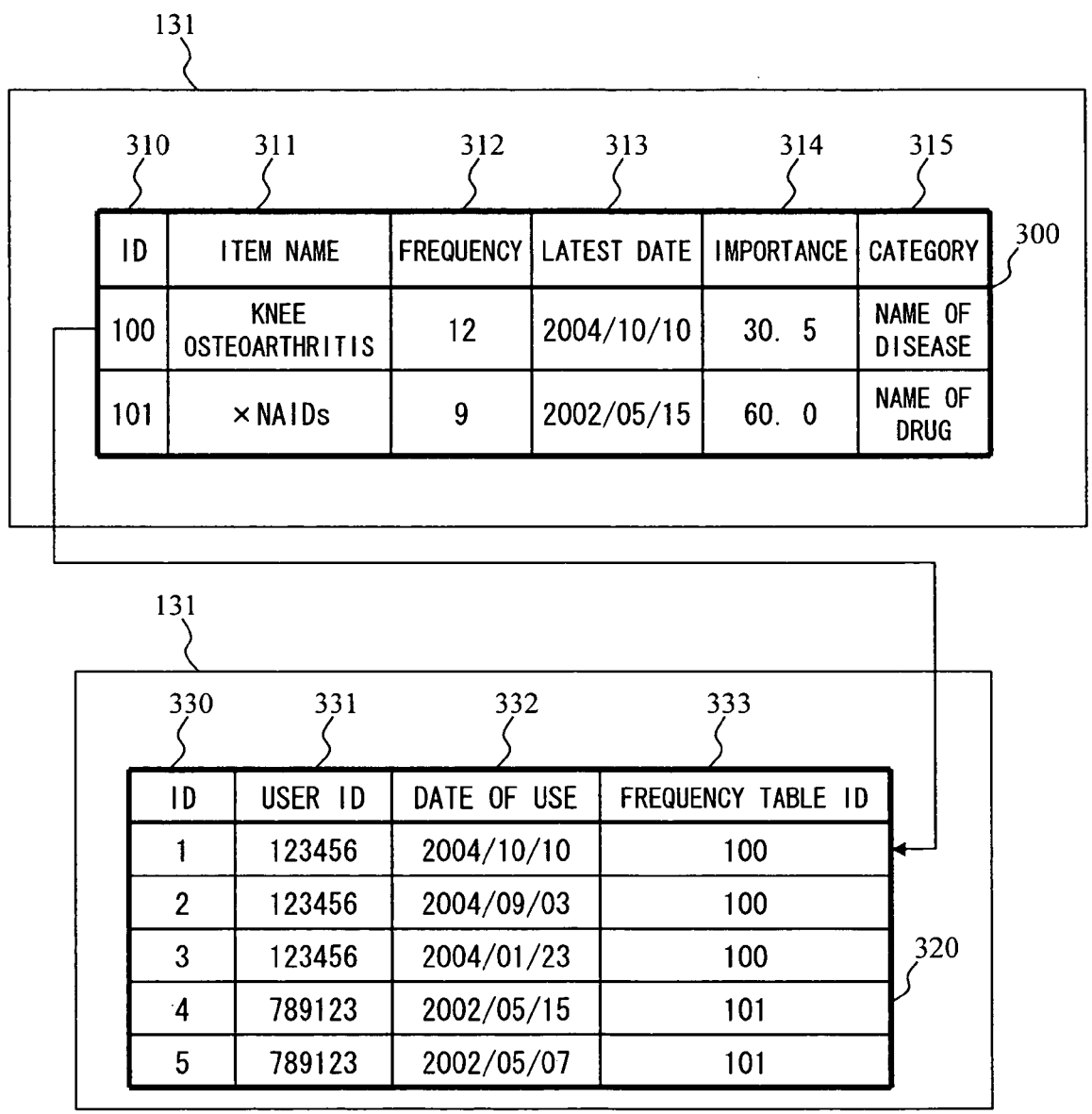
FIG. 3 shows an independent use frequency memory region and an individual use history memory region.

FIG. 3 shows a use frequency table 300 of search conditions stored in the independent use frequency memory region 131, and an individual detailed history table 320 stored in the individual use history memory region 141. The use frequency information table 300 stores an ID region 310 indicating unique IDs in the table, a search condition name region 311, a frequency region 312 indicating the frequency of use of a relevant item, a latest use date region 313, an importance region 314 having a range of 0 to 100, and a category region 315 indicating the type of search condition. The "frequency" herein refers to the number of times that search keys, such as "diabetes," "male," "30 years old," have been designated by the user. The "importance" herein refers to a value manually designated by the user based on his or her knowledge of a relevant field.

The individual detailed history table 320 stores an ID region 330 indicating unique IDs in the table 320, a user ID region 331, a use date 332 storing detailed use histories, and an external key region 333 for recording information about with which record in the item-by-item use frequency information table 300 each record in the table 320 is related.

By arranging search conditions in order of decreasing values in the frequency region 312 or the importance region 314 of the use frequency table 300, it becomes possible to rank the search conditions in the initial state. Within the arrangement screen 200, in the column of which category a search condition is to be arranged is determined by referring to the category region 315. Further, by referring to the use date in the individual detailed history table 320, search conditions can be ranked based on how recent the use date is. A method for calculating the recommendation level will be described with reference to FIG. 4.

Figure 4:
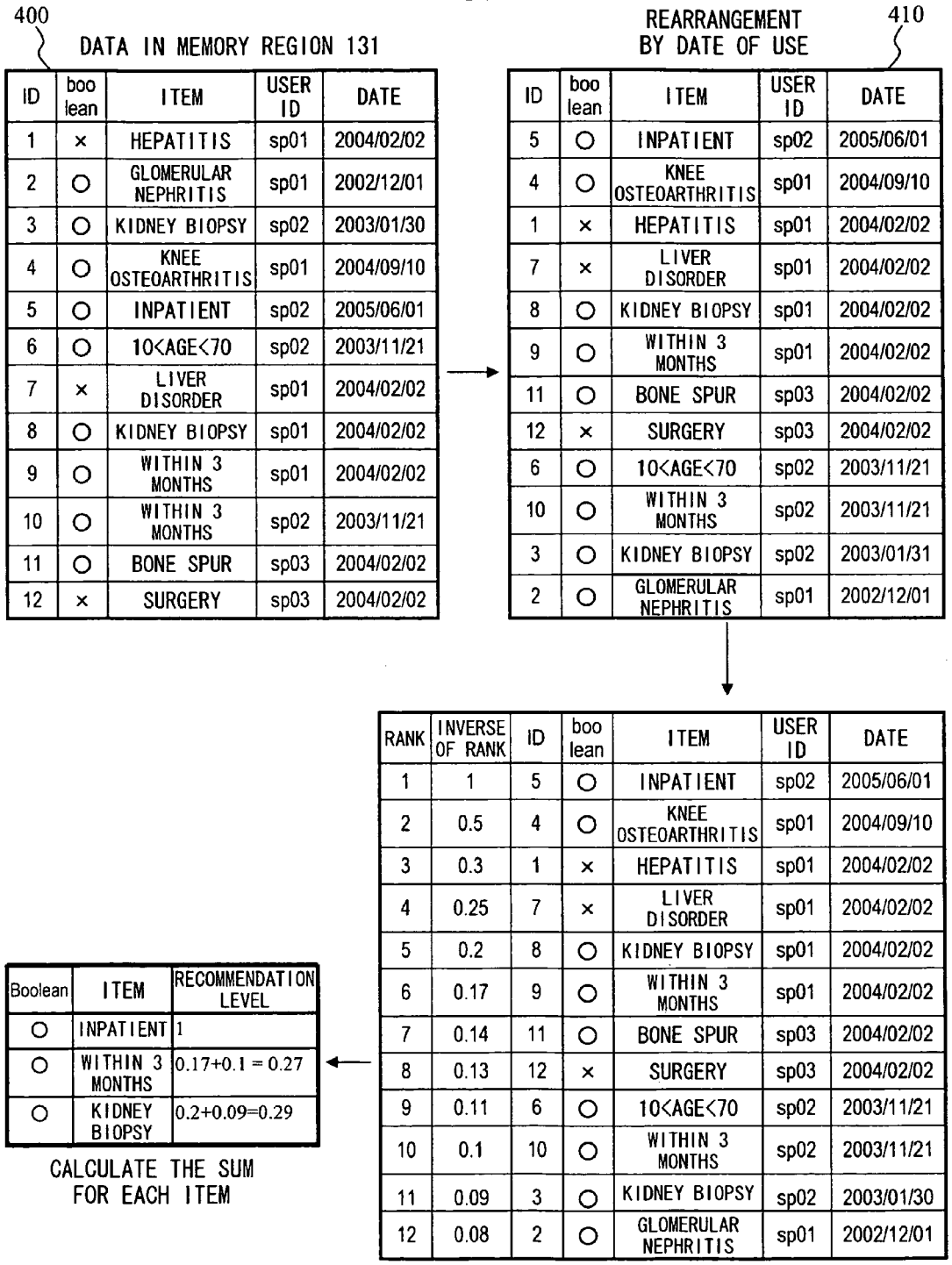
FIG. 4 shows a technique for calculating a recommendation level using information in the individual use history memory region.

FIG. 4 shows a technique for calculating a recommendation condition by referring to the use history of the search condition. A table 400 shows an example of the individual detailed history table 320 of FIG. 3. The detailed history table has a column indicating the use date. Thus, the items are initially rearranged according to use date, with latest dates first (table 410). Then, the likelihood of each item is calculated in accordance with the following equation:

$$\text{Likelihood} = 1/\text{rank} \tag{1}$$

According to Equation (1), conditions with later use dates have greater values of likelihood. Since in the detailed history table 400 the same items with different use dates appear a number of times, a sum of the likelihoods obtained by Equation (1) is calculated in accordance with the following equation:

$$\text{Recommendation level for condition } A = \Sigma_{condition=A} \text{Likelihood} \tag{2}$$

Using the value of Equation (2), it becomes possible to rank the search conditions to be set in consideration of both how late the use date is and how high the use frequency is.

FIG. 5 shows a condition setting co-occurrence information table 500 recorded in the simultaneous use frequency memory region 132. The condition setting co-occurrence information table 500 stores: an ID region 510 for identifying each record; a Boolean region 511 for setting a select/eliminate condition; a search condition name region 512; a category region 513 indicating the type of search condition; a second Boolean region 514 for setting a select/eliminate condition; a second search condition that is in a co-occurrence relationship with the first search condition; a category region 516 indicating the type of the second search condition; a co-occurrence relationship importance region 517; and a co-occurrence relationship frequency region 518. By referring to the importance 517 of the present table or the value of the co-occurrence frequency 518, it becomes possible to present conditions as ranked according to the likelihood of their use in combination with the search condition set by the user. The "importance" that is registered between "VAS>30" and "male," for example, herein is indicated by a value manually designated by the user, based on the knowledge that "VAS>30" is related to the sex "male" in the particular field. The "co-occurrence frequency" between "VAS>30" and "male," for example, indicates the number of times that "VAS>30" and "male" have been simultaneously designated by the user as search conditions.

Figure 6:
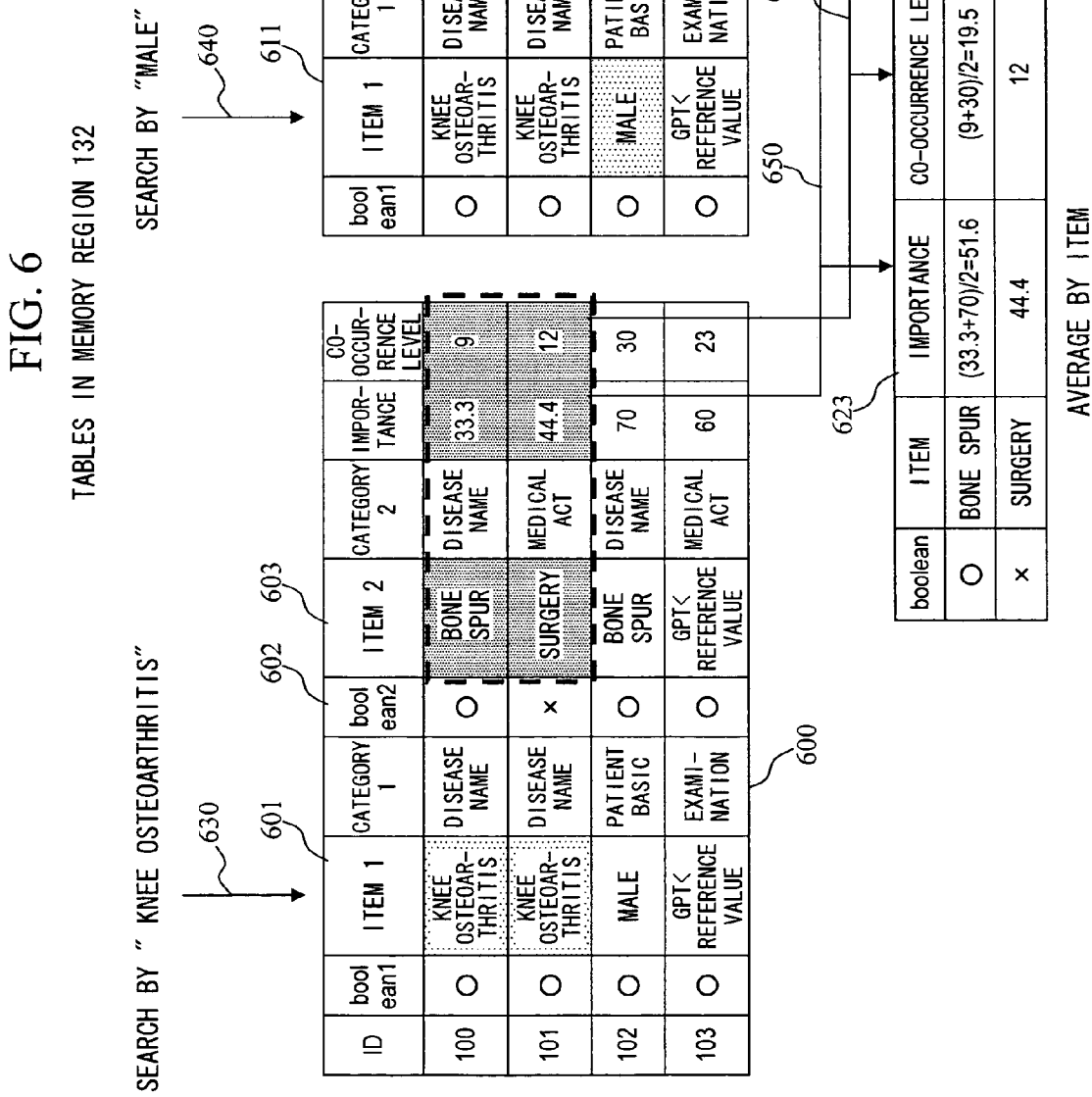
FIG. 6 shows a technique for calculating a recommendation level using information in the simultaneous use frequency memory region.

FIG. 6 shows an example of a method for calculating the likelihood of a search condition using the condition setting co-occurrence information table 500. The tables 600 and 610 are examples of the condition setting co-occurrence information table 500. It is assumed here that the user has set "knee osteoarthritis" and "male" as search conditions. First, the condition setting co-occurrence information table 500 is searched for records whose values in the first search condition name region 601 indicate "knee osteoarthritis" (process 630). Similarly, the table is searched for records whose values in the search condition name region 611 indicate "male" (process 640). Then, a likelihood table 620 is created for a pair of the second Boolean regions 602 and 612 and for a pair of the second search condition name regions 603 and 613 in each record. The likelihood table 620 includes importance 623 in which a mean value of the importance region 604 is stored (process 650), and a co-occurrence frequency 624 in which a mean value of the frequency region 605 is stored (process 660).

For example, regarding the item "bone spur," the importance obtained from the table 600 is 33.3, while the importance obtained from the table 610 is 70. Thus, the importance of "bone spur" when the user has set "knee osteoarthritis" and "male" as search conditions is obtained by finding the mean of the both values, namely, (33.3+70)/2=51.6. The co-occurrence frequency is similarly obtained such that (9+30)/2=19.5. By these calculations, it becomes possible to calculate the recommendation level of a recommended search condition (such as "bone spur") when the user has set search conditions.

FIG. 7 shows a search condition co-occurrence history table 700 stored in the simultaneous use history memory region 142. The search condition co-occurrence history table 700 stores: an ID region 710 for uniquely identifying records; a first Boolean region 711; a first search condition name region 712; a category region 713 indicating the type of a first search condition; a second Boolean region 714; a second search condition name region 715; a category region 716 indicating the type of the second search condition; a user region 717 for the user who did the condition setting; and an implementation date region 718. By referring to the implementation date region 718 of the present table, the search conditions can be ranked by a measure that reflects the use date.

FIG. 8 shows a technique for calculating a recommended condition by referring to the search condition history table 700. The table 810 is an example of the search condition co-occurrence history table 700. The following description is that of a sequence for calculating the recommendation level of each condition in a case where the user has already set "knee osteoarthritis" and "male" as search conditions. First, from the example 810 of the search condition co-occurrence history table, records of which the Boolean region 811 is allocated a circle and of which the item region 812 is "knee osteoarthritis" are searched for (process 815). Similarly, records of which the Boolean region 811 is allocated a circle and of which the item region 812 is "male" are searched for (process 815). The search results are shown in a table 820.

Then, the table 820 is rearranged according to the date in the implementation date region 818 with latest dates at the top, (process 825), thereby obtaining a table 830. According to the rank in the table 830 and using Equation (1), the likelihood is calculated for each record. According to Equation (1), the newer the use date of the condition is, the greater the value of the likelihood becomes. In the table 820 of search results, the same conditions with different use dates appear a number of times. Therefore, a sum of likelihoods calculated by Equation (2) is calculated for each condition (process 835) so as to obtain the values of recommendation levels, which are shown in a likelihood table 840 that is created. By using Equation (2), it becomes possible to rank the conditions by calculating the recommendation level of search conditions in consideration of both how late the use date is and how high the use frequency is.

Figure 9:
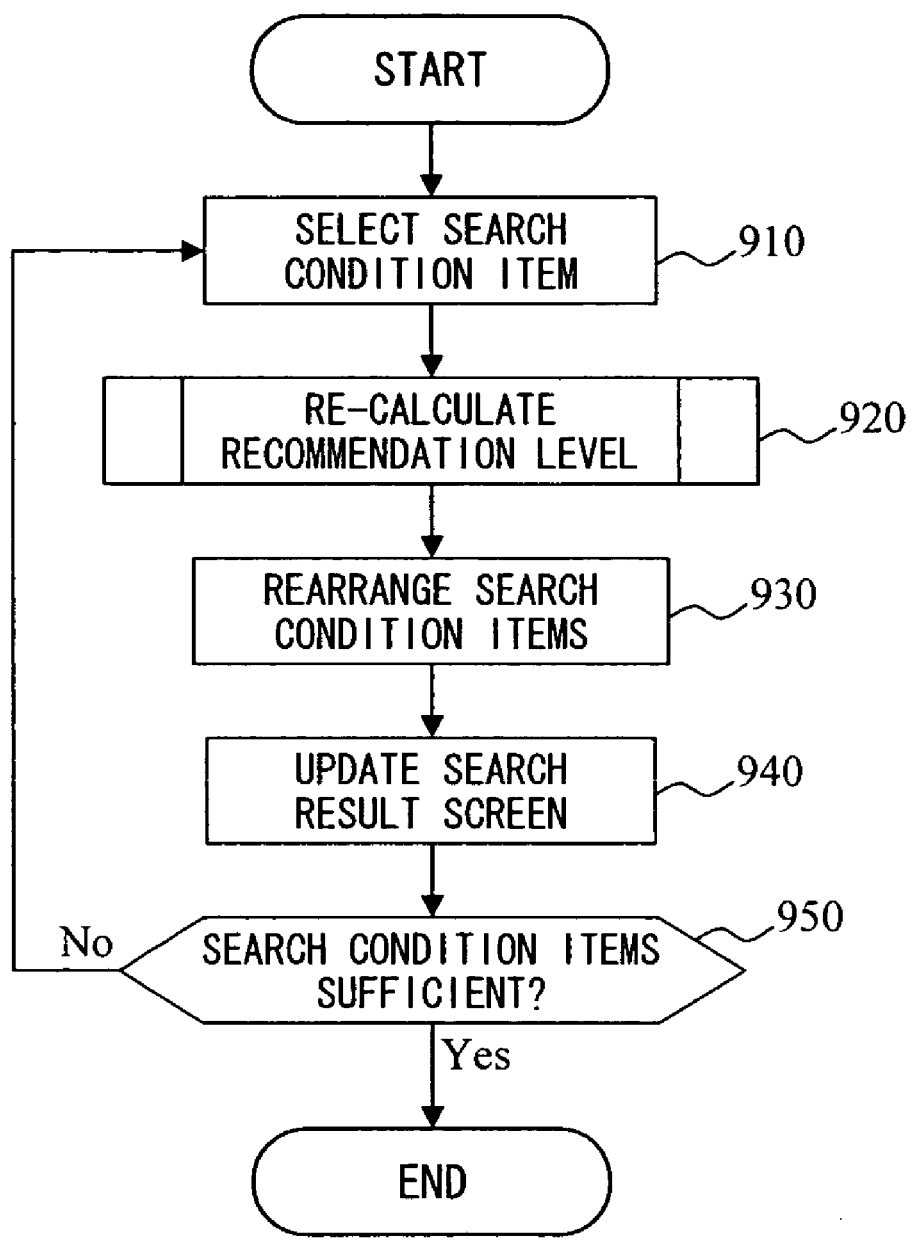
FIG. 9 shows a flowchart of a process sequence for supporting the setting of a search condition.

FIG. 9 shows a flowchart of a process for supporting the setting of a search condition. The user, while referring to the search conditions arranged in order of recommendation levels calculated by referring to FIGS. 4, 6, and 8, selects any of the search conditions (step 910). Then, the system, under the condition where a search conditions has been selected by the searcher, re-calculates the recommendation levels of other search conditions (step 920), and then rearranges the search conditions according to each of the categories 201 to 205 (step 930). Examples of the rearranging method include one whereby the conditions are arranged in order of decreasing/increasing recommendation level, and another whereby the conditions are arranged in order of decreasing similarity to the condition selected by the searcher. In conjunction with the selection of the search condition, the system updates the display of search results (step 940). Thereafter, the searcher, while referring to the search results in some cases, determines whether or not an additional search condition should be incorporated (step 950). If the searcher determines that the setting of a search conditions is insufficient, the routine returns to step 910, and repeats the setting of search conditions. If it is determined at step 950 that the selection of conditions is sufficient, the setting process is terminated (step 980). In accordance with this method, it becomes possible to recommend search conditions by arranging those conditions with higher recommendation levels at conspicuous positions, in conjunction with the search condition that has been set.

Figure 10:
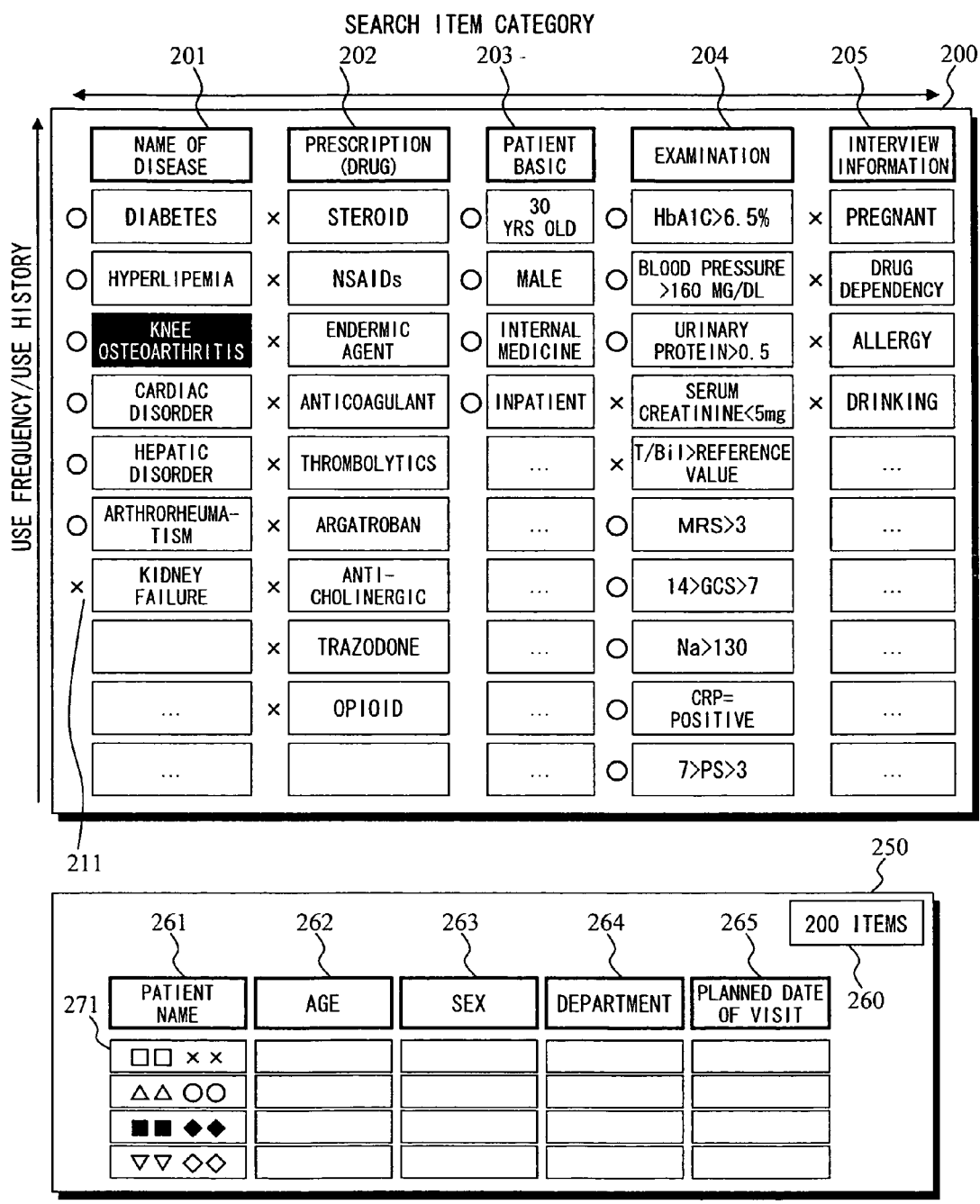
FIG. 10 shows an example of screen display.
Figure 11:
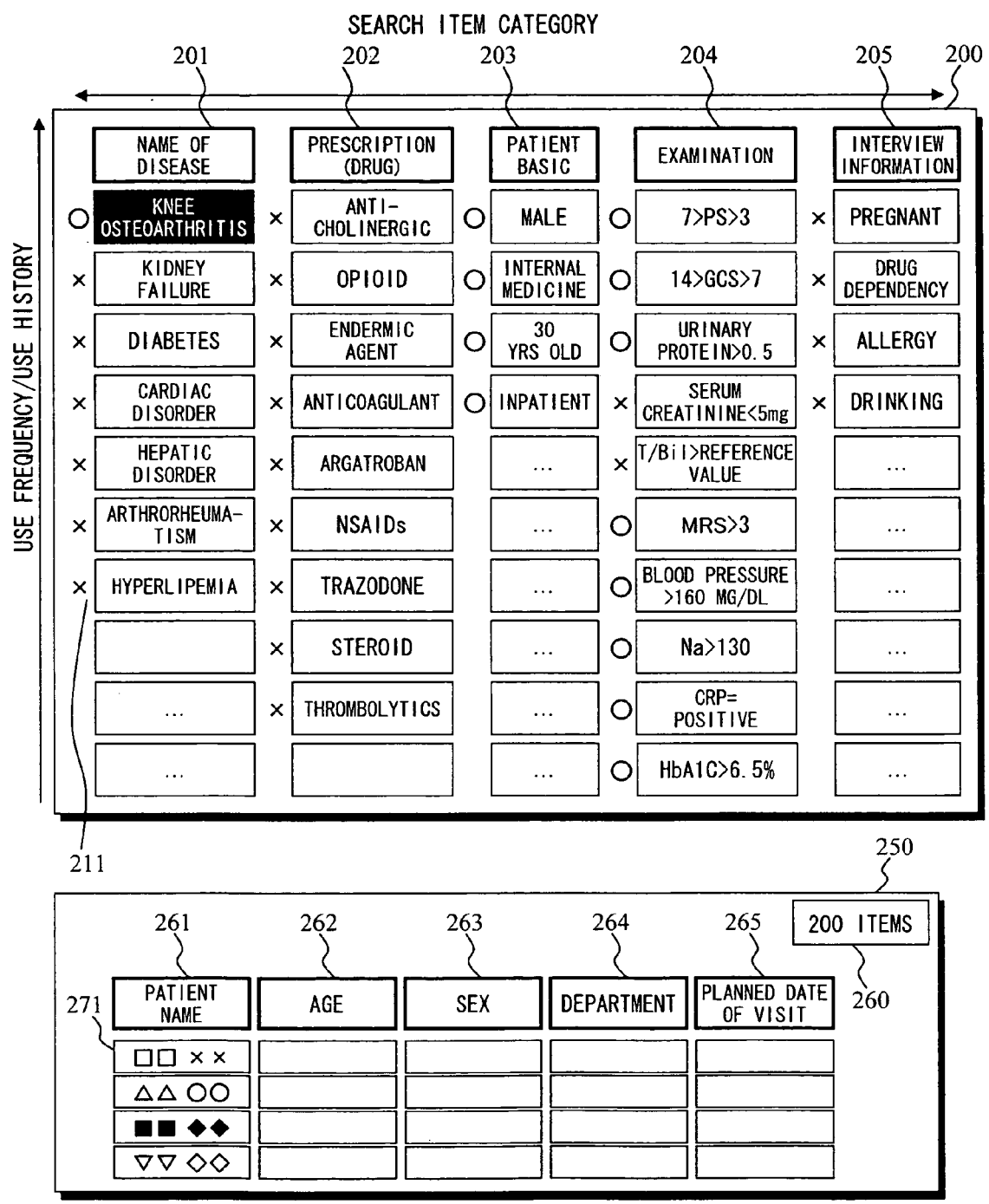
FIG. 11 shows an example of screen display.

Hereafter, the specific flow of operations will be described with reference to FIGS. 10 to 14. FIG. 10 shows a screen after a disease name candidate has been selected on the initial screen shown in FIG. 2. In the illustrated example, "knee osteoarthritis" with the third priority is selected. The selected item is displayed in reverse, thus indicating that it has been selected. FIG. 11 shows a state in which, after the selection of a condition in FIG. 10, the priority ranking of the search conditions has been rearranged. First, the selected disease name "knee osteoarthritis" is moved to the top in the column of disease name category 201. The order of the disease name category arranged below indicates the names of diseases that are likely to be set with the "knee osteoarthritis." Normally, a plurality of disease names are not designated as conditions simultaneously. Therefore, those with Boolean condition 211 "x" are arranged toward the top. Namely, they show the condition that they are "not . . . disease." As to the prescription category 202, too, the order is reversed between FIGS. 10 and 11 as a result of the selection of "knee osteoarthritis." Those items that are likely to be set simultaneously with "knee osteoarthritis" as prohibited drug are arranged toward the top. In the column for patient basic information 203, items with "male" indicating the sex are moved to the top. In addition, items with "internal medicine" indicating the department are moved to the top.

Figure 12:
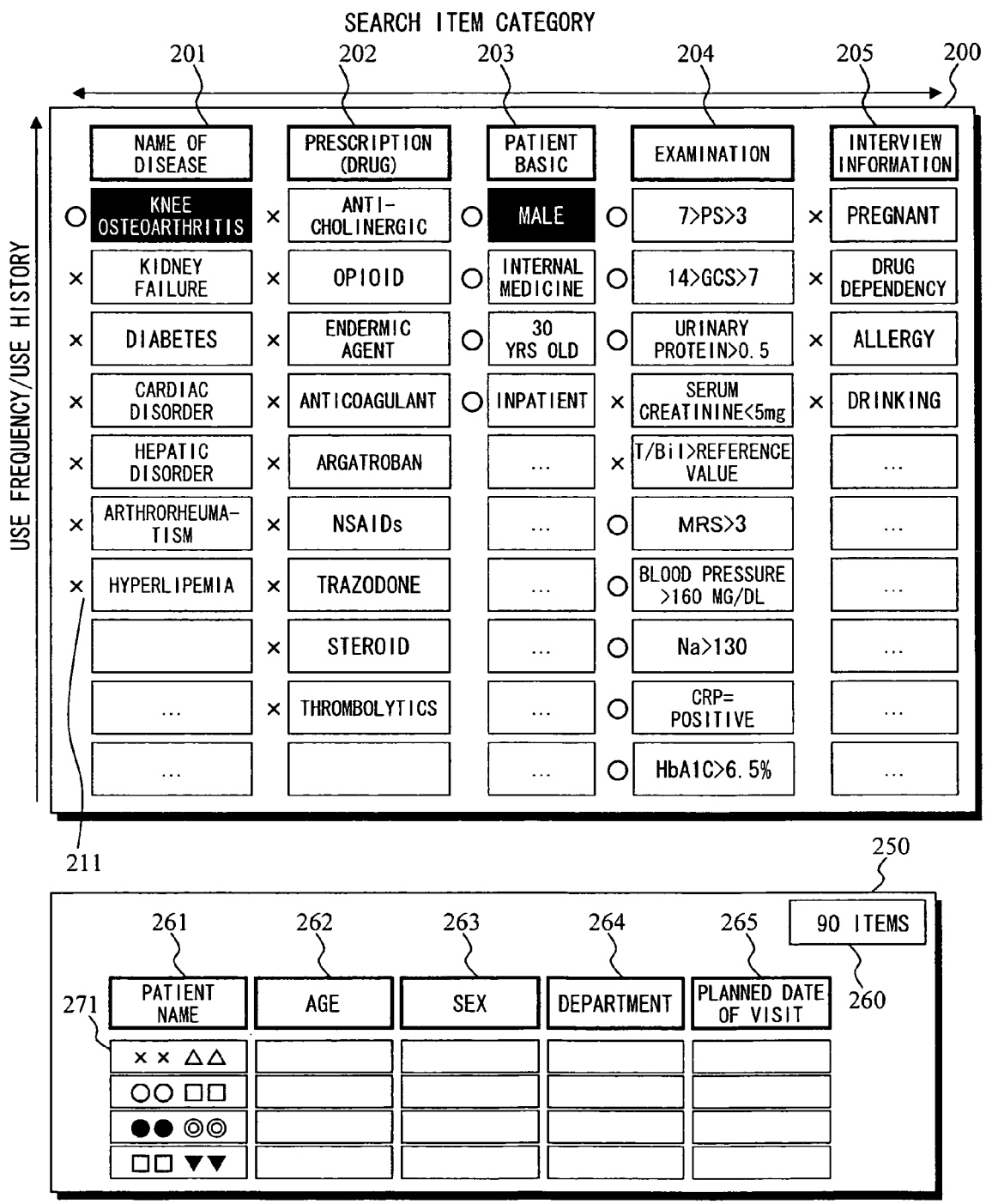
FIG. 12 shows an example of screen display.
Figure 13:
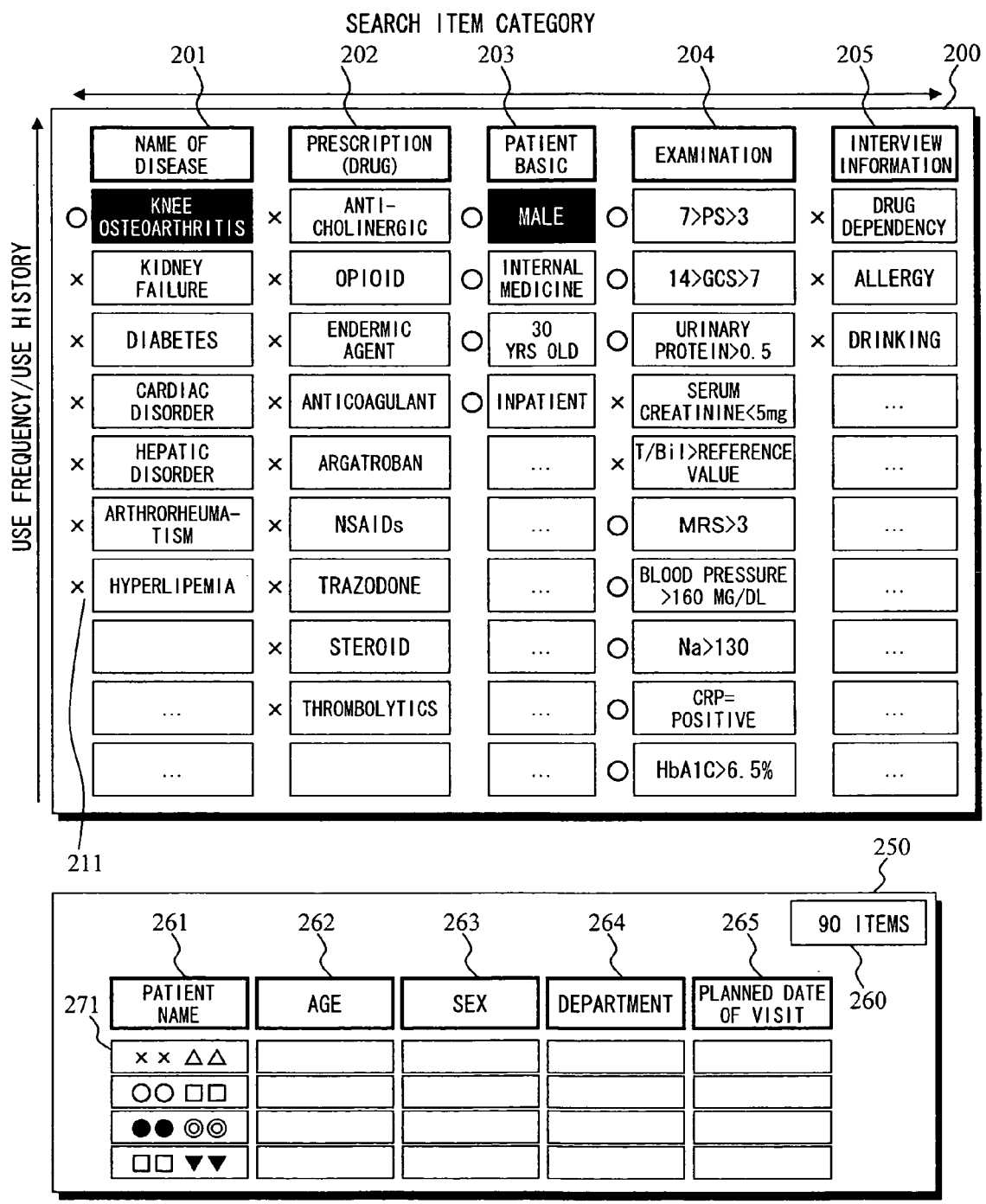
FIG. 13 shows an example of screen display.
Figure 14:
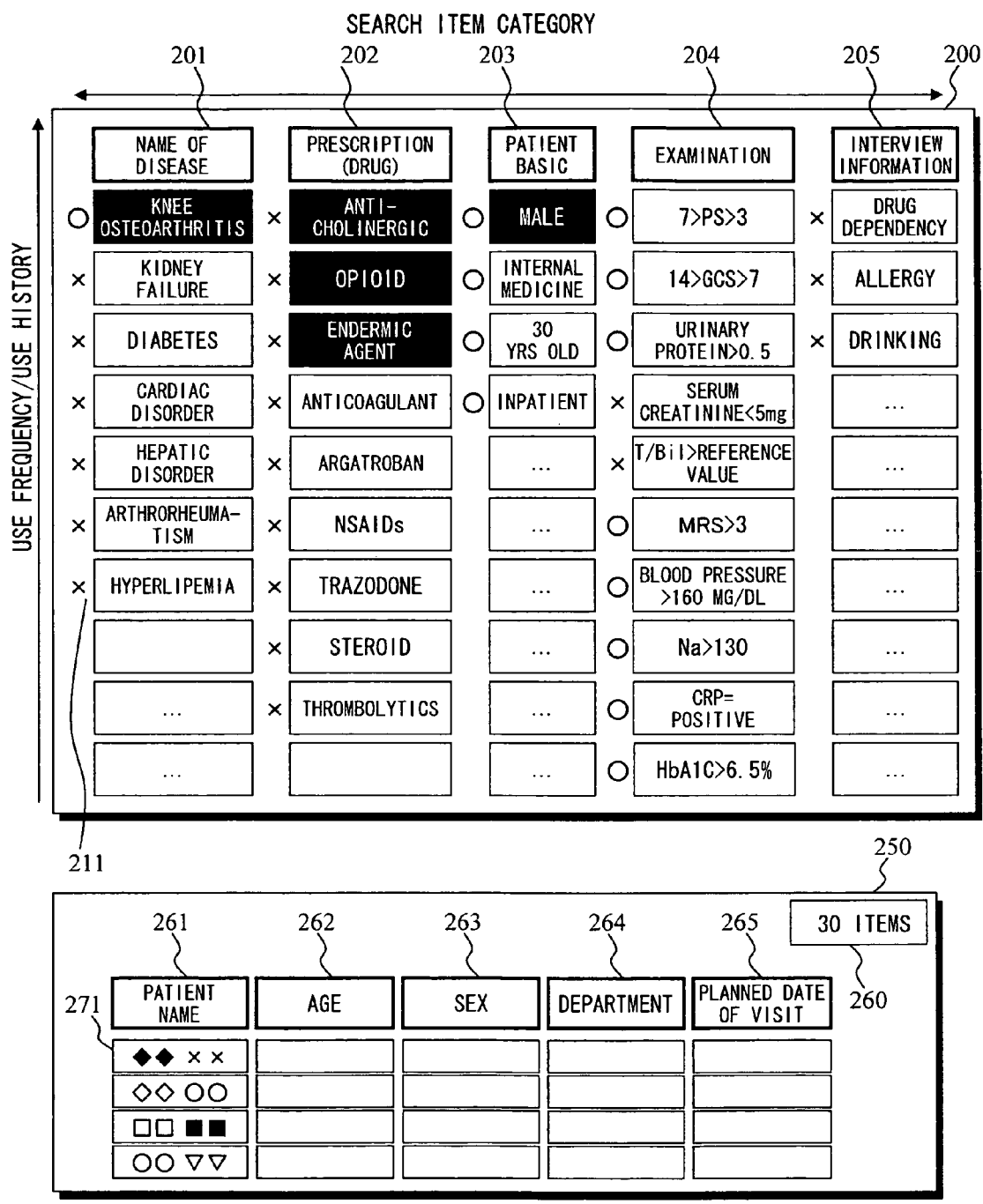
FIG. 14 shows an example of screen display.

FIG. 12 shows a state in which the sex information "male" has been selected from the column for the patient basic information 203, in addition to the disease name "knee osteoarthritis." Together with the previously selected disease name "knee osteoarthritis," the selected condition is displayed in reverse, thus indicating that it has been selected. FIG. 13 shows a state in which, after the selection of the condition in FIG. 12, the order of priority ranking of the search conditions has been rearranged. Namely, the conditions are rearranged such that, for each of the disease name category 201, prescription category 202, patient basic information category 203, examination category 204, and interview information category 205, those conditions are moved to the top that are likely to be set simultaneously when the disease name is "knee osteoarthritis" and the sex is "male." FIG. 14 shows a state in which, based on the screen of FIG. 13, "anticholinergic agent," "opioid," and "endermic agent" have been selected from the prescription category 202 as prohibited drugs.

In accordance with the invention, using the above-described interface, the process of setting search conditions can be supported by rearranging conditions such that those with higher recommendation levels are arranged toward the top.

Figure 15:
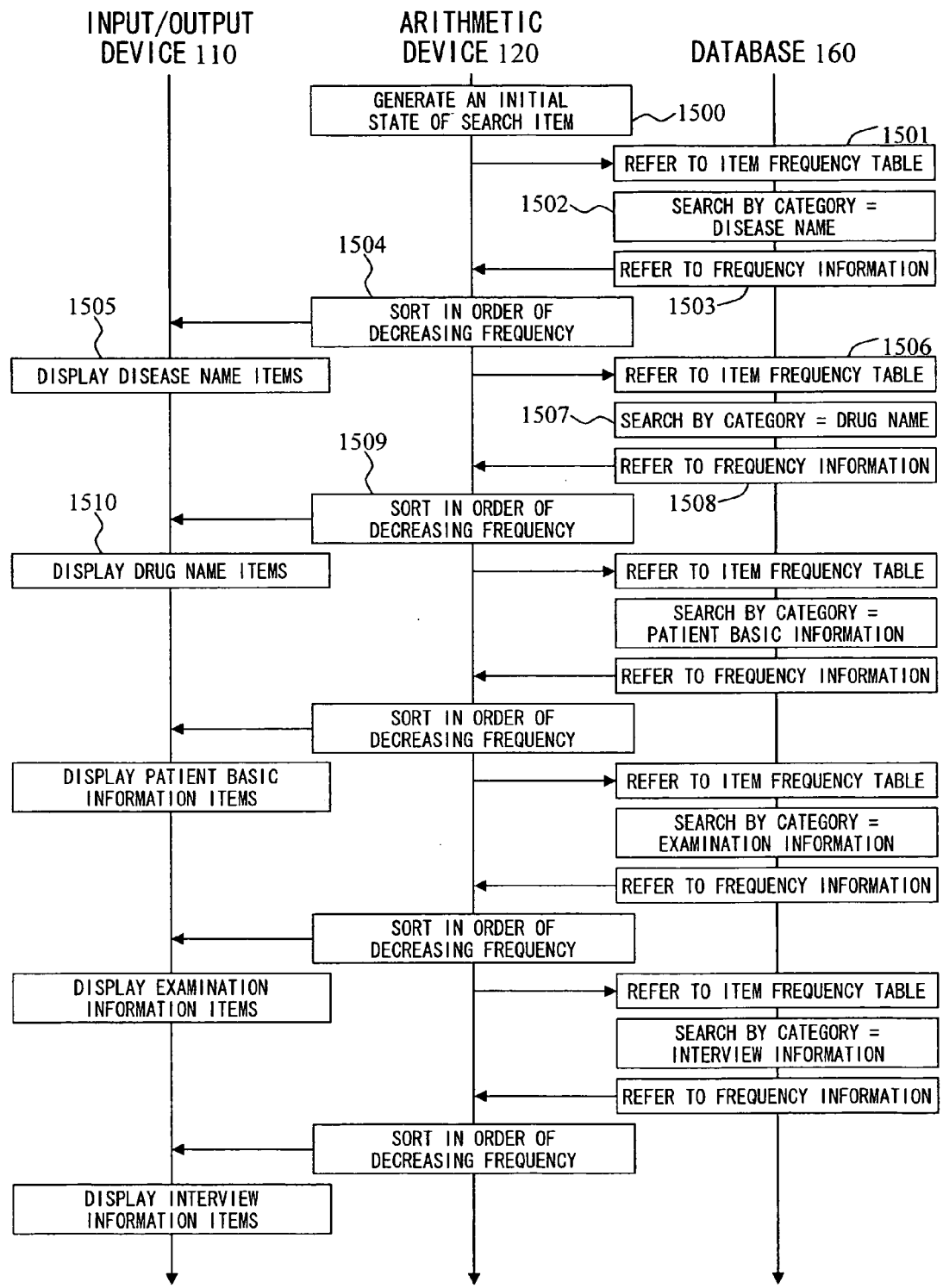
FIG. 15 shows a sequence chart up to the time when an initial screen is displayed.
Figure 16:
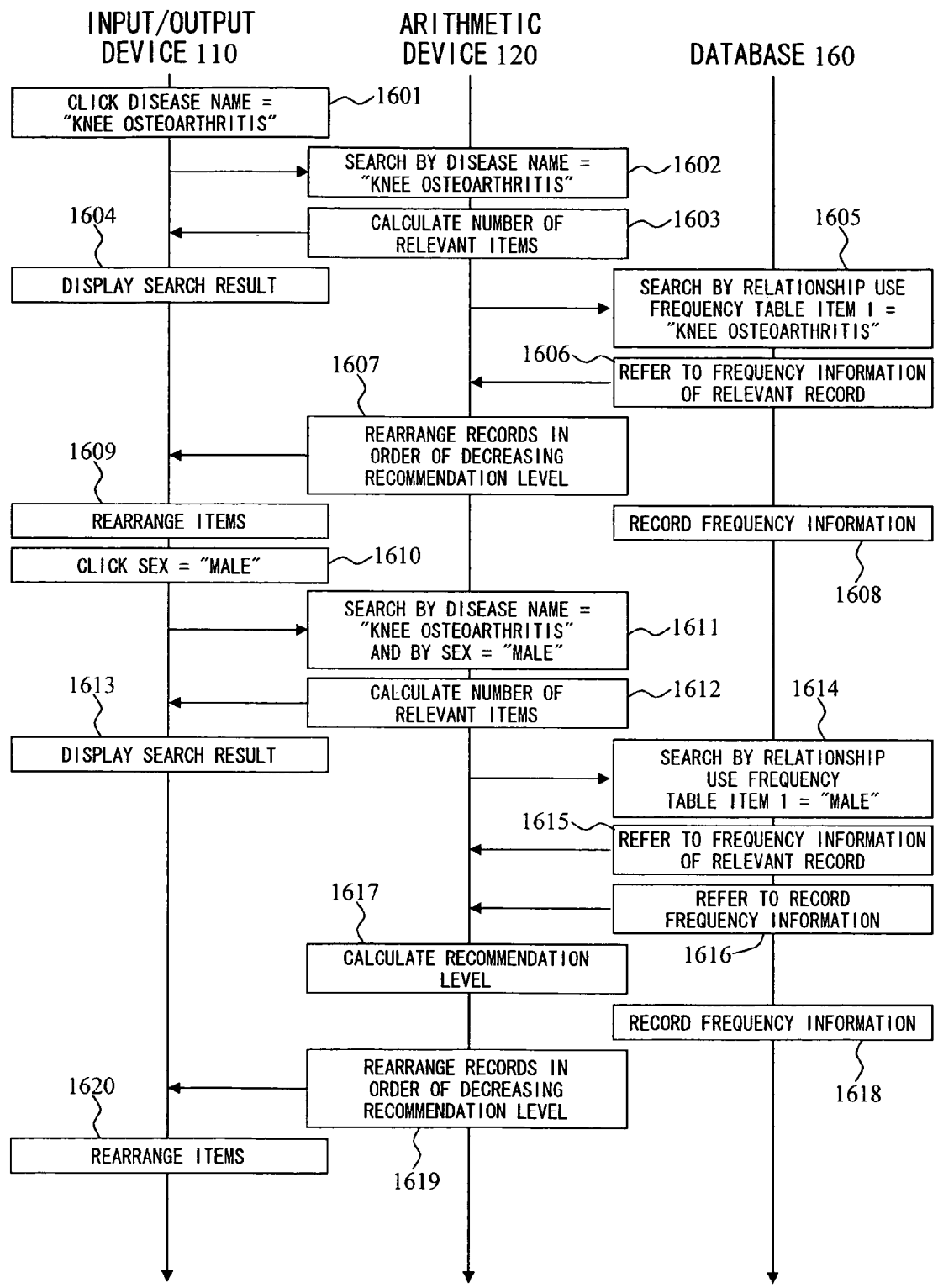
FIG. 16 shows a sequence chart of a process whereby a user sets a search condition.

FIGS. 15 and 16 show sequence charts illustrating a series of operations. FIG. 15 shows processes performed between the input/output device 100, arithmetic device 120, and database 160 before the initial screen is displayed. First, the arithmetic device 120 starts to generate an initial state of a search item (step 1500). The arithmetic device 120 initially refers to the content of the item frequency information table 300 in a database (step 1501), and then searches for records whose values in the category region 315 indicate "disease name" (step 1502). Then, the values in the frequency region 312 of the records are referred to (step 1503), and the records are rearranged in order of frequency (step 1504). The input/output device 100 then receives the result of step 1504, and locates the disease name in the column of the disease name category. Similarly, the content of the item frequency information table 300 is referred to (step 1506), and records whose value in the category region 315 indicates "drug name" are searched for (step 1507). Thereafter, the values of the records in the frequency region 312 are referred to (step 1508), and the records are rearranged in order of frequency (step 1509). The input/output device 100 receives the result of step 1509, and locates the drug name in the column of the drug name category. The same procedure is repeated for the categories for the patient basic information 203, examination information 204, and interview information 205, whereby the initial screen is generated.

FIG. 16 shows processes performed between the input/output device 100, arithmetic device 120, and database 160 during the selection of a condition. In the illustrated example, the user first selects "knee osteoarthritis" from the disease name category 201 (step 1601). The thus selected condition is conveyed to the arithmetic device 120, which then searches the search object data under the condition "disease name=knee osteoarthritis" (step 1602). After the calculation of the number of relevant items is completed (step 1603), the result is returned to the input/output device 100, and the number of items and a result list are displayed (step 1604). At the same time, the arithmetic device 120 inquires the database 160 and searches for records of which item 1="knee osteoarthritis" in the condition setting co-occurrence information table 500 (step 1605). The values in the importance region 517 or the frequency region 518 of the records are referred to (step 1606), and then the recommendation level as described with reference to FIG. 6 is calculated. Then, items 2 (search condition name 515) in the condition setting co-occurrence information table are rearranged (step 1607). The arithmetic device 120 then returns the second Boolean information 514, search item information 515, and category information 516 of the records to the input/output device 100. In order to store the search results, the frequency information is recorded (step 1608). The input/output device 100 arranges the conditions in appropriate category columns in order of the recommendation levels of the search conditions received from the arithmetic device 120 (step 1609).

The user, while referring to the thus rearranged search conditions, selects a next condition. In the illustrated example, the sex in the patient basic information is set to "male" (step 1610). The arithmetic device 120, in response to the setting of a condition by the user, searches the search object data under the condition that "disease name"="knee osteoarthritis" and that "sex"="male" (step 1611). The number of relevant items is calculated (step 1612), and the result is returned to the input/output device 100, and the number of items and a result list are displayed (step 1613). At the same time, the arithmetic device 120 inquires the database 160 and searches for records of which item 1 in the condition setting co-occurrence information table 500 is "male" (step 1614). By referring to the value in the importance region 517 or the frequency region 518 of the relevant records (step 1615), and to the values recorded at step 1608 (step 1616), the recommendation levels are calculated as described with reference to FIG. 6 (step 1617). Based on the calculated result, items 2 of the condition setting co-occurrence information table 500 are rearranged (step 1619). Further, the frequency information is recorded (step 1618). The input/output device 100 then arranges the conditions in appropriate category columns in order of the recommendation levels of the search conditions received from the arithmetic device 120 (step 1620).

Embodiment 2

Figure 17:
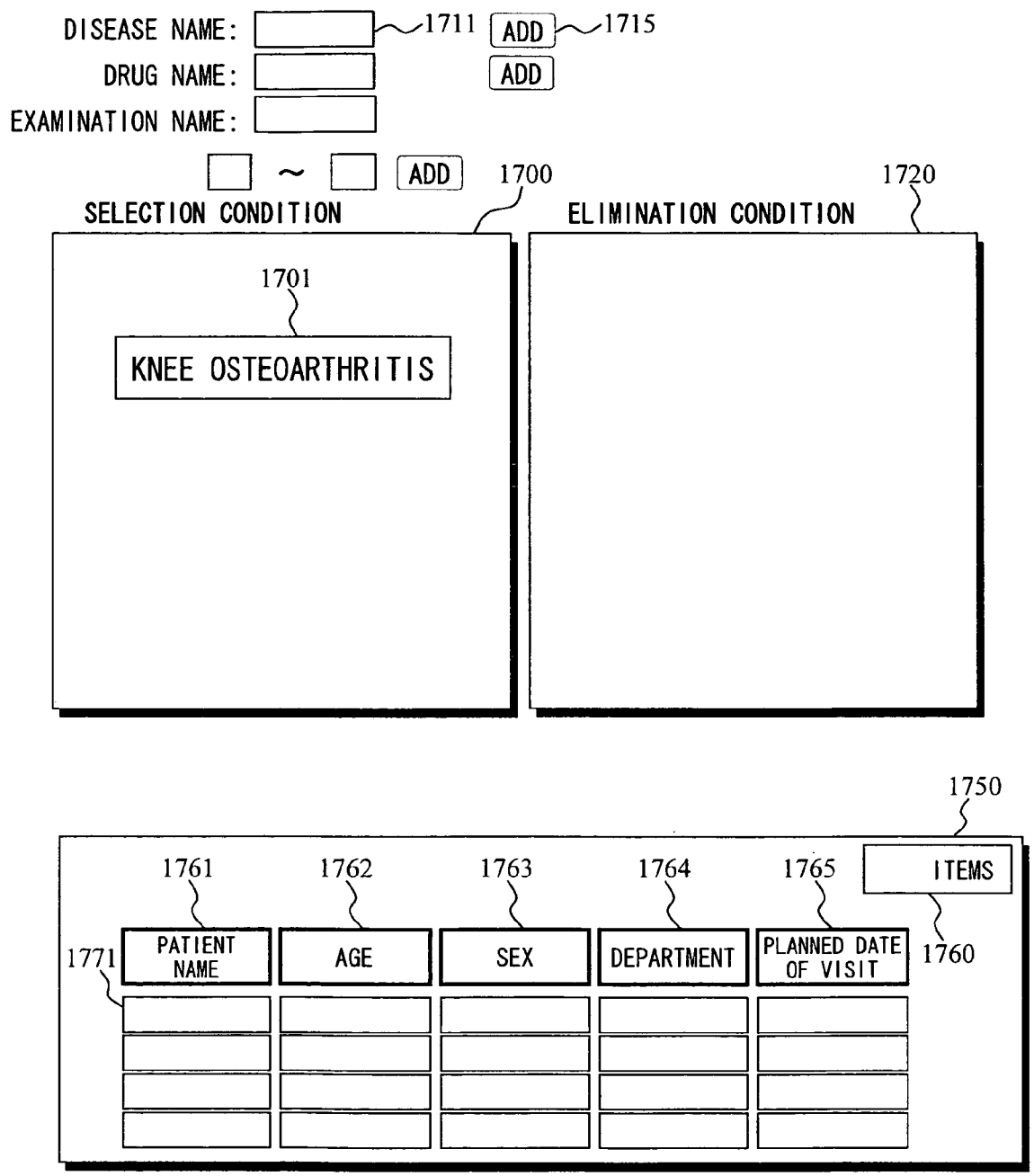
FIG. 17 shows another example of the interface for supporting the setting of a search condition.

FIG. 17 shows an interface for supporting the selection of search conditions by two-dimensionally arranging search items according to a second embodiment. The configuration of the system for realizing the support for the setting of search conditions according to the second embodiment is basically identical to that of Embodiment 1. The difference lies in the manner in which the display control means 121 performs display control.

In the following, the flow of a series of operations performed in the present interface will be described with reference to FIGS. 17 to 27. The interface includes a selection condition arrangement screen 1700 for arranging selection conditions, and an elimination condition arrangement screen 1720 for arranging elimination references. In the present example, knee osteoarthritis 1701 is located as a selection reference. As a method for initially locating knee osteoarthritis 1701, a condition input box 1711 is available. A disease name is entered in the input box 1711, and then an add button 1715 is clicked, whereby a disease name condition can be added. The interface further includes a search result display screen 1750 for displaying the number of relevant objects or the objects, in conjunction with the condition selected by the user. The search result display screen 1750 is composed of the number of search results 1760 and a search result list 1771. The search result list 1771 is composed of a patient name 1761, age 1762, sex 1763, department 1764, and planned hospital visit date 1765. The condition added in FIG. 17, namely, "knee osteoarthritis" 1701, is not yet selected by the user, so that nothing is displayed on the search result display screen 1750.

Figure 18:
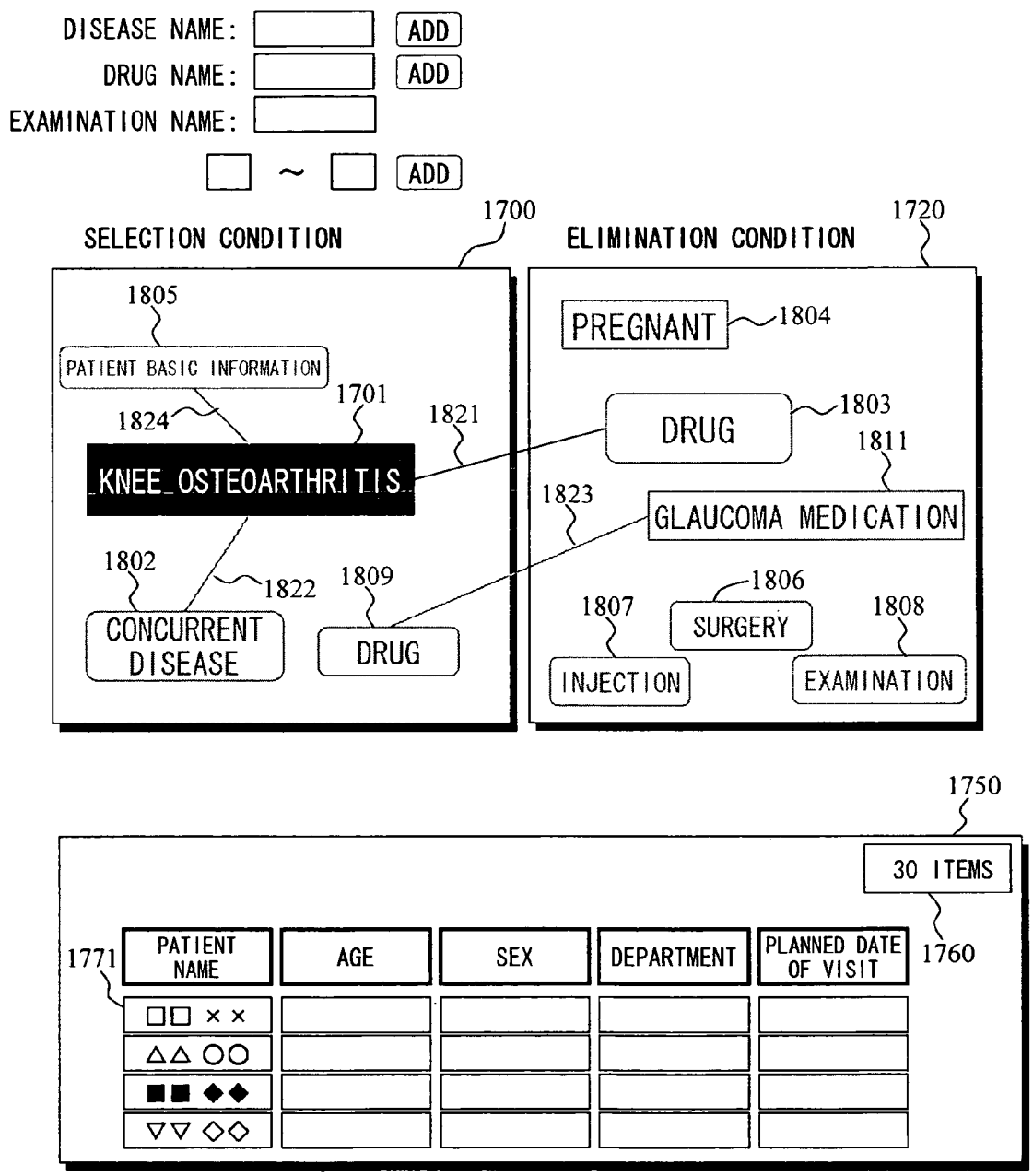
FIG. 18 shows an example of screen transition.

FIG. 18 shows a screen indicating the state in which a search condition has been selected by the user. The user clicks one 1701 of the search conditions with the mouse, and the clicked item 1701 is shown in reverse so as to indicate that it has been selected. In response to the selection, conditions 1802 to 1809 with high recommendation levels appear on the selection condition arrangement screen 1700 and on the elimination condition arrangement screen 1720 with a lighter shade. The size of the font of the conditions that appear are changed in accordance with the recommendation level. For example, the elimination condition 1803 relating to a drug indicates that its recommendation level is higher than that of the patient basic information 1805. The specific method for calculating the recommendation level is the same as the method described with reference to FIG. 6 using the condition setting co-occurrence information table 500. Alternatively, it may be calculated by the same method as that described with reference to FIG. 8 using the search condition history table 700. As to the threshold value of the recommendation level, when the maximum value of a co-occurrence frequency 518 is max and its minimum value is min, the threshold value is determined by the following equation:

$$\text{Threshold value } A = (\text{max} - \text{min}) \times \alpha + \text{min} \quad (3)$$

where $\alpha$ is designated by the user.

As to the size of the font, when the maximum value of the font size is fmax and its minimum size is fmin, the font size is determined by the following equation:

$$\text{Font size} = (\text{recommendation level} - \text{threshold value } A) / (\text{max} - \text{threshold value } A) \times (f\text{max} - f\text{min}) + f\text{min} \quad (4)$$

where fmax and fmin are designated by the user.

Among the displayed items, some are represented by rectangles, such as knee osteoarthritis 1701, with sharp corners, and some by rectangles with rounded corners, such as drug 1803. The latter indicate the category or an alias, indicating that the detailed information about the drug 1803 is included. As to the arrangement of the search conditions, a major division and an intermediate division are defined in the database in advance. For example, the knowledge that "patient basic information" includes search conditions such as "sex," "age," and "blood type" is registered. In order to avoid visual complexities, the concurrent disease 1802, drug 1803, patient basic information 1805, and so on are bundled together and are allocated a representative label, so that the detailed information can be accessed by double-clicking the representative label. The relationships 1821, 1822, 1823, and 1824 among the search conditions, are indicated by lines connecting search conditions having particularly strong co-occurrence relationship. The value of the co-occurrence degree is calculated by the following equation, for example:

Co-occurrence degree=Co-occurrence frequency of item $A$ and item $B$÷(frequency of item $A$×frequency of item $B$) (5)

The co-occurrence frequency of the item A and item B can be obtained by referring to the condition setting co-occurrence information table 500 and searching for records of which item 1=A and item 2=B, and then referring to the co-occurrence frequency region 518. The frequency of item A can be obtained by referring to the use frequency table 300 and searching for the frequency with item name="A" and then referring to the frequency region 312. The frequency of item B can be similarly obtained by referring to the use frequency table 300 and searching for a frequency with item name="B" and then referring to the frequency region 312. For example, the condition "pregnant" 1804 in the elimination condition region is not often set with any particular condition with a strong co-concurrence. Instead, it is more often set as a general elimination condition. For this reason, it appears singly. As the user selects a search condition, a search process is internally conducted, whereby the number of search results 1760 and search results 1771 are displayed.

Figure 19:
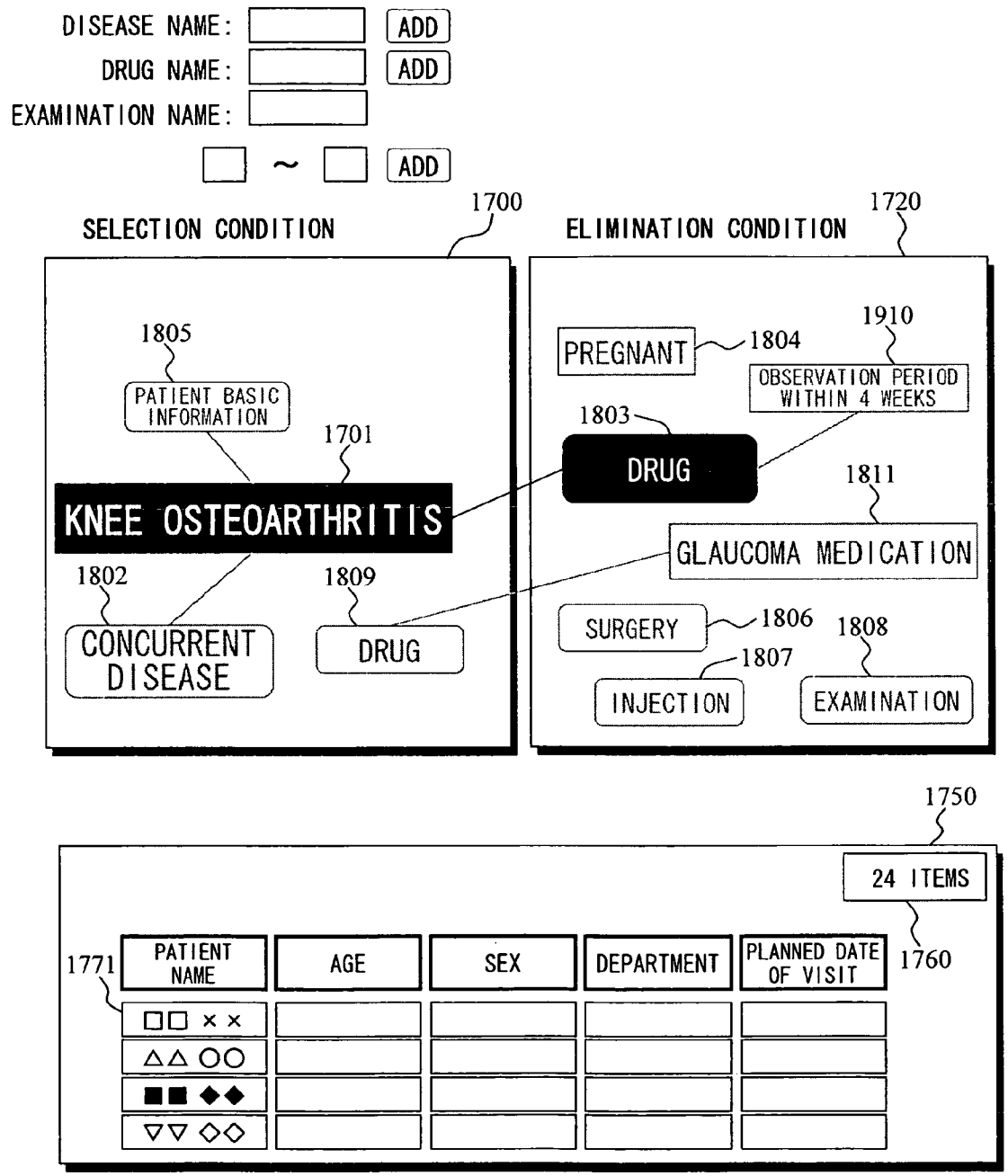
FIG. 19 shows an example of screen transition.

FIG. 19 shows a state in which drug 1803 has been additionally selected. As recommended conditions in a selected state, knee osteoarthritis 1701 and drug 1803 are displayed in reverse. Here, a period condition 1910 for drug administration that is newly added appears. In response to the selection, a search process is internally conducted, whereby the number of search results 1760 and the search result list 1771 are updated.

Figure 20:
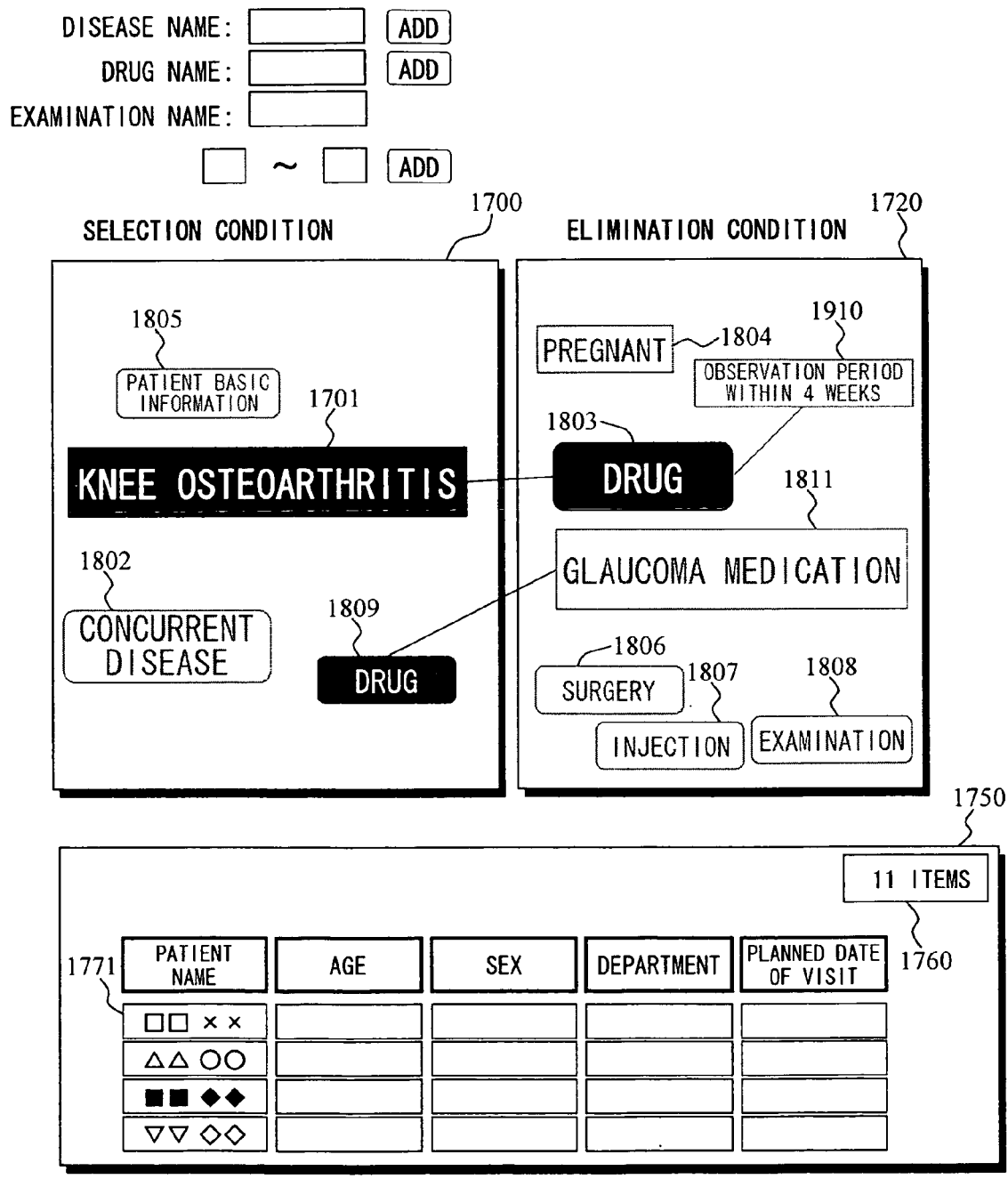
FIG. 20 shows an example of screen transition.

FIG. 20 shows a state in which drug 1809 has been additionally selected. In response to this selection, the recommendation level of the glaucoma medication 1811 increases, resulting in an increased font size. This reflects the fact that, since the drug 1809 selected as a selection condition and the drug used in glaucoma medication are in a mutually prohibitive relationship, and that, as a result, the recommendation level as an elimination condition becomes higher. In response to the selection, a search process is internally conducted, whereby the number of search results 1760 and the search result list 1771 are updated.

Figure 21:
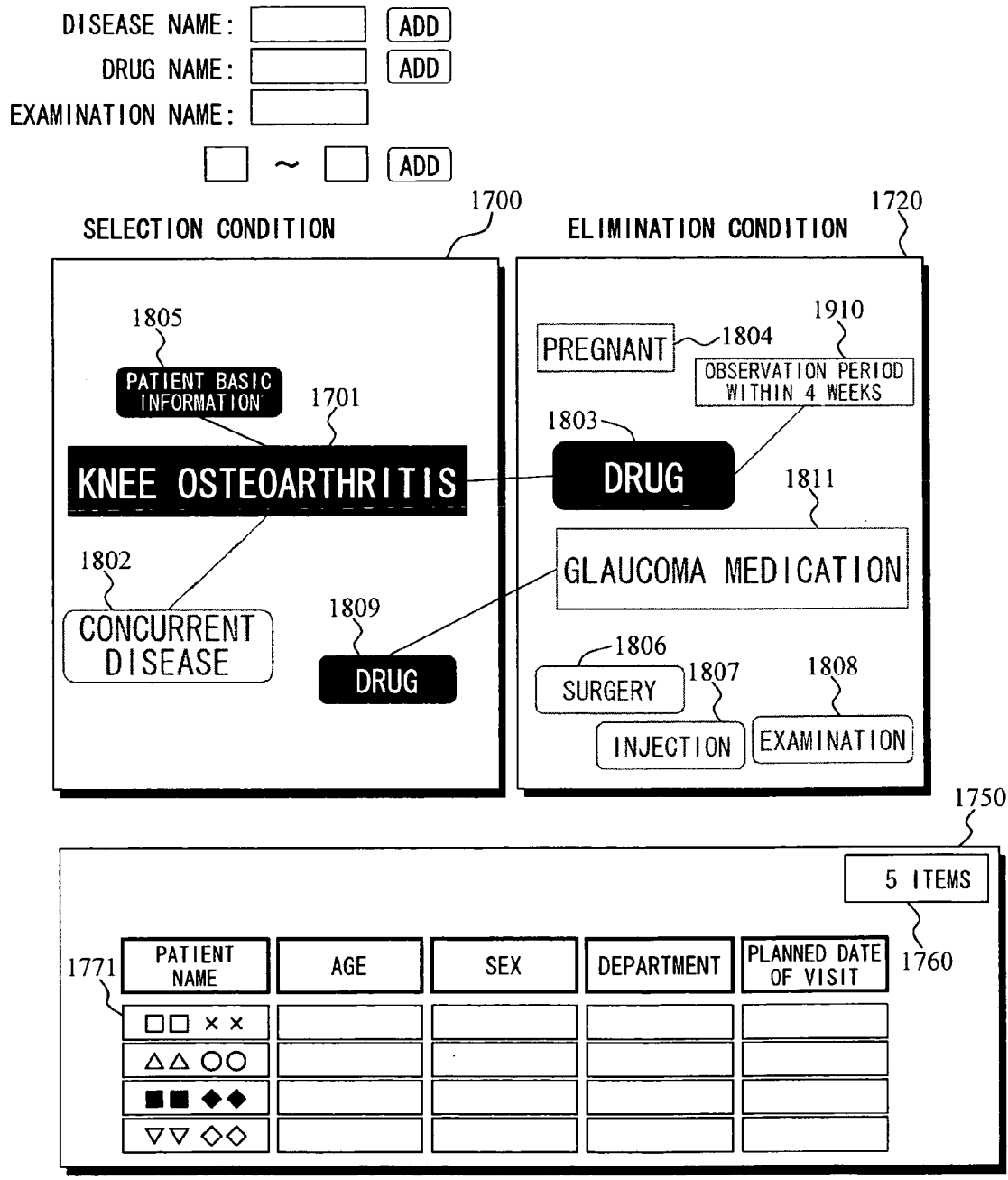
FIG. 21 shows an example of screen transition.
Figure 22:
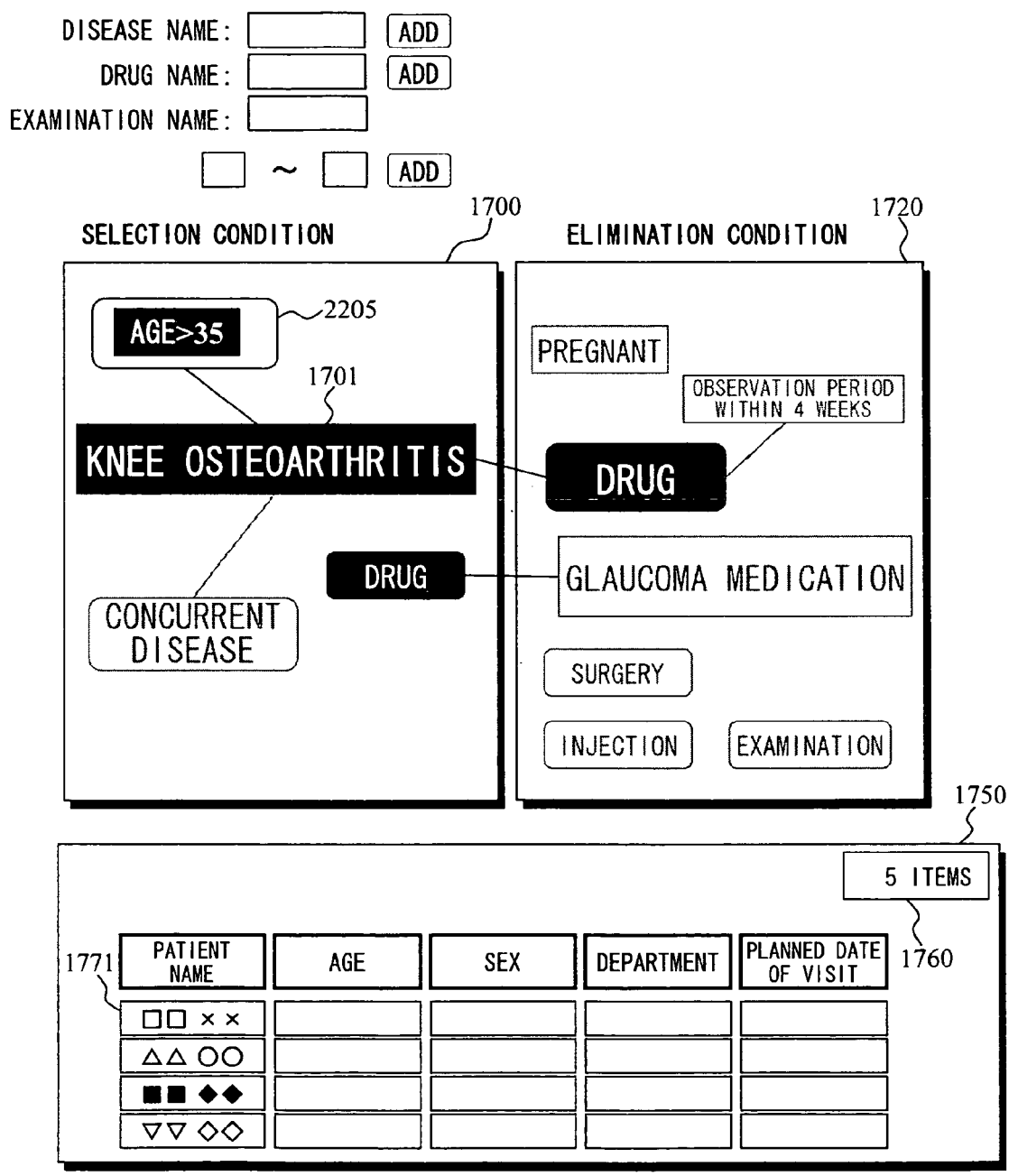
FIG. 22 shows an example of screen transition.

FIG. 21 shows a state in which patient basic information 1805 is additionally selected. In response to the selection, a search process is internally conducted, whereby the number of search results 1760 and the search result list 1771 are updated. FIG. 22 shows a state in which, of the selected items, patient basic information 1805 is double-clicked, whereby detailed information 2205 is displayed. Then, it can be seen that the content of the patient basic information 1805 is an age condition such that "age>35". In this case, there is no change in the search conditions, so that the number of search results 1760 and the-search result list 1771 are not changed from FIG. 21.

Figure 23:
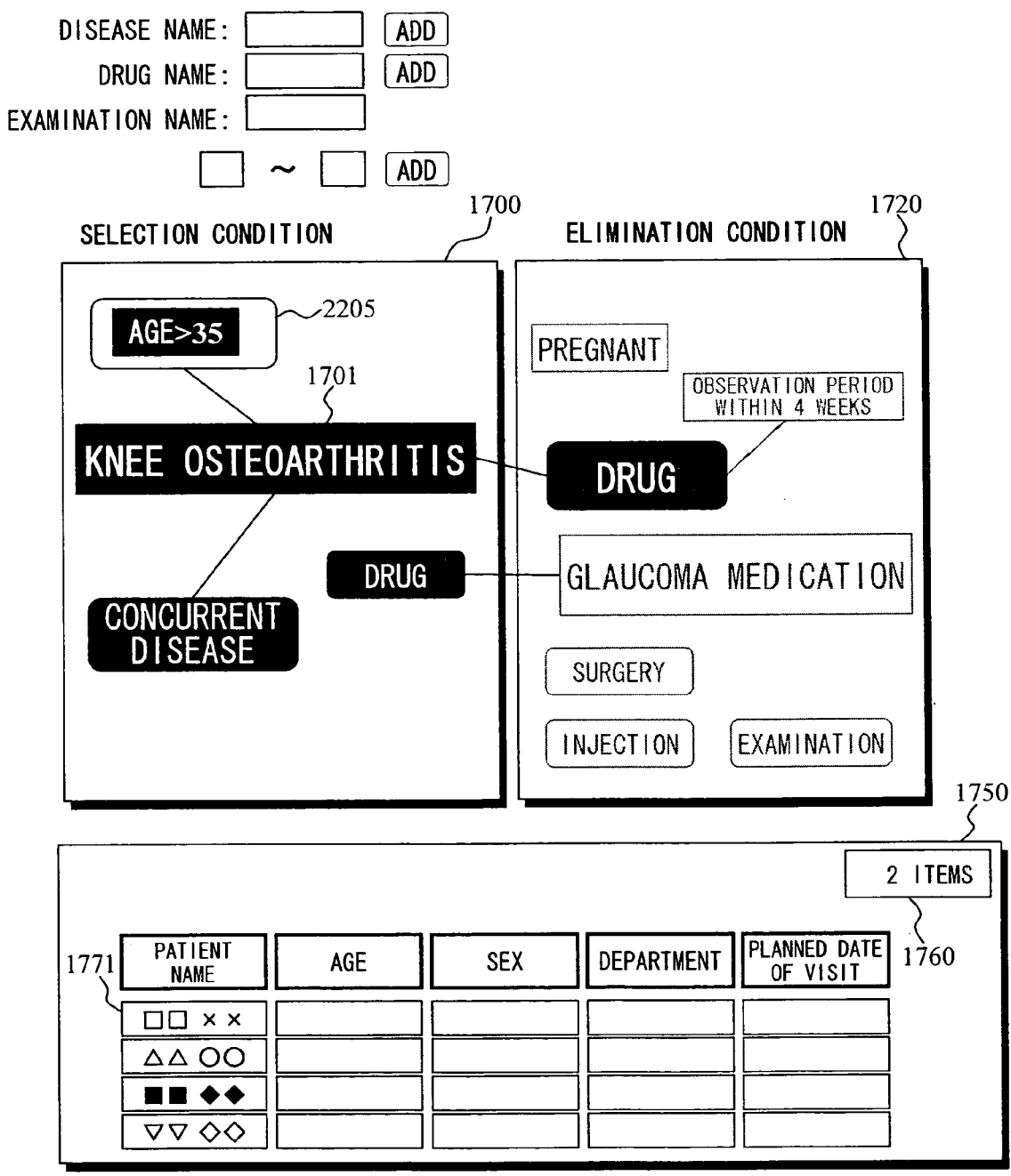
FIG. 23 shows an example of screen transition.
Figure 24:
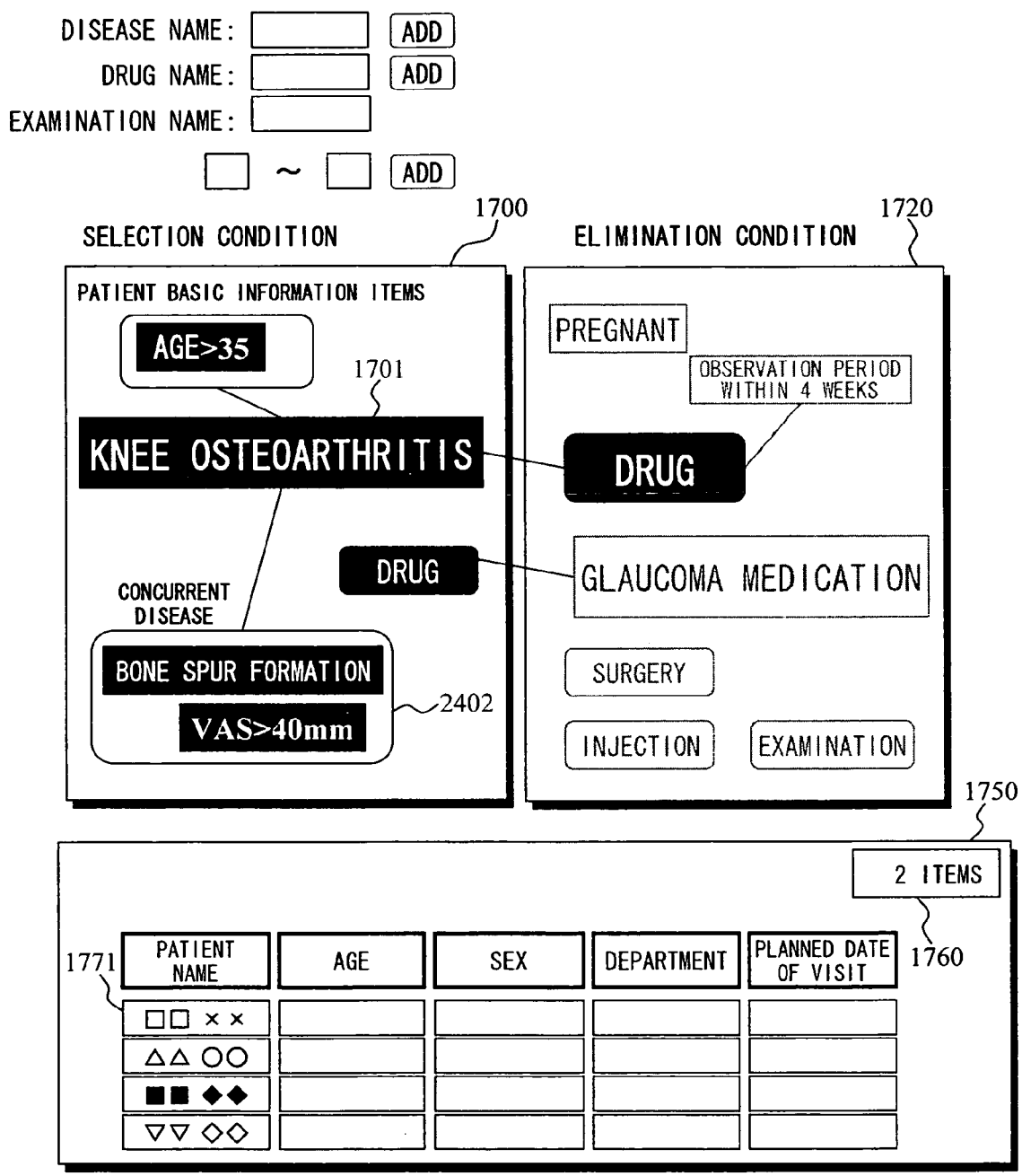
FIG. 24 shows an example of screen transition.

FIG. 23 shows a state in which concurrent disease 1802 is additionally selected. In response to the selection, a search process is internally conducted, whereby the number of search results 1760 and the search result list 1771 are updated. FIG. 24 shows a state in which concurrent disease 1802 thus selected is double-clicked, whereby detailed information 2402 is displayed. As a result, it can be seen that the content of the concurrent disease 1802 is "bone spur" and "VAS>40 mm." In this case, there is no change in the search content, so that the number of search results 1760 and the search result list 1771 do not change from FIG. 23.

Figure 25:
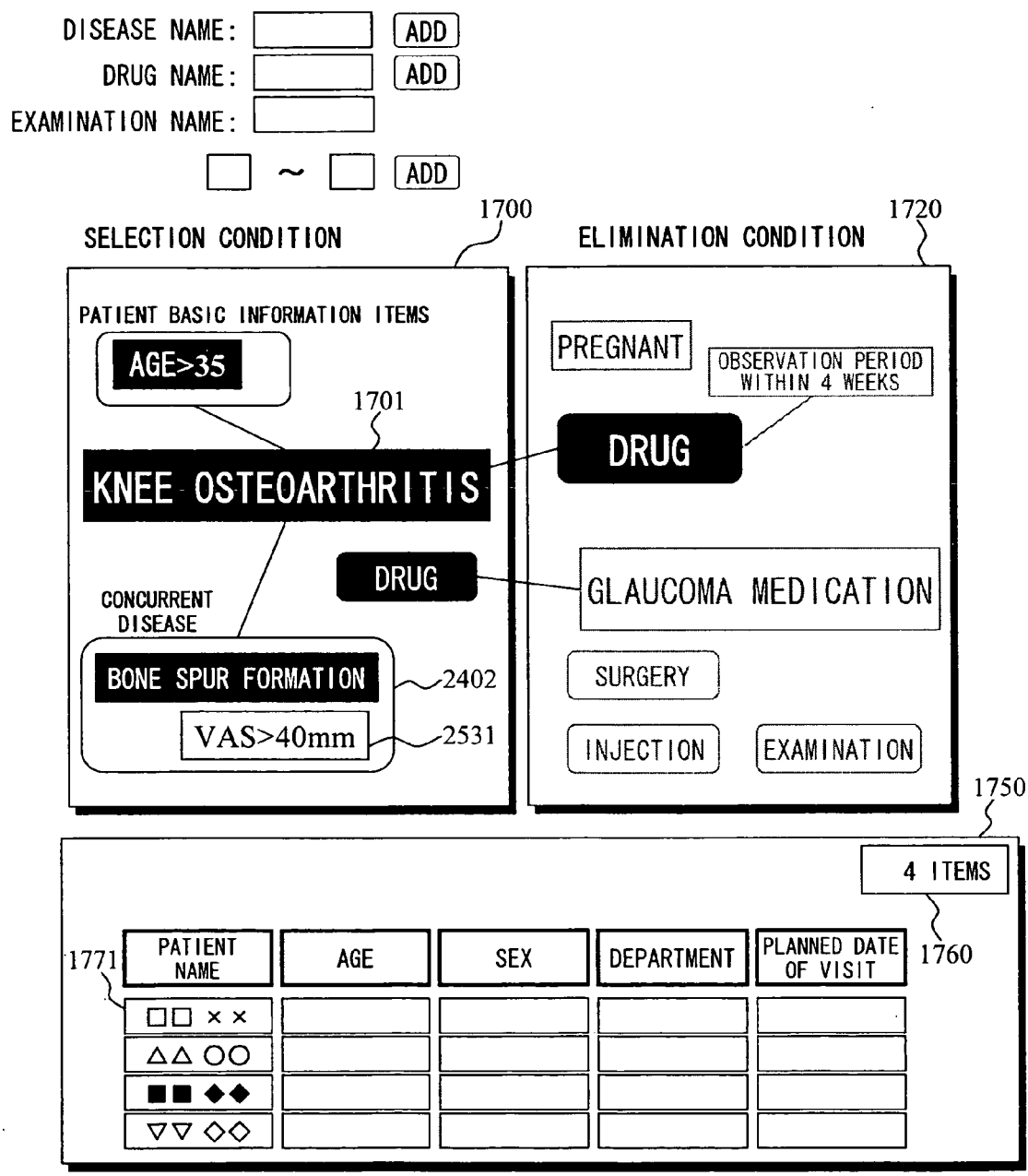
FIG. 25 shows an example of screen transition.

FIG. 25 shows a state in which, of the content of concurrent disease 2402 that is shown in detail, "VAS>40 mm" 2531 is clicked, thus indicating that it is not selected. As seen in this example, each condition can be switched between selected and non-selected states upon clicking. In the present example, white characters on a black background indicates a selected state, while black characters on a white background indicates a non-selected state. Additionally, it is also possible to indicate the selection/non-selection by showing buttons that are either depressed or not. In response to the relaxation of the concurrent disease condition, a search process is internally conducted, whereby the number of search results 1760 and the search result list 1771 are updated. As a result of the relaxation of the condition, the number of search results has slightly increased.

Figure 26:
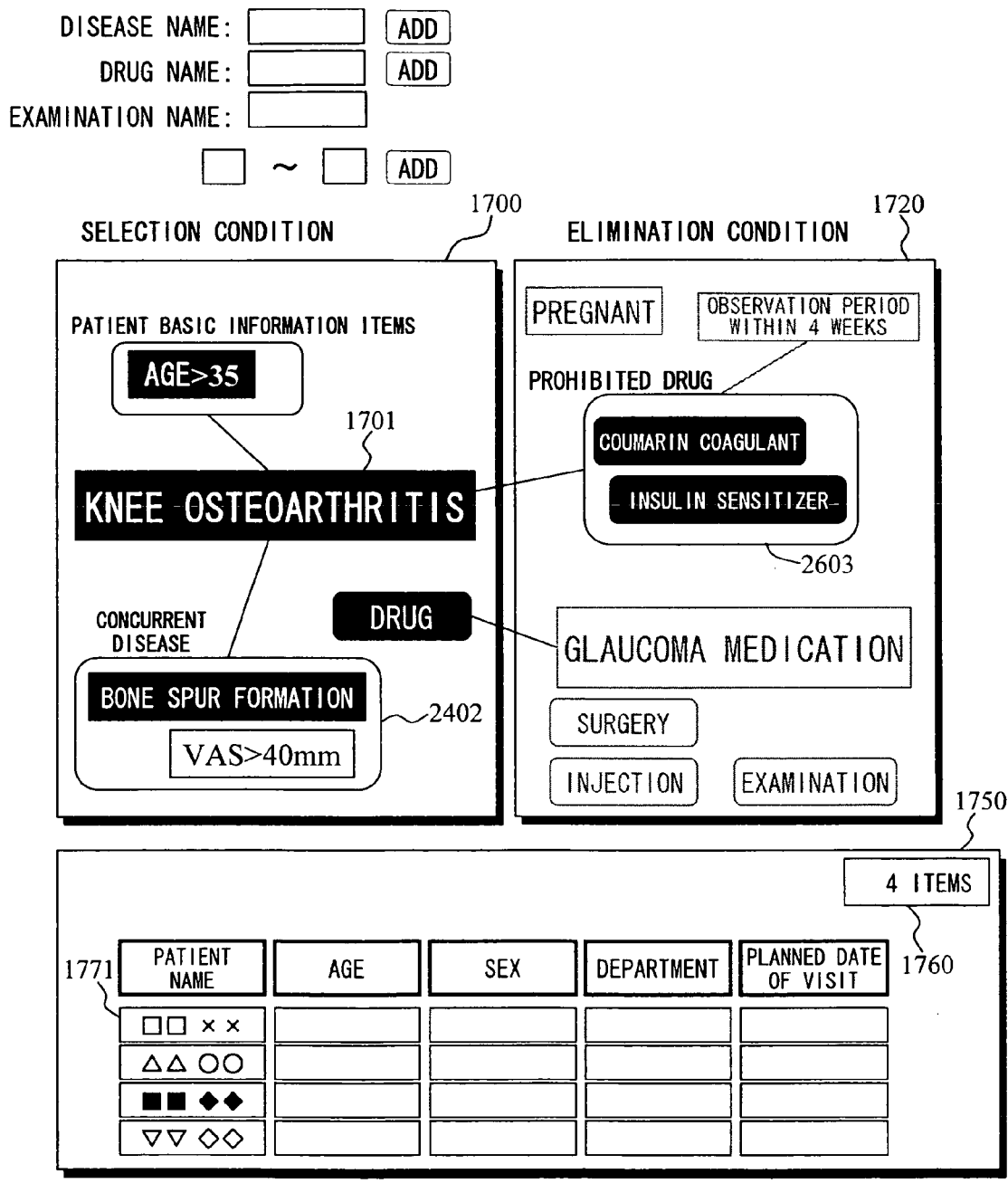
FIG. 26 shows an example of screen transition.

FIG. 26 shows a state in which the drug 1803 is double-clicked whereby the detailed information 2603 is displayed. Thus, it can be seen that the content of drug 1803 is "coumarin coagulant" and "insulin sensitizer." In this case, there is no change in the search conditions, so that the number of search results 1760 and search result list 1771 is not changed from FIG. 23.

Figure 27:
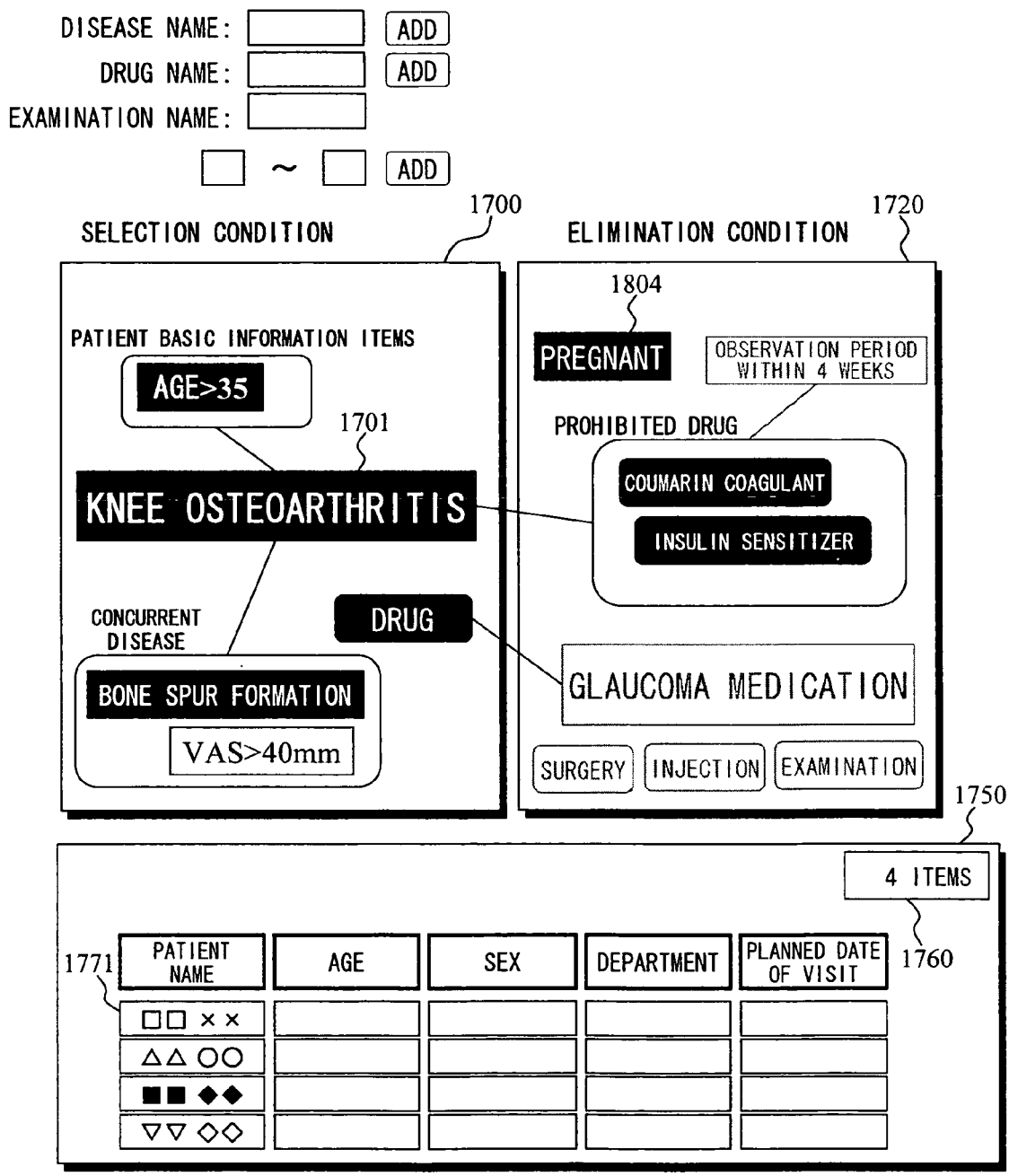
FIG. 27 shows an example of screen transition.

FIG. 27 shows a state in which pregnant 1804 is additionally selected. In response to the selection, a search process is internally conducted, whereby the number of search results 1760 and the search result list 1771 are updated. As there is no change in the relevant persons, the number of results and the result list are identical to those of FIG. 26.

Thus, through the transition of screens described above, the display size is varied depending on the recommendation level based on the condition selected by the user when recommendation conditions are displayed, whereby the entry of search conditions can be supported.

FIGS. 28 to 32 show the flow of a series of operations in a sequence chart between the input/output device 100, the arithmetic device 120, and the database 160.

Figure 28:
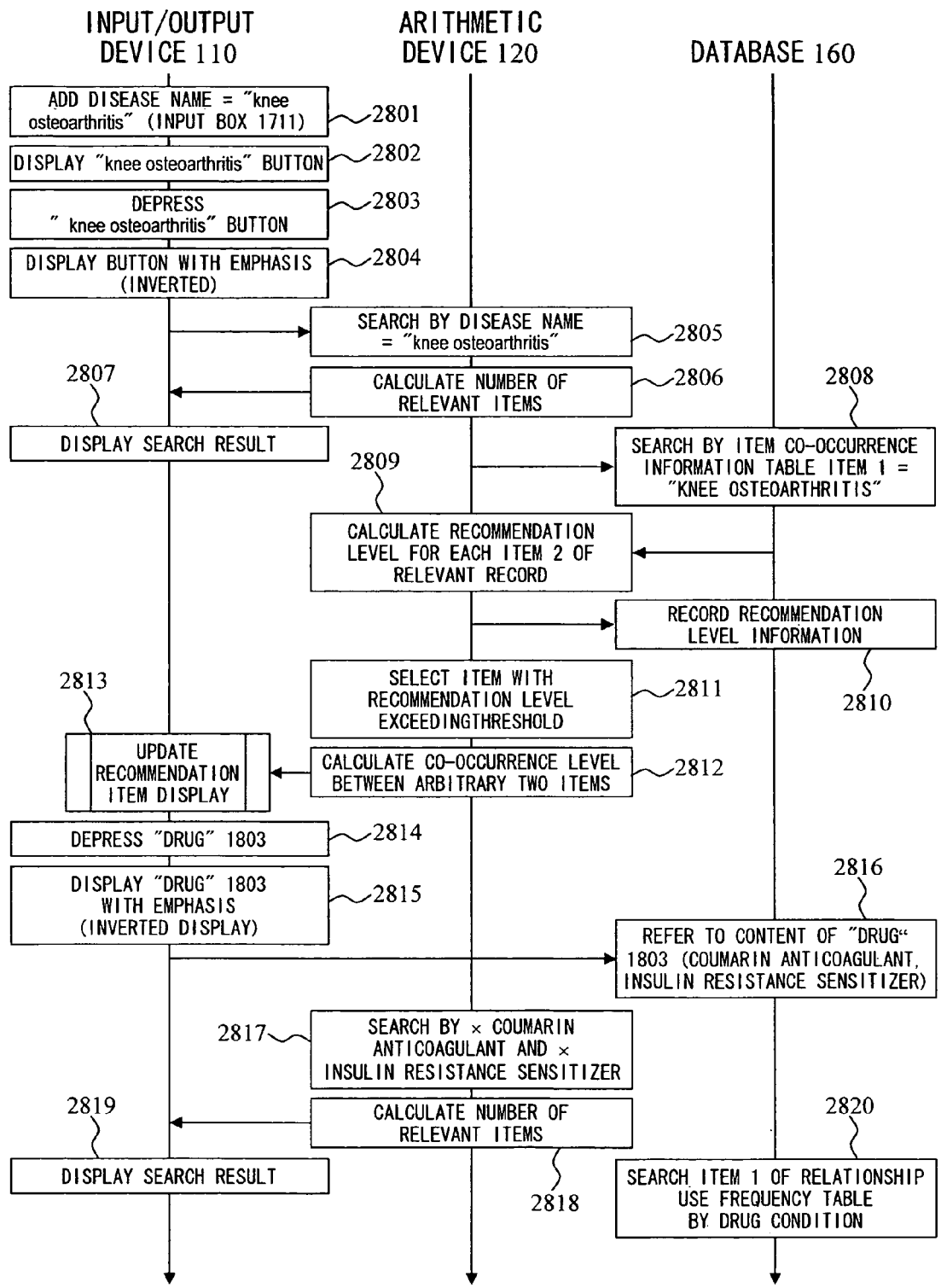
FIG. 28 shows a sequence chart for the entry of a search condition.

FIG. 28 shows an initial starting state in which nothing is set yet. First, using an input box 1711, disease name="knee osteoarthritis" is set (step 2801). Then, the input/output device 100 displays the added condition on the selection condition arrangement screen 1700 (step 2802). The user depresses a displayed button with the mouse or the like, thus selecting a condition (step 2803). The input/output device 100 displays the selected condition in reverse so as to indicate that it is in a selected state (step 2804). The content of the setting "knee osteoarthritis" is conveyed to the arithmetic device 120, which then conducts a search for objects under the condition "disease name=knee osteoarthritis" (step 2805), and then calculates the number of relevant items (step 2806). The search results are conveyed to the input/output device 100, whereby the number of results 1760 and the result list 1771 are updated (step 2807).

At the same time, the arithmetic device 120 inquires the database 160 and searches for records of which item 1 in the condition setting co-occurrence information table 500 is "knee osteoarthritis" (step 2808). The arithmetic device carries out the calculation of recommendation level for each item 2 of the search result record (step 2809). For the calculation of the recommendation level, the method involving the condition setting co-occurrence information table 500 (FIG. 6), or the method involving the search condition history table 700 (FIG. 8) may be sued. The recommendation level calculated at step 2809 is stored in a temporary region of the database so as to avoid redundant calculation (step 2810). Items with recommendation level values exceeding a predetermined value are selected (step 2811), and the co-occurrence degree between arbitrary selected items is calculated according to Equation (5) (step 2812). The input/output device 100 then receives the selected condition, the value of the recommendation level, and the value of the co-occurrence degree, and then renders an image on the screen (step 2813).

Figure 32:
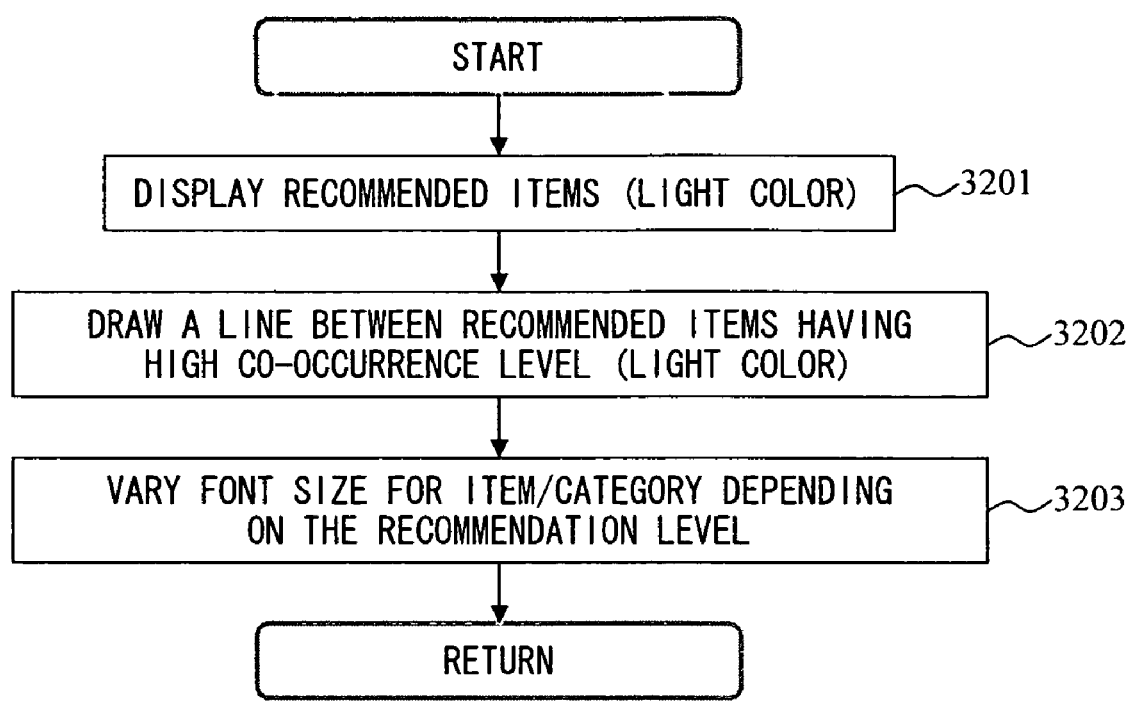
FIG. 32 shows a flowchart of a screen information updating process.

The image re-rendering process consists of the three steps shown in FIG. 32. FIG. 32 shows a detailed process flow for arranging search conditions on the screen depending on recommendation levels. First, a recommended item is displayed in a light color, such as grey (step 3201). This indicates that no interaction has taken place with the user. Then, among the recommended items, a line is shown between those items of which the value of co-occurrence degree exceeds a preset value (step 3202). Finally, the font size is adjusted such that the labels of items with larger recommendation levels are displayed with a relatively large font (step 3203).

After the recommended items are displayed at step 2813, the user is again allowed to add another search condition. In the illustrated example, one of the recommended items, "drug" 1903 is selected as a second condition (step 2814). The input/output device 100 displays the selected drug category with emphasis (in reverse) (step 2815). Because the selected "drug" has its detailed information hidden, the database 160 is inquired so as to refer to the detailed information. In the present example, it is learned that the drug consists of coumarin coagulant and insulin sensitizer (step 2816). The arithmetic device 120 receives the result of step 2816, and conducts a search on search objects. Because the drug 1903 selected at step 2814 is an elimination condition, the search is conducted with the condition that "x coumarin coagulant and x insulin sensitizer" (step 2817), and the number of search results is calculated (step 2818). The search results are conveyed to the input/output device 100, whereby the number of results 1760 and the result list 1771 are updated (step 2819). At the same time, the arithmetic device 120 inquires the database 160 and searches for records of which item 1 in the condition setting co-occurrence information table 500 is "coumarin coagulant" and of which Boolean 1 is fix "x," and records of which item 1 is "insulin sensitizer" and of which Boolean 1 is "x" (step 2820).

Figure 29:
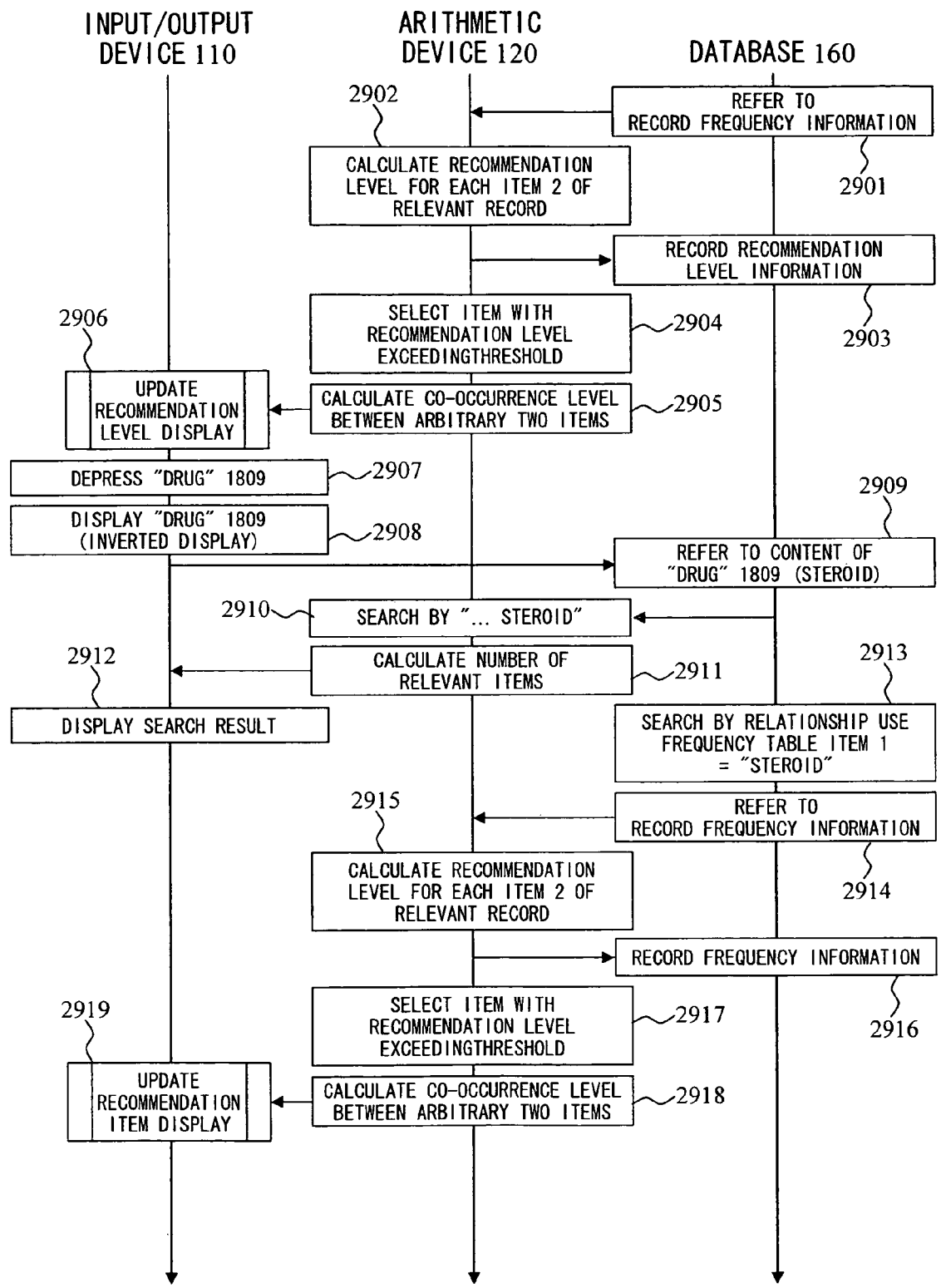
FIG. 29 shows a sequence chart for the entry of a search condition.

FIG. 29 shows a sequence chart continuous from FIG. 28. The arithmetic device 120 receives the recommendation level information recorded at step 2810 (step 2901), and calculates the recommendation level for each item 2 in the records retrieved at step 2820 (step 2902). For the calculation of the recommendation level, the method involving the condition setting co-occurrence information table 500 (FIG. 6) or the method involving the search condition history table 700 (FIG. 8) may be used. The recommendation level received at step 2901 and the recommendation level calculated at step 2902 are summed (or averaged), whereby a new recommendation level is obtained, which is stored in a temporary region of the database 160 (step 2903). Items of which the value of the calculated recommendation level exceeds a predetermined threshold value are selected (step 2904), and then the co-occurrence degree between the arbitrary selected conditions is calculated (step 2905). The input/output device 100 receives the selected condition and the value of the recommendation level, and the value of the co-occurrence degree, and then conducts an image rendering (step 2906). The image rendering process consists of the steps shown in FIG. 32, as mentioned above.

The user, while referring to the displayed recommended items, then selects drug 2009 (step 2907). The selected drug 2009 is displayed with emphasis (in reverse) (step 2908). The selected information is conveyed to the database 160, where the detailed information about the drug 2009 is referenced. In the present example, it is learned that the drug is a steroid drug (step 2909). Because the "drug" 2903 selected at step 2908 is a selection condition, a search is conducted with a condition that "(circle) steroid drug" (step 2910), and the number of search results is calculated (step 2911). The search results are conveyed to the input/output device 100, whereby the number of results 1760 and the result list 1771 are updated (step 2912).

At the same time, the arithmetic device 120 inquires the database 160, and searches for records of which item 1 in the condition setting co-occurrence information table 500 is "steroid drug" and of which Boolean 1 is designated with a circle (step 2913). The arithmetic device 120 receives the recommendation level information recorded at step 2913 (step 2914). It also calculates the recommendation level for each item 2 of the records retrieved at step 2913 (step 2915). For the calculation of the recommendation level, the method involving the condition setting co-occurrence information table 500 (FIG. 6) or the method involving the search condition history table 700 (FIG. 8) may be used. The recommendation level received at step 2914 and the recommendation level calculated at step 2915 are summed (or averaged) to obtain a new recommendation level, which is then stored in a temporary region of the database 160 (step 2916). Items of which the recommendation level value exceeds a preset threshold value are selected (step 2917), and the co-occurrence degree between the arbitrary selected items is calculated according to Equation (5) (step 2918). The input/output device 100 receives the selected condition and the value of the recommendation level and the value of the co-occurrence degree, and then performs an image rendering on the screen (step 2919). The image rendering process consists of the steps shown in FIG. 32, as mentioned above.

Figure 30:
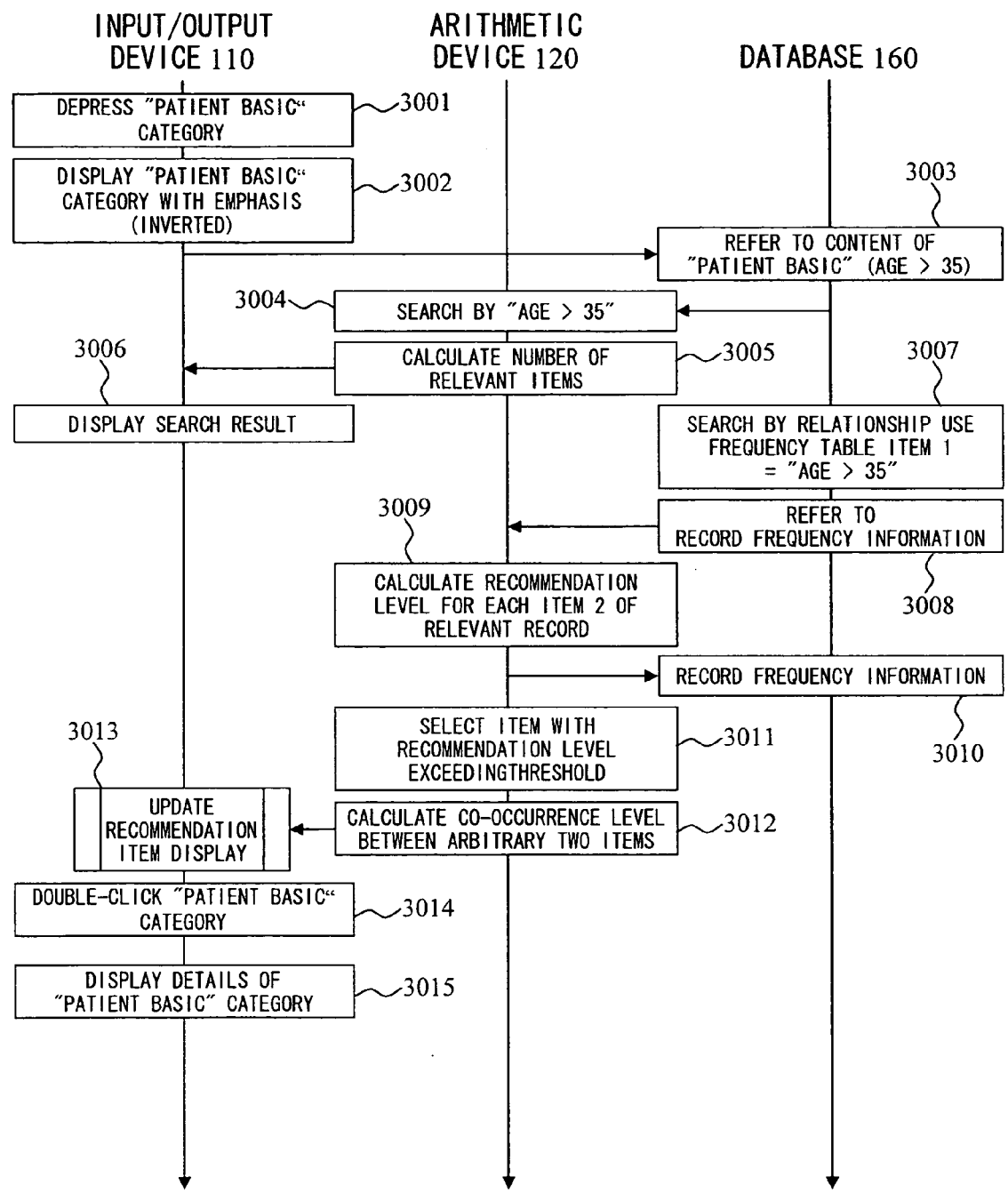
FIG. 30 shows a sequence chart for the entry of a search condition.

FIG. 30 shows the flow of a series of operations in a sequence chart of the steps from the selection of patient basic information in FIG. 20 to the display of the details of the patient basic information in FIG. 22.

The user, while referring to the displayed recommended items, then selects patient basic information 2105 (step 3001). The selected patient basic information 2105 is displayed with emphasis (in reverse) (step 3002). The selected information is conveyed to the database 160, where the detailed information about the patient basic information 2105 is referenced. In the present example, it is learned that the age >35 (step 3003). Because the patient basic information 2105 selected at step 3001 is a selection condition, a search is conducted with the condition that "(circle) age >35" (step 3004), and the number of search results is calculated (step 3005). The search results are conveyed to the input/output device 100, whereby the number of results 1760 and the result list 1771 are updated (step 3006).

At the same time, the arithmetic device 120 inquires the database 160, and searches for records of which item 1 in the condition setting co-occurrence information table 500 is "age >35" and of which Boolean 1 is designated with a circle (step 3007). The arithmetic device 120 receives the recommendation level information recorded at step 2916 (step 3008). It also calculates the recommendation level for each item 2 of the records retrieved at step 3007 (step 3009). For the calculation of the recommendation level, the method involving the condition setting co-occurrence information table 500 (FIG. 6) or the method involving the search condition history table 700 (FIG. 8) may be used. The recommendation level received at step 3008 and the recommendation level calculated at step 3009 are summed (or averaged) to obtain a new recommendation level, which is then stored in a temporary region of the database 160 (step 3010). Items of which the recommendation level value exceeds a preset threshold value are selected (step 3011), and the co-occurrence degree between the arbitrary selected items is calculated according to Equation (5) (step 3012). The input/output device 100 receives the selected condition and the value of the recommendation level and the value of the co-occurrence degree, and then performs an image rendering on the screen (step 3013). The image rendering process consists of the steps shown in FIG. 32, as mentioned above. The user, in order to confirm the details of the patient basic information, double-clicks the patient basic information 2105 (step 3014). Then, the content of the information, namely, "age >35" is displayed (step 3015).

Figure 31:
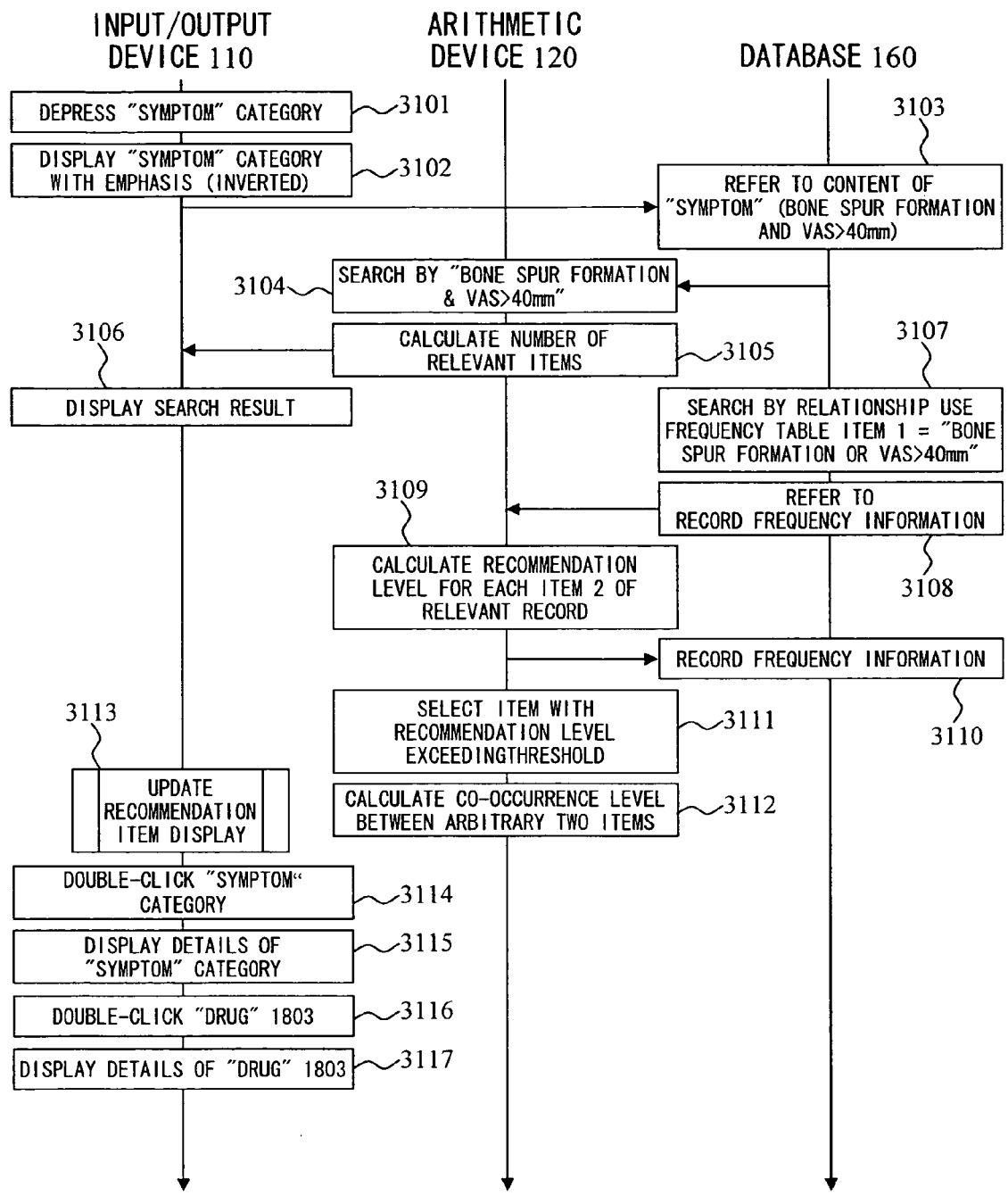
FIG. 31 shows a sequence chart for the entry of a search condition.

FIG. 31 shows a sequence chart of a series of processes from the selection of complication in FIG. 23 to the display of details of the drug 2603 in FIG. 26.

The user, while referring to the displayed recommended items, selects symptom 2302 (step 3101). The selected symptom 2302 is displayed with emphasis (in reverse) (step 3102). The selected information is conveyed to the database 160, where the detailed information about the symptom 2302 is referenced. In the present example, it is learned that the content is "formation of bone spur & VAS>40 mm" (step 3103). Because the symptom 2302 selected at step 3101 is a selection condition, a search is conducted with the condition that "bone spur formation & VAS>40 mm" (step 3104), and the number of search results is calculated (step 3105). The search results are conveyed to the input/output device 100, whereby the number of results 1760 and the result list 1771 are updated (step 3106).

At the same time, the arithmetic device 120 inquires the database 160, and searches for records of which item I in the condition setting co-occurrence information table 500 is "bone spur formation" and of which Boolean 1 is designated with a circle, and for records of which item 1 is "VAS>40 mm" and of which Boolean 1 is designated with a circle (step 3107). The arithmetic device 120 receives the recommendation level information recorded at step 3010 (step 3108). It also calculates the recommendation level for each item 2 of the records retrieved at step 3107 (step 3109). For the calculation of the recommendation level, the method involving the condition setting co-occurrence information table 500 (FIG. 6) or the method involving the search condition history table 700 (FIG. 8) may be used. The recommendation level received at step 3108 and the recommendation level calculated at step 3109 are summed (or averaged) to obtain a new recommendation level, which is then stored in a temporary region of the database 160 (step 3110). Items of which the recommendation level value exceeds a preset threshold value are selected (step 3111), and the co-occurrence degree between the arbitrary selected items is calculated according to Equation (5) (step 3112). The input/output device 100 receives the selected condition and the value of the recommendation level and the value of the co-occurrence degree, and then performs an image rendering on the screen (step 3113). The image rendering process consists of the steps shown in FIG. 32, as mentioned above.

The user, in order to confirm the details of the symptom 2302, double-clicks the symptom 2302 (step 3114). Then, the content of the information, namely, "bone spur formation & VAS>40 mm" is displayed (step 3115). Further, in order to confirm the details of the drug 2603, the user double-clicks the drug 2603 (step 3116), whereby its detailed information, namely, "coumarin coagulant" and "insulin sensitizer" are displayed (step 3117).

By the flow of such processes, the search conditions with different recommendation levels are displayed based on the condition selected by the user, whereby the setting of search conditions can be supported.

Embodiment 3

Figure 33:
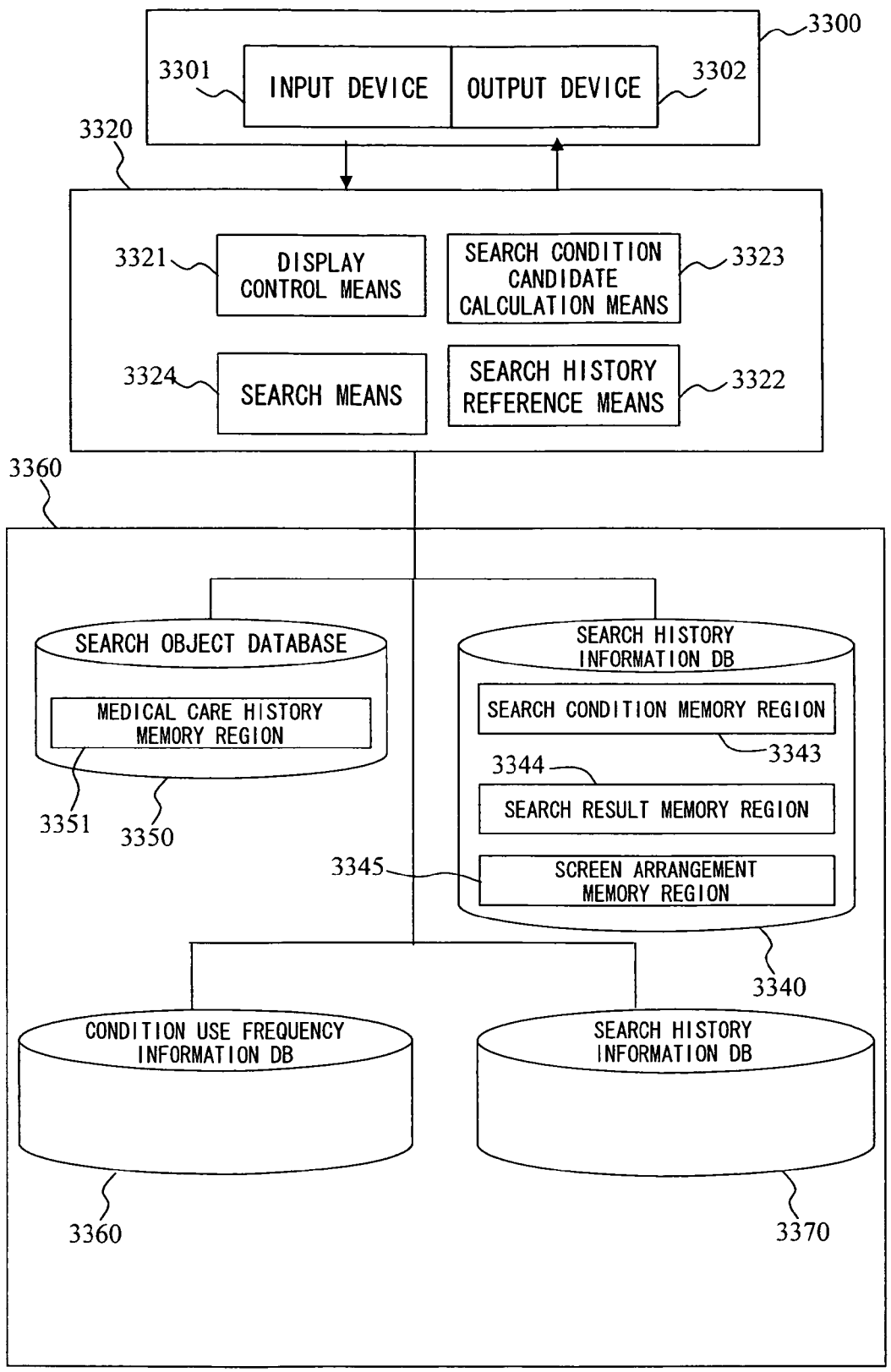
FIG. 33 shows an example of system configuration of another embodiment of the invention.

FIG. 33 shows an example of the system configuration for supporting the setting of search conditions by storing some of the search conditions and re-using them. The condition setting support system includes an input/output device 3300, an arithmetic device 3320 for calculating a search result or condition setting support information, and a database 3360. The configuration of the system for realizing the support for the setting of search conditions according to the present embodiment is basically identical to that of Embodiment 2. The only difference lies in the fact that a feature is added for storing some of the search conditions for reuse.

The input/output device 3300 includes an input device 3301 for conveying a search condition setting operation, such as the selection of a search condition or the dragging by the mouse, to the inside of the system. It also includes an output device 3302 for displaying a search result or search condition support information in response to changes in the system internal state. The arithmetic device 3320 includes: a display control means 3321 for displaying a search history or a stored search condition name on a screen; a search history reference means 3322; a calculation means 3323 for calculating a recommendation level based on the state of the screen; and a calculation means 3324 for actually carrying out a search in accordance with the search condition set by the user. The database 3360 stores: a search history information database 3340 for retaining a search history of each user; a search object DB 3350; a condition use frequency information database 3360 for storing basic information about search conditions or the relationship between them; and a search history information database 3370 for storing a search history of each user. The history information database 3340 includes a search condition memory region 3343, a search result memory region 3344, and a screen arrangement memory region 3345.

In accordance with the search condition setting support system according to the present embodiment having the above-described configuration, a subset on the search condition setting screen is selected, names are given to conditions before they are stored, and the stored conditions are arbitrarily called up and used in combination. In this way, the search condition setting process can be supported.

Figure 34:
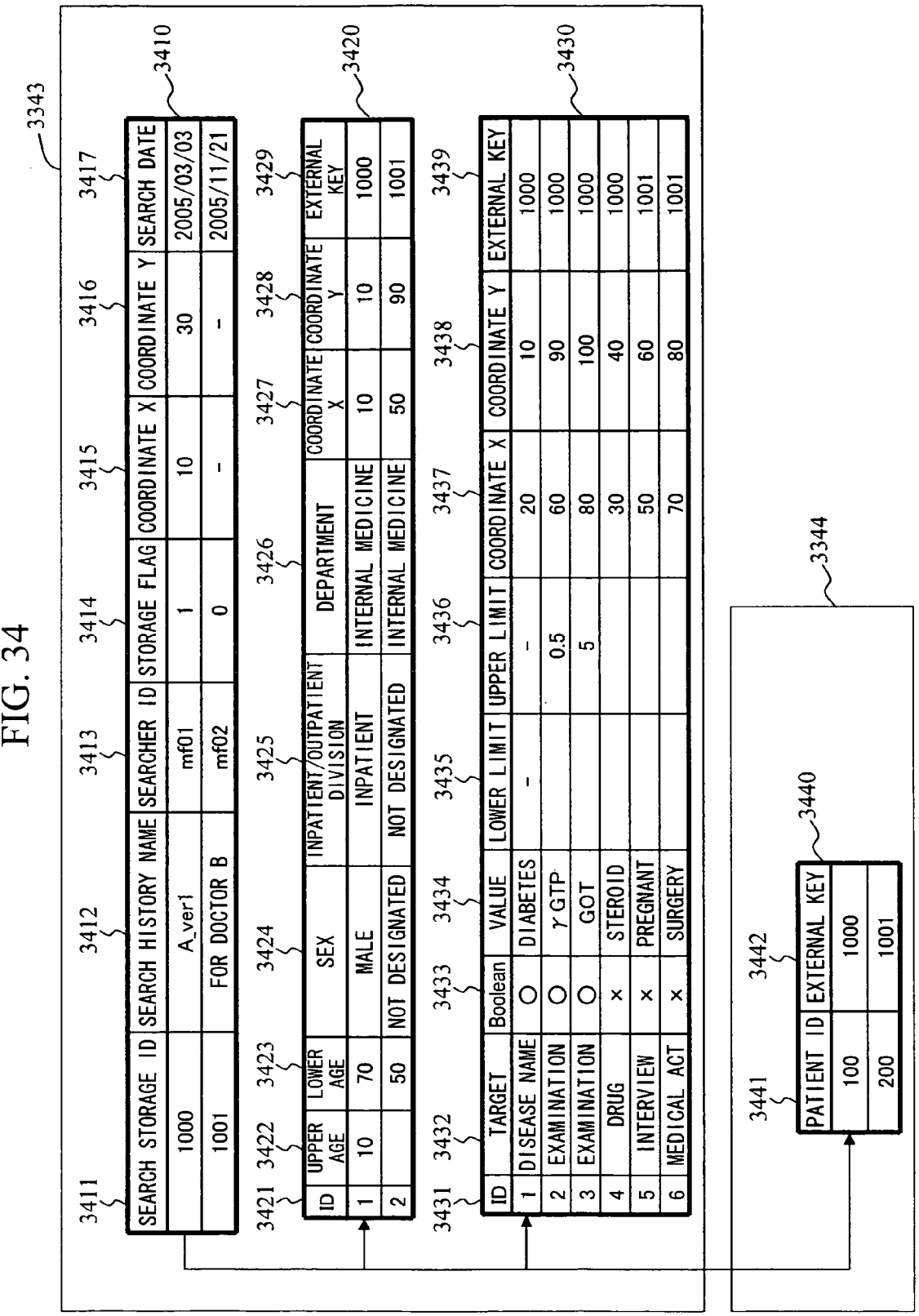
FIG. 34 shows a search condition memory region.

FIG. 34 shows a search history name table 3410 stored in the search condition memory region 3343, a search basic condition table 3420, a search condition table 3430, and a search result storage table 3440 stored in the search result memory region 3344.

The search history name table 3410 stores: a search storage ID region 3411 for uniquely identifying a history name; a search history name region 3412 for storing each search history name; a searcher ID region 3413; a storage flag 3414; a coordinate X 3415; a coordinate Y 3416; and a search date region 3417. The storage flag 3414 indicates whether or not the stored information is a search history or search condition storage information. The coordinate X 3415 and the coordinate Y 3416 are used for recording the position where a label name is displayed (storage condition arrangement screen 3510 of FIG. 35) in the event that the stored information is search condition storage information.

The search basic condition table 3420 stores: an ID region 3421 for uniquely identifying a search basic condition; an lower age region 3422 for indicating the lower limit of age; an upper age region 3423 for indicating the upper limit of age; a sex region 3424; an inpatient/outpatient category region 3425 indicating the inpatient/outpatient category division; a department region 3426; a coordinate X 3427 indicating a position on the screen along the X axis; a coordinate Y 3428 indicating a position on the screen along the Y axis; and an external key 3429 indicating the correspondence to the search history name table.

The search condition table 3430 includes an ID region 3431 for uniquely identifying a search condition; a target region 3432 for setting a search object item; a Boolean region 3433 for setting a Boolean condition; a value region 3434 corresponding to the target region 3432; a lower-limit region 3435 for setting a lower-limit value of a value when the target is an examination value or the like; an upper-limit region 3436 for setting an upper-limit value; a coordinate X 3437 indicating a position on the screen along the X axis and a coordinate Y 3438; and an external key 3439 indicating the correspondence with the search history name table. The search result table 3440 stores a patient ID 3441 for identifying the patient, and an external key 3442 for indicating the correspondence with the search history name table.

FIGS. 35 to 47 show an example of screen transition when the system configuration of FIG. 33 is actually used for supporting the setting of a search condition.

Figure 35:
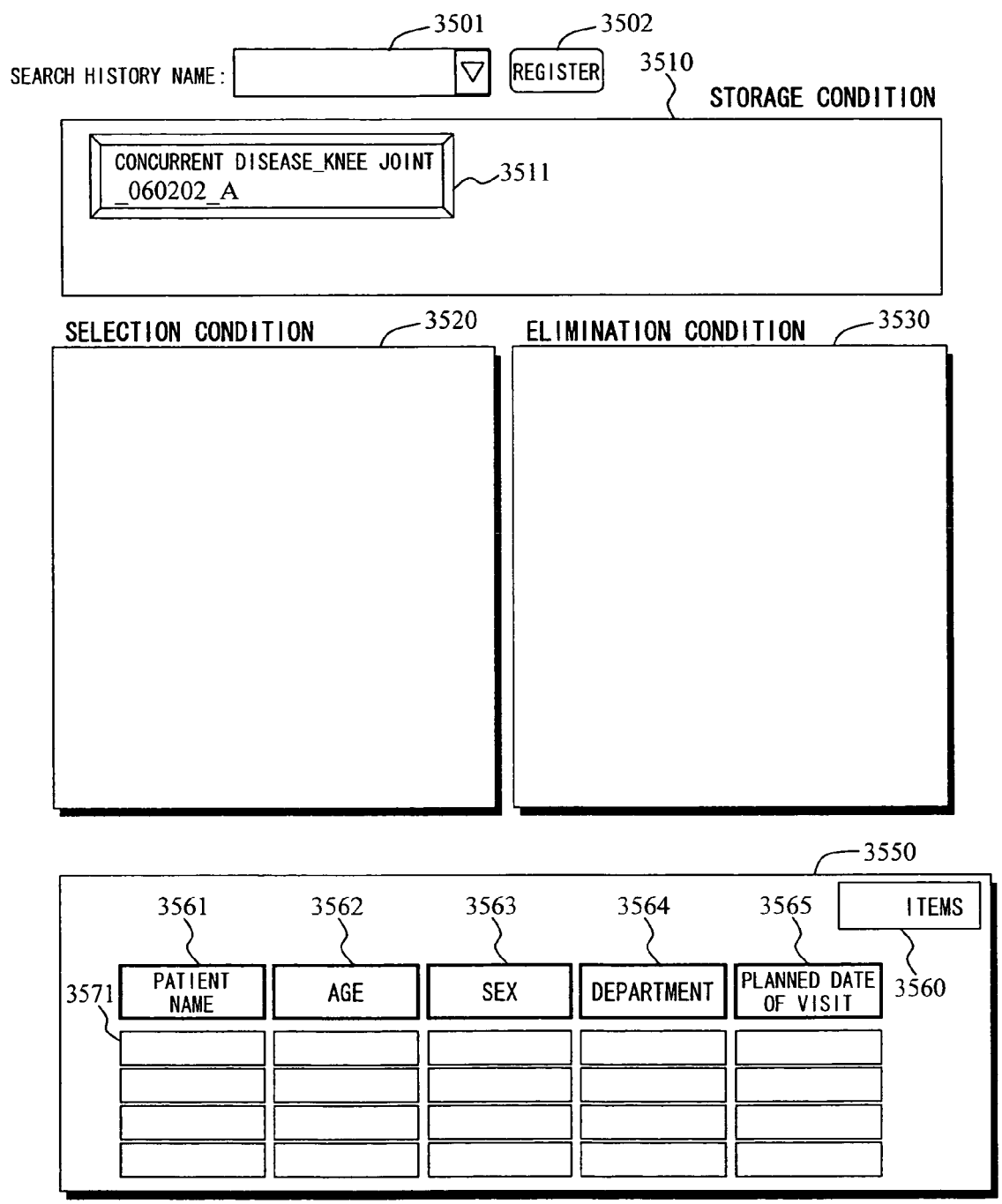
FIG. 35 shows another example of the interface for supporting the setting of a search condition.

FIG. 35 shows an interface for partially storing the search history or search condition and then calling them up at an arbitrary time for reutilization. The interface includes a region 3501 for displaying a search history name and a button 3502 for the additional registration in the search history. The registration button 3502 is used for storing a retrieved search history in the search condition memory region 3343 and in the search result memory region 3344. Separately from the storage of the search history, the interface also includes a stored condition storage region 3510 for the storage and arrangement of some or all of search conditions with labels. In the state shown in FIG. 35, "concurrent disease_knee joint_060202_A" 3511 is present as a stored condition. In addition, the interface, as in the interface of FIG. 17, includes a search condition arrangement screen 3520 for locating the selected condition, and a search condition arrangement screen 3530 for arranging elimination conditions. It also includes a search result display screen 3550 for displaying the attributes or the number of condition-satisfying items. The search result display screen 3550 is composed of the number of search results 3560 and a search result list 3571. The search result list 3571 is composed of patient name 3561, age 3562, sex 3563, department 3564, and planned hospital visit date 3565.

Figure 36:
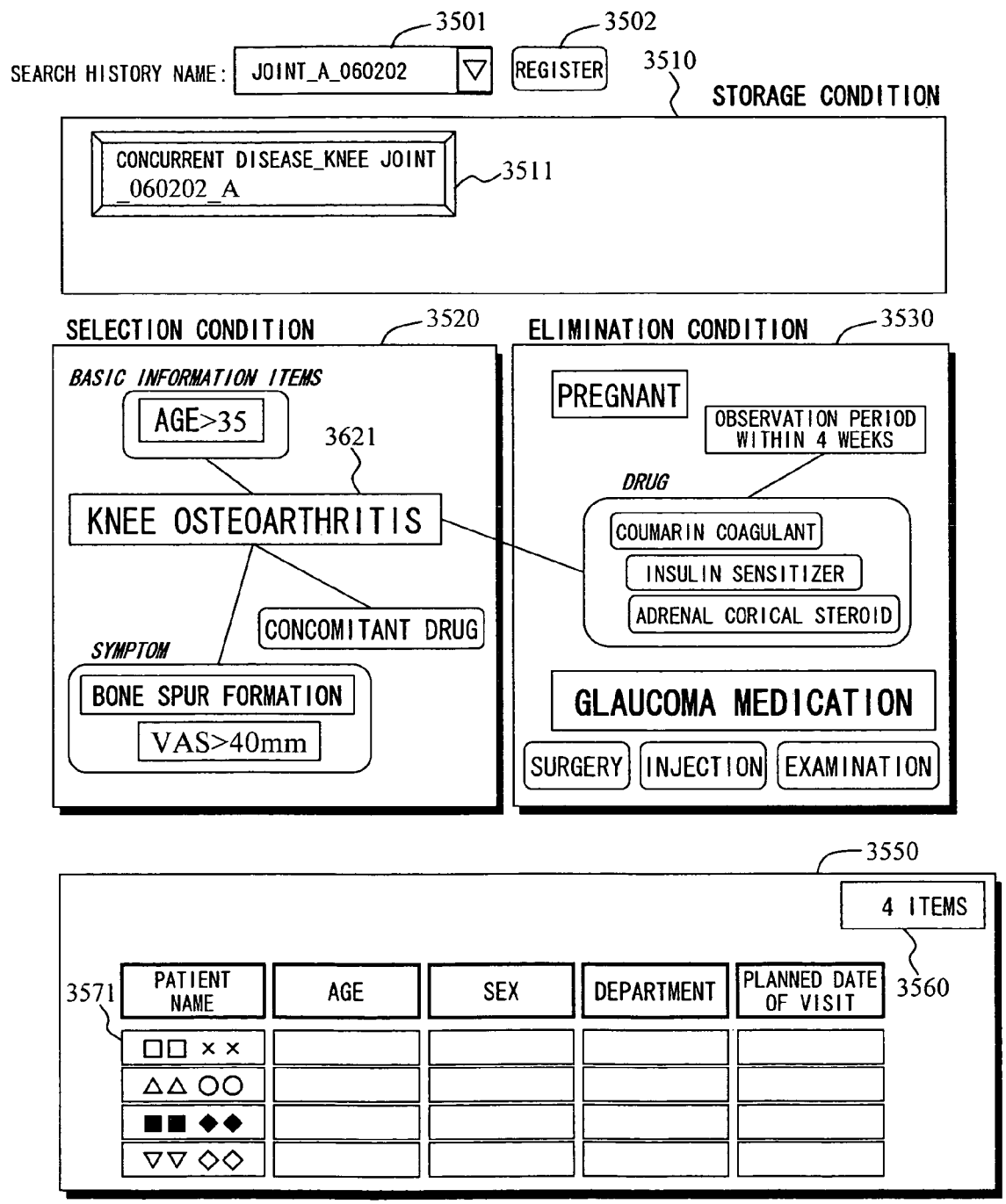
FIG. 36 shows an example of screen transition.

FIG. 36 shows a state in which, using a combo box 3501 of a search history name, a search history name "joint_A_060202" has been selected. The selected information is conveyed to the database 3360, where the search history name table 3410, search basic condition table 3420, search condition table 3430, and search result table 3440 are referred to so as to extract a record of search conditions and search results. The input/output device 3300 receives the search conditions extracted from the database records, reproduces them on the selection condition arrangement screen 3520 and the elimination condition arrangement screen 3530, receives search results, and reproduces them on the search result display screen 3550.

Figure 37:
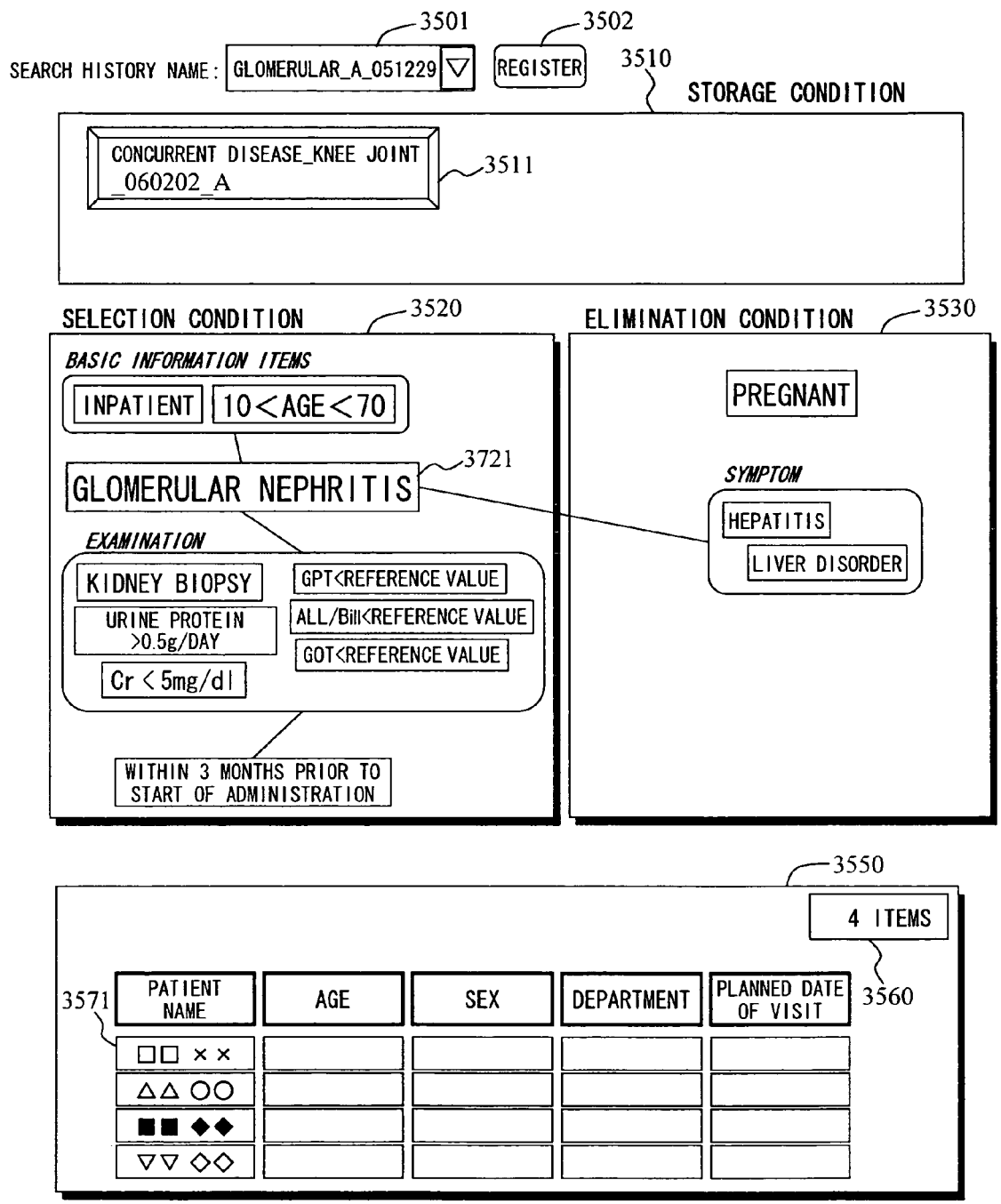
FIG. 37 shows an example of screen transition.

FIG. 37 shows a state in which, using the combo box 3501 of a search history name, a search history name "glomera_A_051229", which is different from the one of FIG. 36, has been selected. On the selection condition arrangement screen 3520 and the elimination condition arrangement screen 3530, search conditions that have been stored in association with the relevant history name are displayed after being called up from the search condition memory region 3343. Also, the search result information that has been stored in association with the relevant history name is called from the search result memory region 3344 and displayed on the search result display screen 3550.

Figure 38:
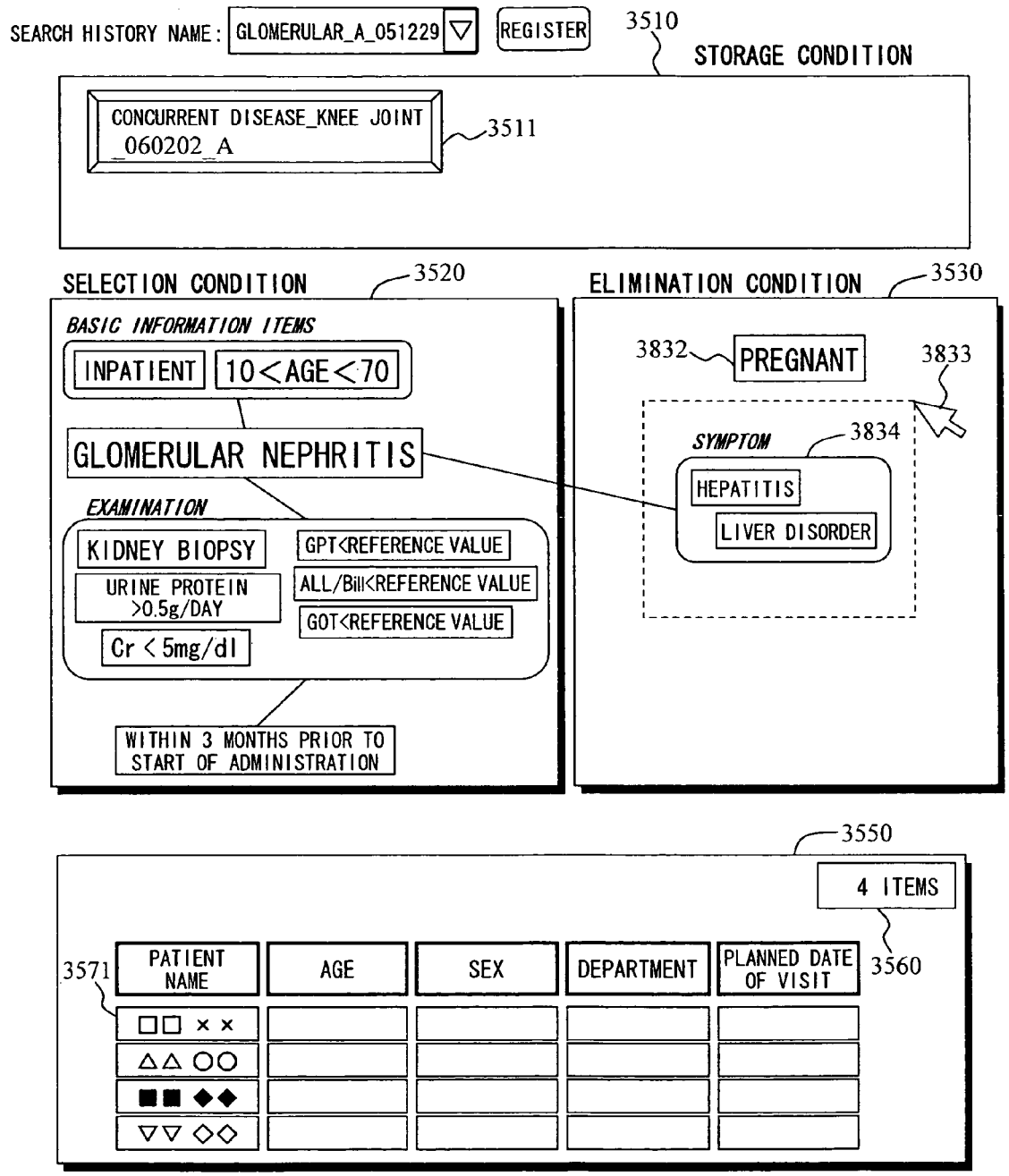
FIG. 38 shows an example of screen transition.
Figure 39:
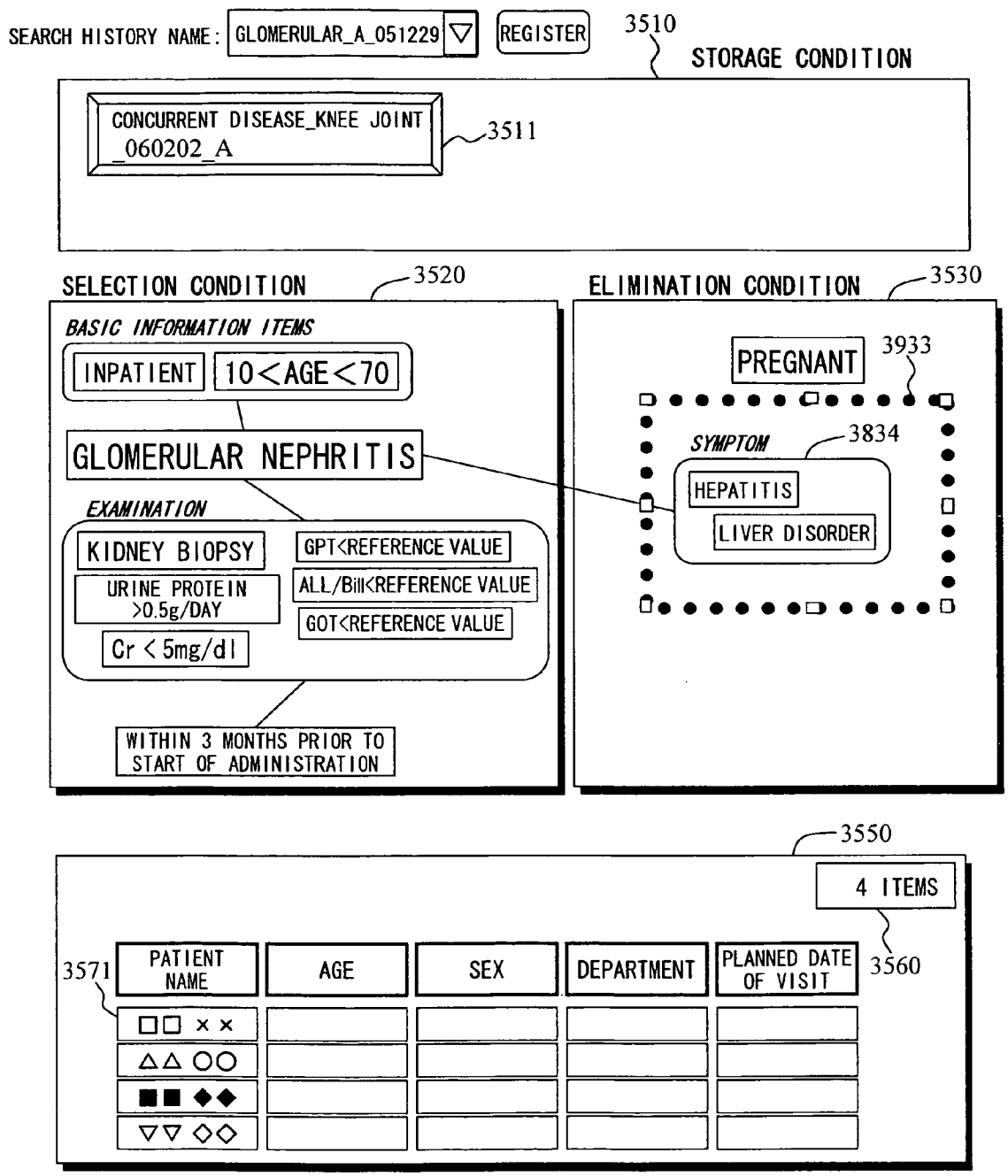
FIG. 39 shows an example of screen transition.

FIG. 38 shows a state in which a range is set by dragging the mouse on the screen of FIG. 37. The state is a transitional one in which a range of a condition 3834 relating to the symptom in the elimination condition arrangement screen 3530 is being designated by the mouse 3833. FIG. 39 shows a state in which the mouse that has been dragging is detached, whereby a region of which the range was set in FIG. 38 has been selected. The region 3933 indicates the selected region. Elimination conditions relating to symptoms in the region become storage objects.

Figure 40:
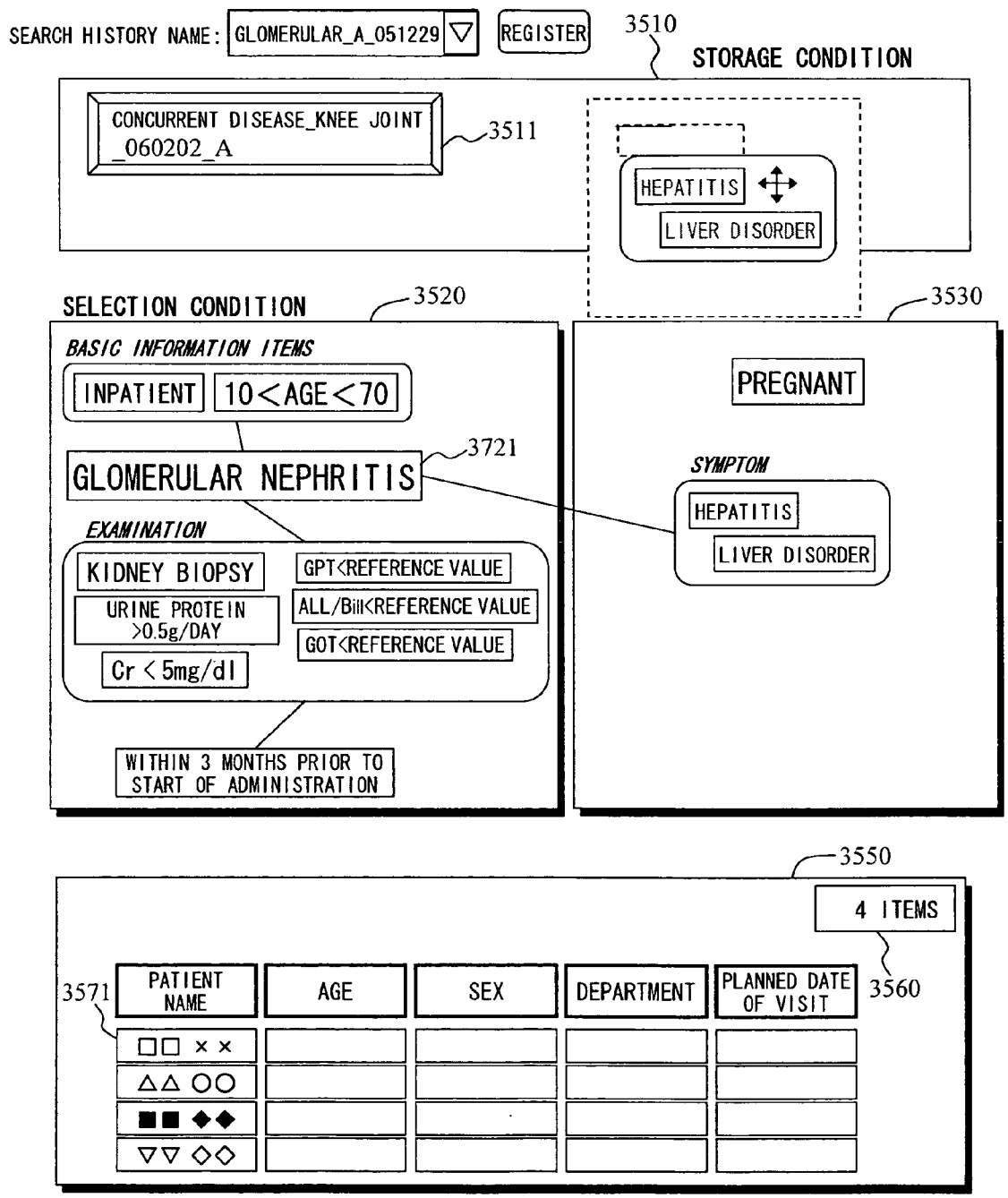
FIG. 40 shows an example of screen transition.
Figure 41:
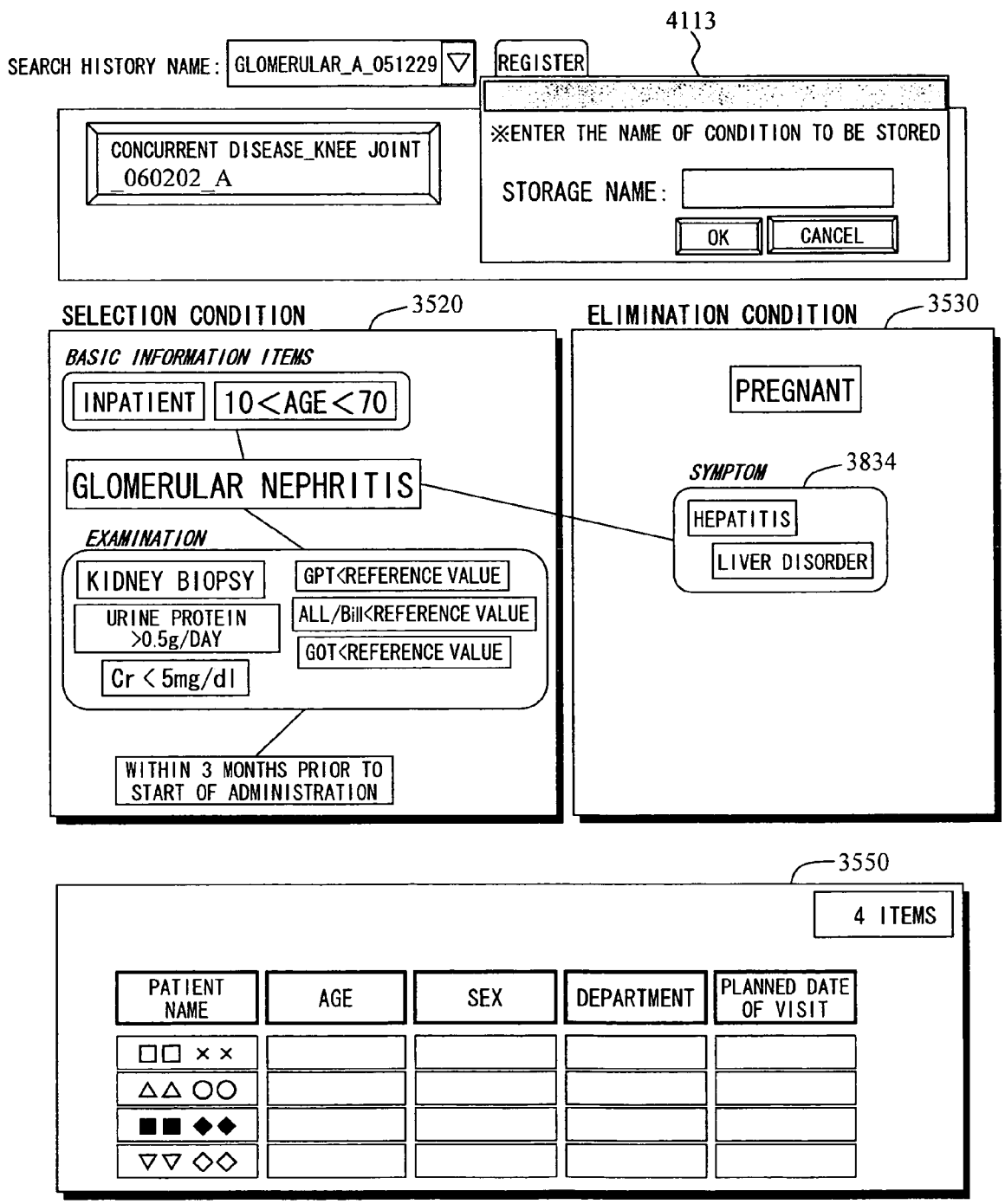
FIG. 41 shows an example of screen transition.

FIG. 40 shows a state in which the selected region 3933 of FIG. 39 is being dragged with the mouse over the storage region 3510. FIG. 41 shows a state in which the selected region 3933 of FIG. 39 has been dropped over the storage region 3510. In this case, the condition 3834 of the selection origin is left unchanged. As the selected region is dropped, an input box 4113 for designating a storage name appears.

Figure 42:
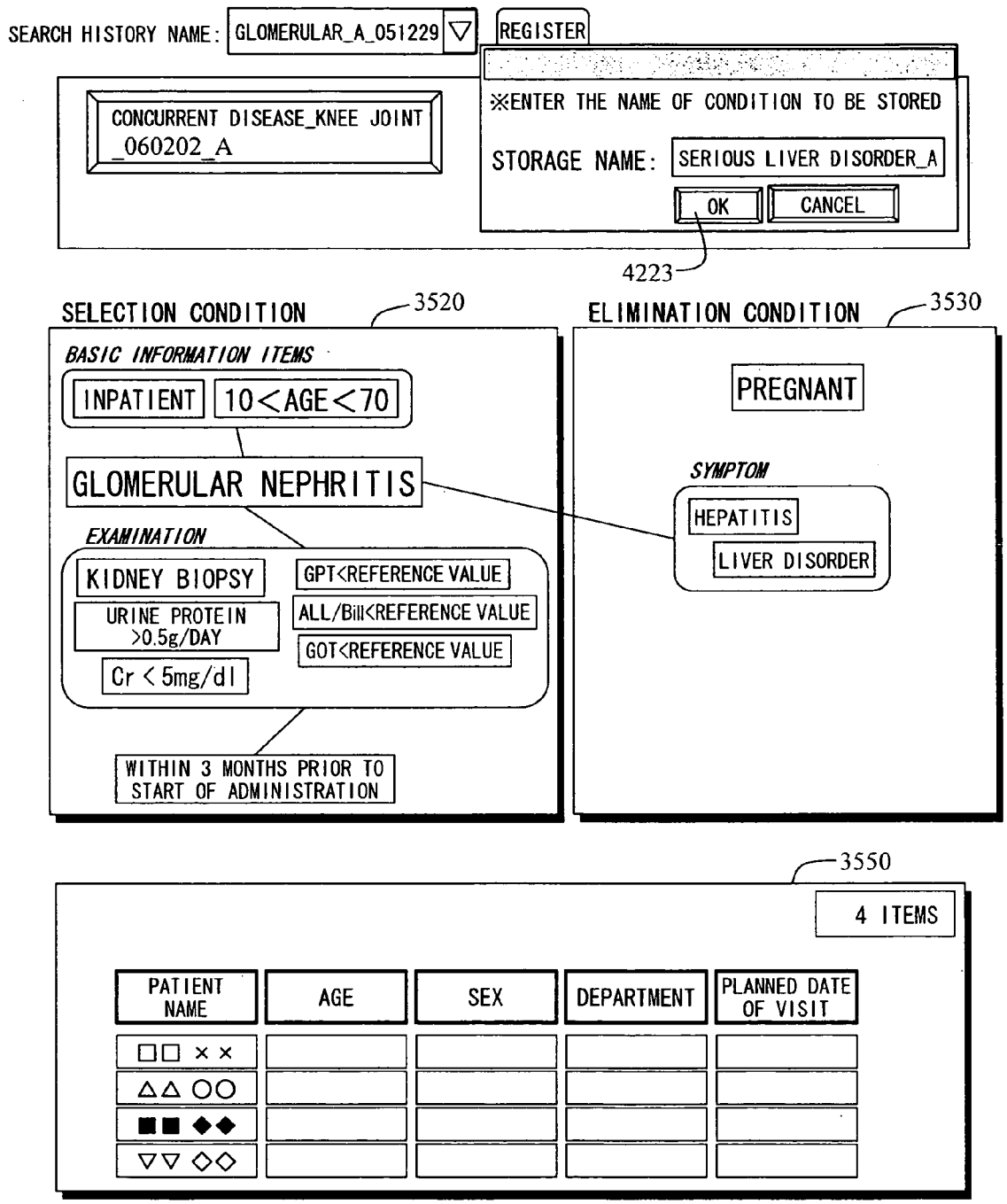
FIG. 42 shows an example of screen transition.
Figure 43:
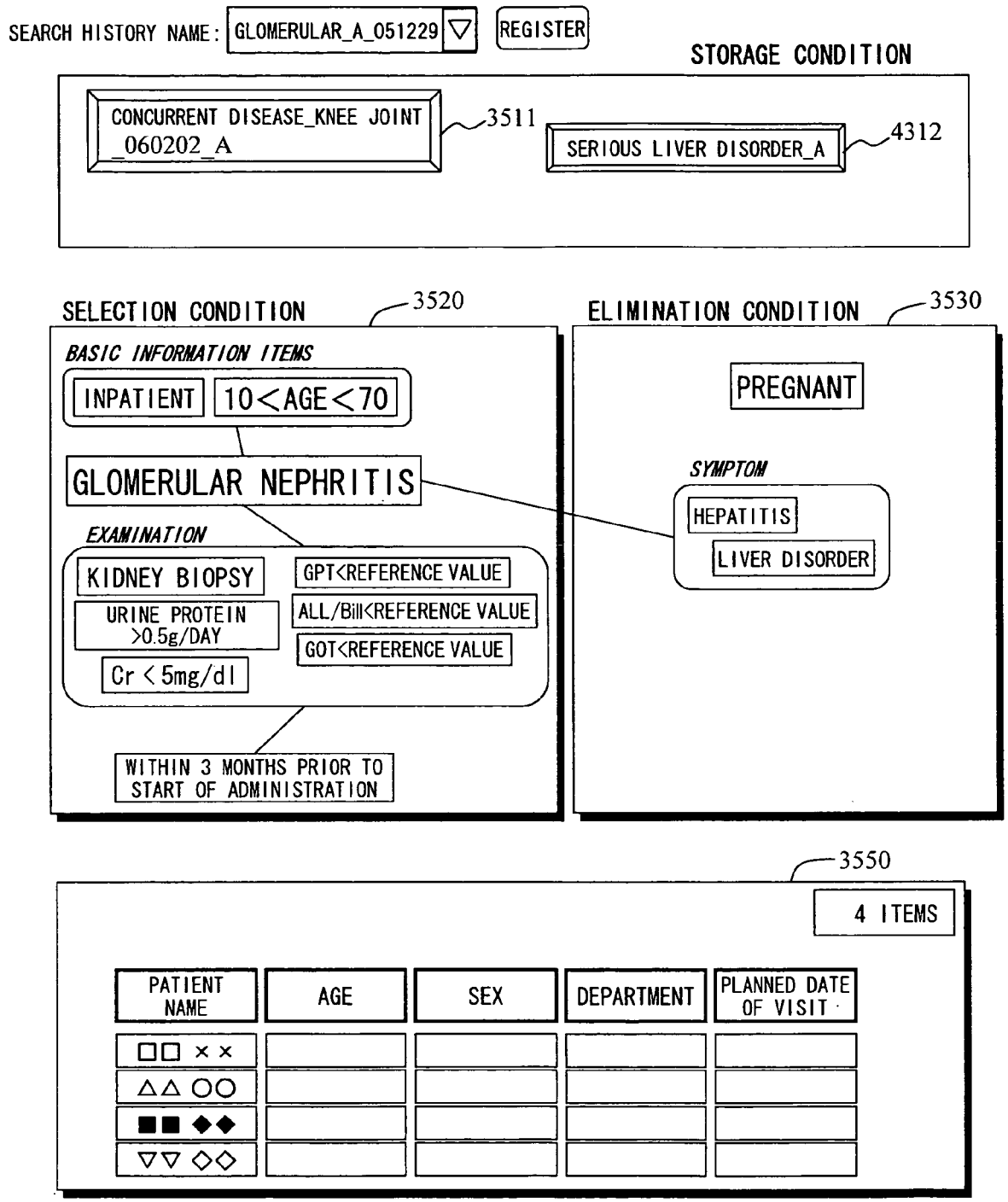
FIG. 43 shows an example of screen transition.

FIG. 42 shows a state in which "serious liver illness_A" has been entered as the name of a stored condition. By depressing an OK button 4223 now, the condition can be stored with the entered text name. The thus stored condition name is added in the search history name table 3410 together with the searcher ID and date information, while a new search storage ID is allocated. The search condition, using the newly allocated search storage ID as an external key, is stored in the search basic condition table 3420 and search condition table 3430. Conditions such as age, sex, and inpatient/outpatient category, which are uniquely determined for each patient, are stored in the search basic condition table 3420. On the other hand, conditions such as examination and disease name, of which the number is not constant, are stored in the search condition table 3430. FIG. 43 shows a state in which a storage condition 4312 having a label with the storage name entered in FIG. 42 has additionally appeared.

Figure 44:
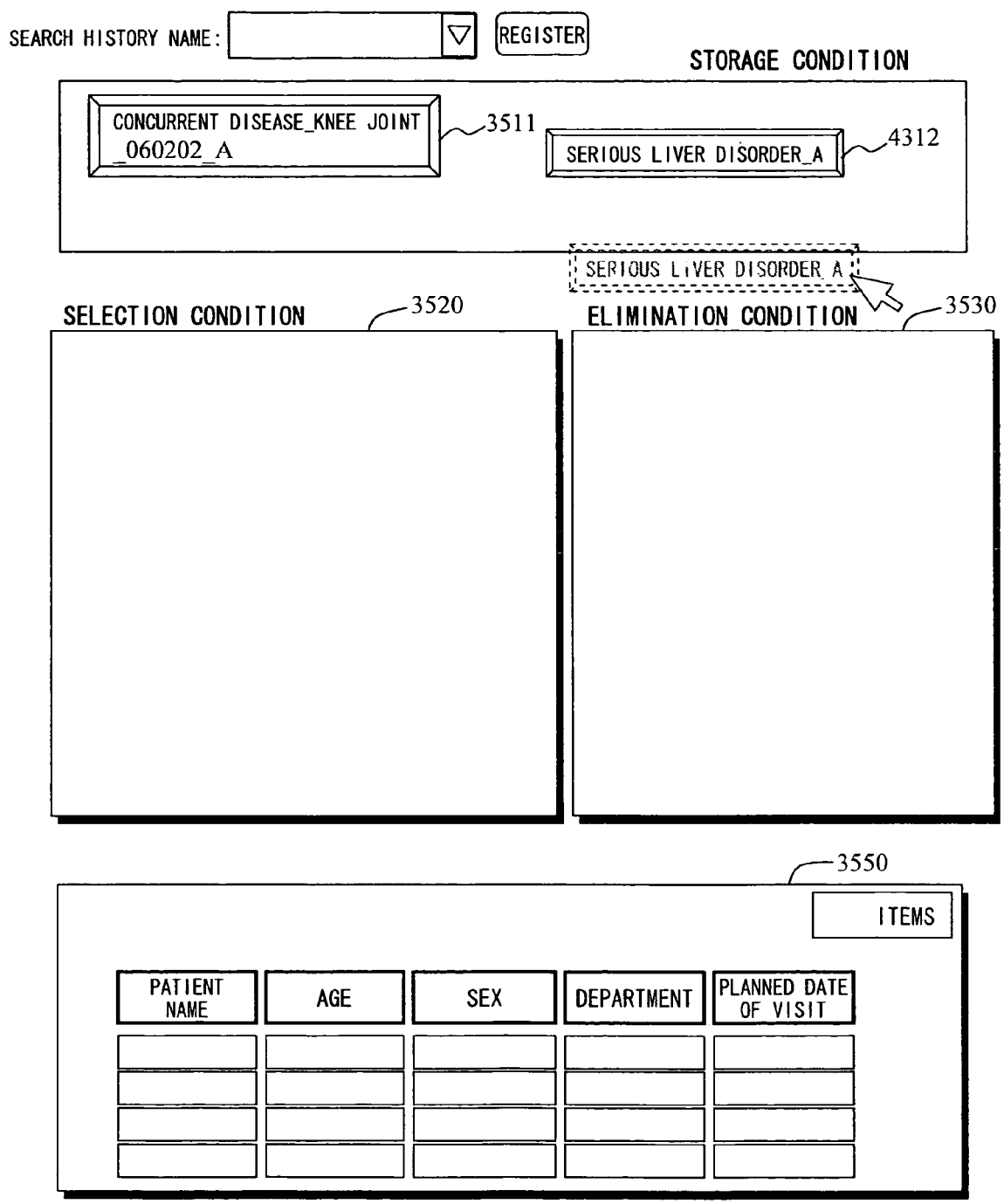
FIG. 44 shows an example of screen transition.
Figure 45:
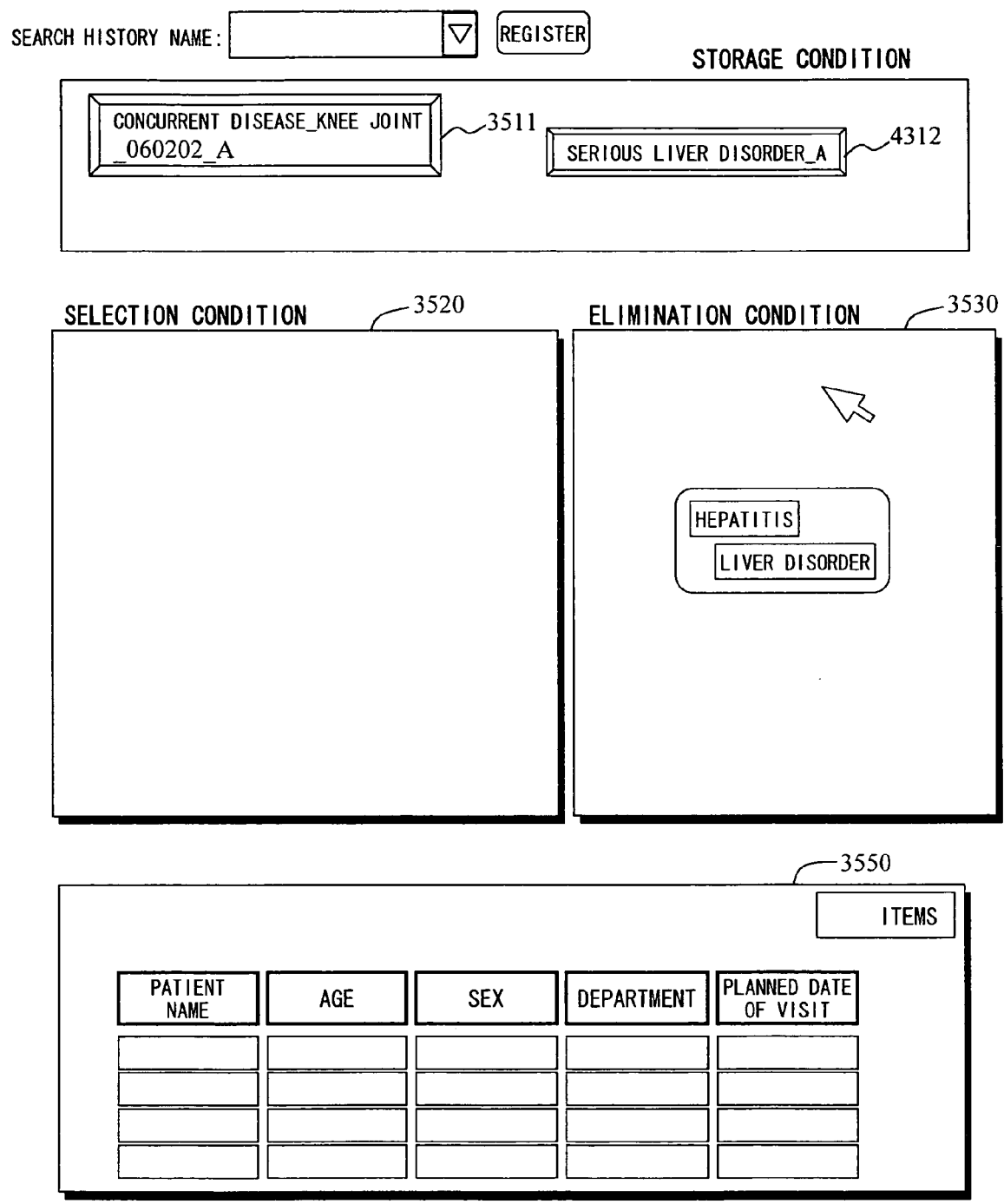
FIG. 45 shows an example of screen transition.

FIG. 44 shows a state in which, in order to create a new condition, the search history name combo box 3501 has been once returned back to blank, and the storage condition "serious liver illness_A" 4312 that has been newly created is being dragged. FIG. 45 shows a state in which the storage condition "serious liver illness_A" 4312 has been dropped over the condition arrangement regions 3520 and 3530, whereby the condition stored in FIG. 42 has been reproduced.

Figure 46:
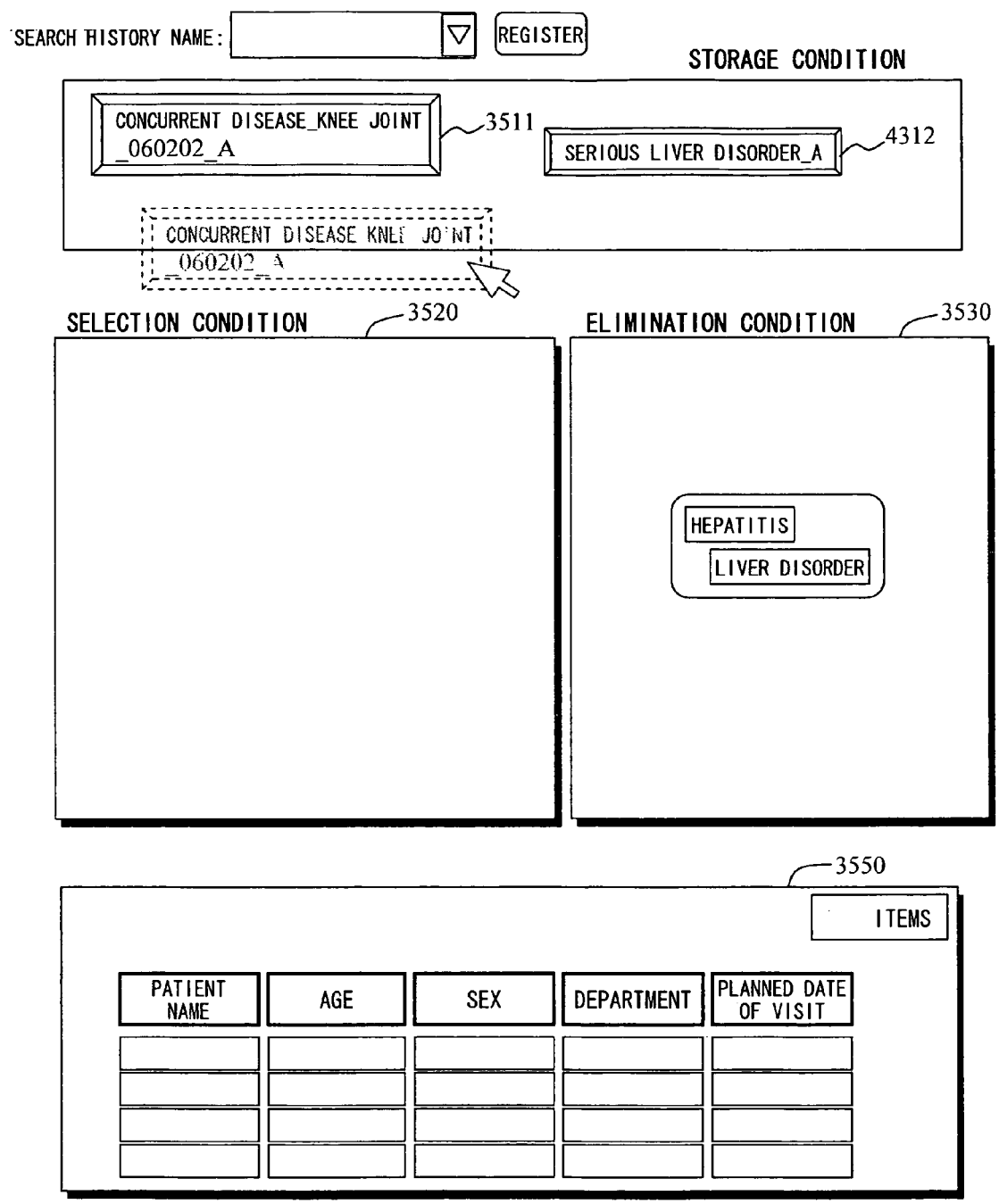
FIG. 46 shows an example of screen transition.
Figure 47:
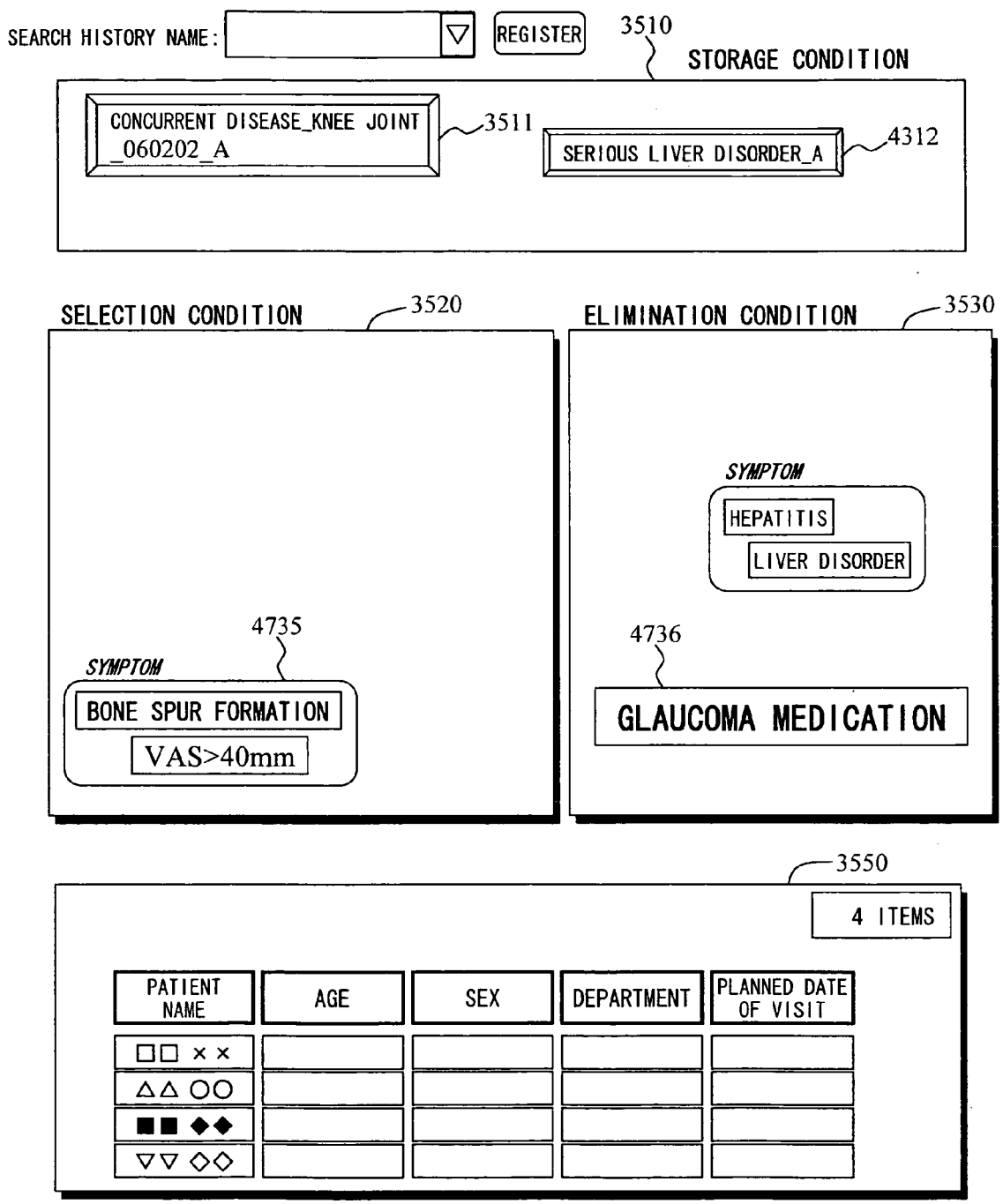
FIG. 47 shows an example of screen transition.

FIG. 46 shows a sate in which another storage condition "concurrent disease_knee joint_060202_A" 3511 is being dragged. FIG. 47 shows a state in which the storage condition "concurrent disease_knee joint_060202_A" 3511 has been dropped over the condition arrangement regions 3520 and 3530. As a result, a condition 4735 relating to a symptom and a condition 4736 relating to medication newly appear on the selection condition arrangement screen 3520 and the elimination condition arrangement screen 3530.

Figure 48:
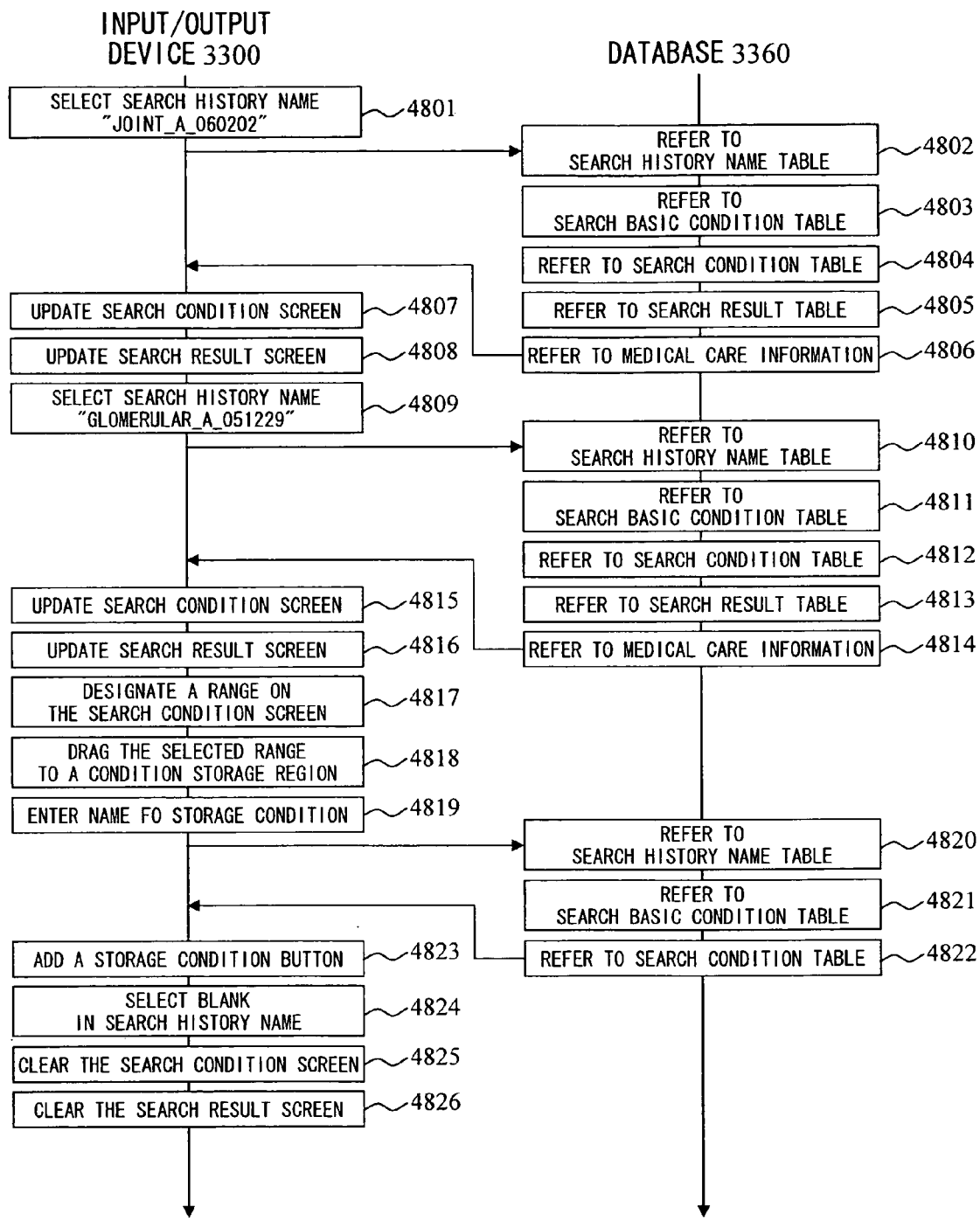
FIG. 48 shows a sequence chart illustrating an operation for storing a search condition.

FIG. 48 shows a sequence chart between an input/output device 3300 and a database 3360 illustrating a series of operation for storing a search condition. First, the user selects "joint_A__060202" in the search history name combo box 3501 (step 4801). The selected information is conveyed to the database 3360, where the search history name region 3412 of the search history name table 3410 is searched (step 4802). Then, by referring to the external key region 3427 of the search basic condition table 3420, records that correspond to the value of the search storage ID 3411 of the records obtained at step 4802 are searched (step 4803). Similarly, by referring to the external key region 3437 of the search condition table 3430, the records are searched for (step 4804). Similarly, by referring to the external key region 3442 of the search result table 3440, the relevant records are searched for (step 4805). In order to obtain detailed information about patients, records are searched that agree with the patient ID 3411 of the records obtained at step 4805, while referring to the patient ID in the patient basic information table 5010 (step 4806). The input/output device 3300 receives the search condition and search result from database 3360, and carries out the updating of the search condition arrangement screen (step 4807) and the updating of the search result screen (step 4808).

The user then selects another history name "glomera_A__051229" in the search history name combo box 3601 (step 4809). The selected information is conveyed to the database 3360, where the search history name region 3412 of the search history name table 3410 is searched (step 4810). By referring to the external key region 3427 of the search basic condition table 3420, records are searched for that agree with the value of the search storage ID 3411 of the records obtained at step 4810 (step 4811). Similarly, by referring to the external key region 3437 of the search condition table 3430, the relevant records are searched for (step 4812). Similarly, by referring to the external key region 3442 of the search result table 3440, the relevant records are searched for (step 4813). In order to obtain detailed information about patients, the patient ID in the patient basic information table 5010 (see FIG. 50) is referred to, and records are searched for that agree with the patient ID 3411 of the records obtained at step 4813 (step 4814). The input/output device 3300 receives the search condition and search results from the database, and then caries out the updating of the search condition arrangement screens 3520 and 3530 (step 4815) and the updating of the search result screen (step 4816).

Then, the user selects some of the search conditions on the search condition arrangement screens 3520 and 3530 by a region setting operation using the mouse (step 4817). The thus selected region is then dragged onto the condition storage region 3510 (step 4818). As the selected region is dragged onto the condition storage region, a box 4113 appears for the entry of a storage name, in which the user enters the name of the storage condition (step 4819). The stored condition and the storage name are transmitted to the database 3360, where they are added to the search history name table 3410, together with the searcher ID, date information, and arrangement information on 3510. A new search storage ID is also allocated (step 4820). The search condition is stored in the search basic condition table 3420 and the search condition table 3430, using the newly allocated search storage ID as an external key. Conditions such as age, sex, and inpatient/outpatient category, which are uniquely determined for each patient, are stored in the search basic condition table 3420 (step 4821). On the other hand, conditions such as drug, examination, and disease name, of which the number is not constant, are stored in the search condition table, with the correspondence being stored by means of the external key 3430 (step 4822). After the condition is stored, a label 4312 is added in the storage condition arrangement region (step 4823). Thereafter, in order to re-utilize the stored conditions, the search history name box 3501 rendered vacant (step 4824), and the search condition screen and the search result screen are cleared once (steps 4825, 4826).

Figure 49:
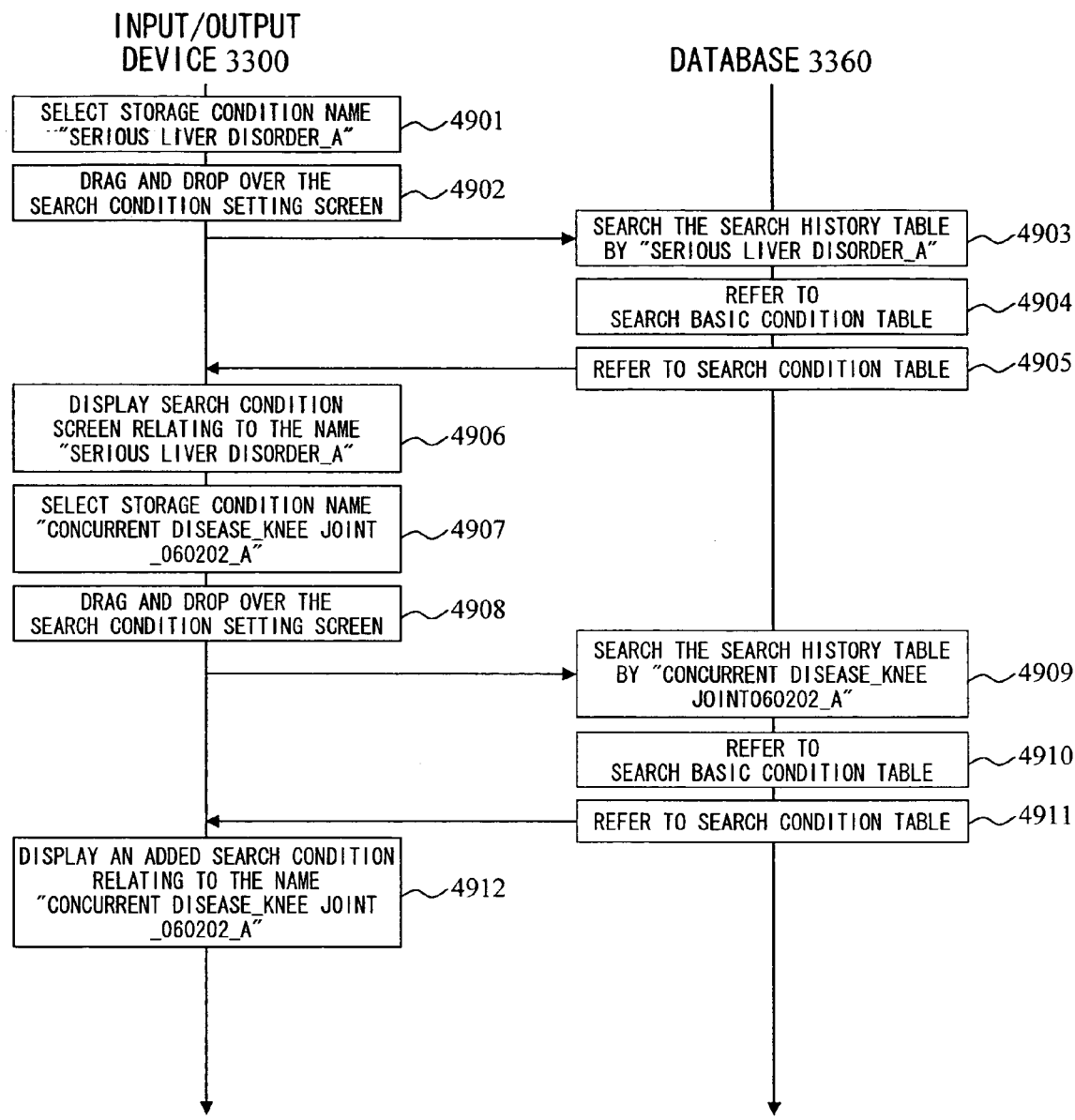
FIG. 49 shows a sequence chart illustrating an operation for re-utilizing a stored search condition.

FIG. 49 shows a sequence chart of a series of screen operations between the input/output device 3300 and the database 3360 for re-utilizing the search conditions stored by the sequence of FIG. 48. Although at step 4824 the search history screen has once been cleared, such clearing is not necessarily required. Namely, a storage condition may be added with the search condition screen left unchanged. In the following, steps will be described for re-utilizing a search condition starting from when there is nothing.

The user first selects a storage condition label "serious liver illness_A" 4312 (step 4901). Then, the user drags the label over the selection condition setting screen 3520 and the elimination condition setting screen 3530 and drops it there (step 4902). The input/output device 3300 inquires the database 3360 about a search condition corresponding to the name of the storage condition name thus dropped, and searches the search history name 3412 of the search history table 3410 (step 4903). By referring to the search storage ID 3411 of the relevant records, records are searched for of which the external key region 3427 of the search basic condition table 3420 agree with the above reference value (step 4904). Similarly, records are searched for of which the value in the external key region 3437 of the search condition table 3430 agrees with the above reference value (step 4905). The input/output device 3300 receives the search condition and search result from the database 3360, and then updates the selection condition setting screen 3520 and the elimination condition setting screen 3530 (step 4906).

Thereafter, another storage condition label "concurrent disease_knee joint__060202_A" 3511 is selected (step 4907). The label is similarly dragged and dropped over the selection condition setting screen 3520 and the elimination condition setting screen 3530 (step 4908). The input/output device 3300 inquires the database 3360 about the search condition corresponding to the dropped storage condition name, and then searches the search history name 3412 in the search history table 3410 (step 4909). By referring to the search storage ID 3411 of the search result record, records are searched for of which the external key region 3427 in the search basic condition table 3420 agrees with the above reference value (step 4910). Similarly, records are searched for of which the value of the external key region 3437 in the search condition table 3430 agrees with the reference value (step 4911). The input/output device 3300 receives from the database 3360 the search condition and the search result, and then updates the selection condition setting screen 3520 and the elimination condition setting screen 3530 (step 4912).

Through such steps, some of the search conditions are stored and re-utilized in combinations, whereby the search condition setting process can be efficiently carried out.

FIG. 50 shows a an example of the medical care history memory region 151 stored in the relationship database. The medical care information memory region 151 includes a patient basic information table 5010, a disease-name information table 5020, a drug prescription information table 5030, an examination information table 5040, and an interview information table 5060. In addition to the patient ID 5011, which is a main key for uniquely identifying the patient, the patient basic information 5010 stores patients' basic information, such as sex 5012, inpatient/outpatient category 5013, department 5014, and age 5015. The disease-name information table 5020 stores ID 5021 for uniquely identifying records, disease name 5022, start date of disease 5023, end date of disease 5024, and an external key 5025 for connecting such information with patients. The drug prescription information table 5030 stores ID 5031 for unique identification of records, prescription 5032, dosage 5033, start date 5034 of drug prescription, end date 5035 of drug prescription, and external key 5036 for connecting such information with patient information. The examination information table 5040 stores ID 5041 for unique identification of records, 5042 indicating examination item name, 5043 indicating examination values, 5044 indicating the date of examination, and an external key 5045 for connecting such information with patient information. The interview information table 5060 stores ID 5061 for unique identification of records, interview item 5062, the content of item 5063, and an external key 5064 for connecting such information with patient information. By designing such database, it becomes possible to support the setting of search conditions for data on the relationship information database.

INDUSTRIAL APPLICABILITY

The invention can be applied for supporting the setting of search conditions in search operations involving documents or relational databases.

What is claimed is:

1. A search apparatus comprising:
a search object database in which search objects are stored;
a simultaneous use frequency memory table in which records are stored, each record including two search conditions that have been simultaneously selected, categories thereof, dates of setting thereof, and at least one of importance of a co-occurrence relationship of said two search conditions and a co-occurrence frequency of said two search conditions;
display control means for causing a search condition input support screen and a search result to be displayed on a display device, wherein categories are arranged on one axis and search conditions belonging to each category are arranged along the other axis per category in a two-dimensional arrangement;
input means for selecting a search condition by operating the search condition input support screen;
an independent use frequency memory table in which a record of a use history of the search condition selected by the input means on the search condition input support screen is stored;
calculation means by which, while referring to the independent use frequency memory table, records of search conditions of each category as rearranged according to use dates such that the latest date appears at the top, a likelihood point of each record is calculated with Equation (1) such that a greater point is allocated to a record with a newer date of setting:

$$\text{likelihood point} = 1/\text{rank} \quad (1),$$

a sum of likelihood points of each search condition A is calculated as a recommendation level of said condition A with Equation (2):

$$\text{recommendation level of condition A} = \Sigma_{condition=A} \text{Likelihood} \quad (2),$$

and
a ranking of the other search conditions in records extracted from the simultaneous use frequency memory table with respect to the search condition that has been selected on the search condition input support screen by the input means is calculated by referring to the simultaneous use frequency memory table based on the selected search condition, the calculation being based on said at least one of the importance and the co-occurrence frequency and being carried out on a category-by-category basis; and
search means for conducting a search in accordance with the search condition selected on the search condition input support screen by the input means, wherein the display control means determines the ranking of a search condition of each category on an initial screen of the search condition input support screen based on the recommendation level of said condition A, and determines a display position for a search condition of each category displayed on the search condition input support screen in accordance with the result of calculation by the calculation means.

2. The search apparatus according to claim 1, wherein, when two or more search conditions have already been selected on the search condition input support screen by the input means, the calculation means determines said at least one of the importance and the co-occurrence frequency of other search conditions with respect to each of the selected search conditions, wherein a ranking of the other search conditions is calculated based on the average of said at least one of the importance and the co-occurrence frequency.

3. The search apparatus according to claim 1, wherein the display control means causes the objects retrieved by the search means and the number of such objects to be displayed on the display device as a search result.

4. The search apparatus according to claim 1, wherein the records extracted from the simultaneous use frequency memory table are ranked according the ranking calculated based on said at least one of the importance and the co-occurrence frequency.

5. The search apparatus according to claim 4, wherein a likelihood point is calculated for each of the other search conditions in records extracted from the simultaneous use frequency memory table with Equation (1), and a sum of likelihood points of each said other search condition is calculated as a recommendation level of said other search condition with Equation (2).

6. A search apparatus comprising:
a search object database in which search objects are stored;
a history table in which records for each setting are stored, each record including two search conditions that have been simultaneously selected, categories thereof, and dates of setting thereof;
display control means for causing a search condition input support screen and a search result to be displayed on a display device, wherein categories are arranged on one axis and search conditions belonging to each category are arranged along the other axis per category in a two-dimensional arrangement;
input means for selecting a search condition by operating the search condition input support screen;
calculation means by which, while referring to a history table based on the search condition that has been selected on the search condition input support screen by the input means, records that include the already-selected search condition are extracted, the extracted records are rearranged according to use dates such that the latest date appears at the top, a likelihood point of each record is calculated with Equation (1) such that a greater point is allocated to a record with a newer date of setting:

$$\text{likelihood point} = 1/\text{rank} \quad (1),$$

a sum of likelihood points of each search condition A is calculated as a recommendation level of said search condition A with Equation (2):

$$\text{recommendation level for condition } A = \Sigma_{condition=A} \text{ Likelihood} \quad (2),$$

whereby said search condition A is the other one of the two search conditions in each extracted record, a ranking of said search conditions A with respect to the already-selected search condition is calculated based on the sum and on a category-by-category basis; and search means for conducting a search in accordance with the search condition selected on the search condition input support screen by the input means, wherein the display control means determines a display position for a search condition of each category displayed on the search condition input support screen in accordance with the result of calculation by the calculation means.

7. The search apparatus according to claim 6, comprising an independent use frequency memory table in which said at least one of the frequency and the importance of each of the search conditions selected by the input means on the search condition input support screen is stored, wherein the display control means determines the rank of search conditions in each of the categories on an initial screen of the search condition input support screen, based on said at least one of the frequency and the importance stored in the independent use frequency memory table.

8. The search apparatus according to claim 6, comprising an independent use frequency memory table in which a use history of the search condition selected by the input means on the search condition input support screen is stored, wherein the calculation means calculates a sum of points of each search condition, wherein a greater point is allocated to a newer use date, and wherein the display control means determines the rank of search conditions in each of the categories on an initial screen of the search condition input support screen based on such points.

9. The search apparatus according to claim 6, wherein the display control means causes the objects retrieved by the search means and the number of such objects to be displayed on the display device as a search result.

10. A search apparatus comprising:

a search object database in which search objects are stored;

a simultaneous use frequency memory table in which records are stored, each record including two search conditions that have been simultaneously selected, categories thereof, dates of setting thereof, and at least one of importance of a co-occurrence relationship of said two search conditions and a co-occurrence frequency of said two search conditions;

display control means for causing a display device to display a search condition input support screen for displaying search condition candidates in a two-dimensional arrangement, an input box for entering search conditions arranged on the search condition input support screen, and a search result;

an input means for inputting search conditions in the input box and for selecting a desired search condition from the search conditions displayed on the search condition input support screen;

calculation means by which, by referring to the simultaneous use frequency memory table, other search conditions are extracted that has a level of relationship with the search condition selected on the search condition input support screen by the input means exceeding a threshold value set by a user; and search means for conducting a search in accordance with the search condition selected by the input means on the search condition input support screen, wherein the display control means displays the search condition extracted by the calculation means on the search condition input support screen, wherein said level of relationship is a recommendation level which is calculated, while referring to the simultaneous use frequency memory table based on the search condition that has been selected on the search condition input support screen by the input means, records that include the already-selected search condition are extracted, the extracted records are rearranged according to use dates such that the latest date appears at the top, by calculating a likelihood point of each record is calculated with Equation (1) such that a greater point is allocated to a record with a newer date of setting:

$$\text{likelihood point} = 1/\text{rank} \quad (1),$$

a sum of likelihood points of each search condition A is calculated as a recommendation level of said search condition A with Equation (2):

$$\text{recommendation level for condition } A = \Sigma_{condition=A} \text{ Likelihood} \quad (2),$$

whereby said search condition A is the other one of the two search conditions in each extracted record.

11. The search apparatus according to claim 10, wherein the display control means displays the selected search condition differently from non-selected selection conditions.

12. The search apparatus according to claim 10, wherein the calculation means determines -said at least one of the importance and the co-occurrence frequency of other search conditions with respect to each of the selected search conditions, and extracts search conditions of which the average of said at least one of the importance and the co-occurrence frequency exceeds a preset threshold value.

13. The search apparatus according to claim 10, wherein the display control means varies the display size of the search condition displayed on the search condition input support screen depending on the level of relationship.

14. The search apparatus according to claim 10, wherein the display control means connects search conditions having a strong co-occurrence relationship with a line when they are displayed.

15. The search apparatus according to claim 10, wherein the search condition input support screen includes a selection condition display screen for displaying search conditions that a search object should possess, and an elimination condition display screen for displaying search conditions that a search object should not possess.

16. The search apparatus according to claim 10, wherein the display control means causes the display device to display objects retrieved by the search means and the number of such objects to be displayed as a search result.

17. The search apparatus according to claim 10, comprising:
- storage means for storing a plurality of search conditions displayed on the search condition input support screen, the relationship among the search conditions, and a search history comprised of search results, with names given to them;
- means for designating the name of a search history; and
- means for reproducing the search conditions stored with the designated names, the relationship among the search conditions, and the search result on the search condition input support screen.

18. The search apparatus according to claim 10, comprising:
- storage means for storing some of the search conditions displayed on the search condition input support screen and their relationship, with search names given to them;
- means for designating a search name; and
- means for reproducing the search conditions stored with the designated names and the relationship among the search conditions on the search condition input support screen.

* * * * *